United States Patent
Kim et al.

(10) Patent No.: US 11,751,097 B2
(45) Date of Patent: *Sep. 5, 2023

(54) METHOD AND APPARATUS FOR REESTABLISHING PACKET DATA CONVERGENCE PROTOCOL (PDCP) ENTITY IN A WIRELESS COMMUNICATION SYSTEM

(71) Applicant: SAMSUNG ELECTRONICS CO., LTD., Suwon-si (KR)

(72) Inventors: Donggun Kim, Seoul (KR); Soenghun Kim, Suwon-si (KR); Seungri Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/738,777

(22) Filed: May 6, 2022

(65) Prior Publication Data

US 2022/0264368 A1 Aug. 18, 2022

Related U.S. Application Data

(63) Continuation of application No. 16/254,906, filed on Jan. 23, 2019, now Pat. No. 11,330,466, which is a
(Continued)

(30) Foreign Application Priority Data

Sep. 18, 2017 (KR) ........................ 10-2017-0119723
Apr. 30, 2018 (KR) ........................ 10-2018-0049790

(51) Int. Cl.
*H04W 28/06* (2009.01)
*H04L 69/04* (2022.01)
(Continued)

(52) U.S. Cl.
CPC ............. *H04W 28/06* (2013.01); *H04L 47/34* (2013.01); *H04L 69/04* (2013.01); *H04L 69/22* (2013.01);
(Continued)

(58) Field of Classification Search
CPC ......... H04L 47/34; H04L 69/04; H04L 69/22; H04W 28/06; H04W 72/042; H04W 72/1268; H04W 80/08
See application file for complete search history.

(56) References Cited

U.S. PATENT DOCUMENTS 8,964,699 B2 * 2/2015 Wu ........................ H04W 76/19
455/450
10,075,881 B2 * 9/2018 Yi ...................... H04W 36/0061
(Continued)

FOREIGN PATENT DOCUMENTS

CN 101621832 A 1/2010
CN 101925121 A 12/2010
(Continued)

OTHER PUBLICATIONS

"3rd Generation Partnership Project; Technical Specification Group Radio Access Network; NR; Packet Data Convergence Protocol (PDCP) specification (Release 15)", 3GPP TS 38.323 V0.3.0, Sep. 2017, 30 total pages.
(Continued)

*Primary Examiner* — Benjamin H Elliott, IV
(74) *Attorney, Agent, or Firm* — Sughrue Mion, PLLC

(57) ABSTRACT

A communication technique for converging a 5G communication system, which is provided to support a higher data transmission rate beyond a 4G system with an IoT technology, and a system therefor applied to intelligent services (e.g., smart home, smart building, smart city, smart car or connected car, health care, digital education, retail business,
(Continued)

security and safety related service, or the like) based on the 5G communication technology and the IoT related technology by re-establishing a PDCP entity for a header compression protocol and activating uplink semi-persistent scheduling.

16 Claims, 29 Drawing Sheets

Related U.S. Application Data continuation of application No. 16/133,189, filed on Sep. 17, 2018, now Pat. No. 10,917,815.

(51) Int. Cl.
| | | |
|---|---|---|
| *H04L 69/22* | (2022.01) | |
| *H04W 72/1268* | (2023.01) | |
| *H04L 47/34* | (2022.01) | |
| *H04W 80/08* | (2009.01) | |
| *H04W 72/23* | (2023.01) | |

(52) U.S. Cl.
CPC ....... *H04W 72/1268* (2013.01); *H04W 80/08* (2013.01); *H04W 72/23* (2023.01)

(56) References Cited

U.S. PATENT DOCUMENTS

| | | | | |
|---|---|---|---|---|
| 10,917,815 | B2* | 2/2021 | Kim | H04W 28/06 |
| 11,330,466 | B2* | 5/2022 | Kim | H04L 69/04 |
| 2008/0095116 | A1* | 4/2008 | Kim | H04W 36/02 |
| | | | | 370/331 |
| 2009/0016301 | A1 | 1/2009 | Sammour et al. | |
| 2009/0316664 | A1 | 12/2009 | Wu | |
| 2011/0103327 | A1* | 5/2011 | Lee | H04W 4/90 |
| | | | | 370/329 |
| 2011/0170499 | A1* | 7/2011 | Nayeb Nazar | H04L 5/0007 |
| | | | | 370/329 |
| 2012/0057546 | A1 | 3/2012 | Wang et al. | |
| 2012/0147810 | A1* | 6/2012 | Wang | H04W 24/02 |
| | | | | 370/315 |
| 2012/0176996 | A1* | 7/2012 | Kim | H04L 5/0098 |
| | | | | 370/329 |
| 2012/0307741 | A1* | 12/2012 | Wu | H04W 76/19 |
| | | | | 370/328 |
| 2013/0182627 | A1* | 7/2013 | Lee | H04L 5/0016 |
| | | | | 370/329 |
| 2013/0242923 | A1* | 9/2013 | Yang | H04L 5/0048 |
| | | | | 370/329 |
| 2015/0109998 | A1* | 4/2015 | Yang | H04W 74/0833 |
| | | | | 370/328 |
| 2016/0014647 | A1 | 1/2016 | Yi et al. | |
| 2016/0135095 | A1* | 5/2016 | Wu | H04W 36/0027 |
| | | | | 370/328 |
| 2016/0205669 | A1* | 7/2016 | Kusashima | H04W 72/042 |
| | | | | 370/280 |
| 2016/0255675 | A1* | 9/2016 | Van Lieshout | H04W 72/04 |
| | | | | 370/329 |
| 2017/0019864 | A1* | 1/2017 | Hwang | H04W 52/0206 |
| 2017/0034808 | A1* | 2/2017 | Ouchi | H04W 52/221 |
| 2018/0035459 | A1* | 2/2018 | Islam | H04L 5/0053 |
| 2018/0049225 | A1* | 2/2018 | Lee | H04W 72/0426 |
| 2018/0279168 | A1* | 9/2018 | Jheng | H04L 5/001 |
| 2018/0310335 | A1* | 10/2018 | Tang | H04W 72/14 |
| 2018/0317213 | A1* | 11/2018 | Islam | H04W 72/0406 |
| 2018/0323909 | A1* | 11/2018 | Ying | H04L 1/1887 |
| 2018/0324889 | A1* | 11/2018 | Babaei | H04W 8/26 |
| 2018/0367255 | A1* | 12/2018 | Jeon | H04L 5/00 |
| 2019/0045507 | A1* | 2/2019 | Sorrentino | H04W 72/042 |
| 2019/0053098 | A1 | 2/2019 | Jo et al. | |
| 2019/0053211 | A1* | 2/2019 | Ying | H04W 72/044 |
| 2019/0075550 | A1* | 3/2019 | Lee | H04W 76/38 |
| 2019/0090156 | A1* | 3/2019 | Kim | H04L 69/22 |
| 2019/0090266 | A1* | 3/2019 | Zhao | H04W 72/1205 |
| 2019/0149279 | A1* | 5/2019 | Lee | H04W 28/0278 |
| | | | | 370/329 |
| 2019/0159065 | A1* | 5/2019 | Kim | H04L 69/04 |
| 2019/0297662 | A1* | 9/2019 | Palat | H04W 76/15 |
| 2022/0264368 | A1* | 8/2022 | Kim | H04W 28/06 |

FOREIGN PATENT DOCUMENTS

| | | |
|---|---|---|
| EP | 2 369 795 A2 | 9/2011 |
| WO | 2014/163309 A1 | 10/2014 |

OTHER PUBLICATIONS

Vivo, "Issues on the PDCP packet reception", 3GPP TSG-RAN WG2 Meeting #99, Aug. 2017, 11 pages total.

International Search Report dated Dec. 20, 2018 issued by the International Searching Authority in counterpart International Application No. PCT/KR2018/010929 (PCT/ISA/210).

"3rd Generation Partnership Project; Technical Specification Group Radio Access Network; Evolved Universal Terrestrial Radio Access (E-UTRA); Packet Data Convergence Protocol (PDCP) specification KRelease 14)", 3GPP Standard; 3GPP TS 36.323, vol. RAN WG2, No. V14.3.0, Jun. 23, 2017, XP051299021, pp. 1-43.

Communication dated Jun. 15, 2020 issued by the European Patent Office in application No. 18856432.2.

"Issues on the PDCP packet reception", vivo, 3GPP TSG-RAN WG2 Meeting #99, Berlin, Germany, Aug. 21-25, 2017, R2-1708504. (9 pages total).

3rd Generation Partnership Project; Technical Specification Group Radio Access Network; NR; Packet Data Convergence Protocol (PDCP) specification 9Release 15), 3GPP TS 38.323 V0.3.0, Aug. 2017. (28 pages total).

"Report on [86#30][LTE/DC] Implementation of PDCP reordering function in PDCP specification (Samsung)", Samsung, 3GPP TSG-RAN2#87 meeting, Aug. 18-22, 2014, Dresden, Germany, Tdoc#R2-143125. (11 pages total).

Communication dated Feb. 23, 2023 by the China National Intellectual Property Administration in Chinese Patent application No. 201880060887.X.

* cited by examiner

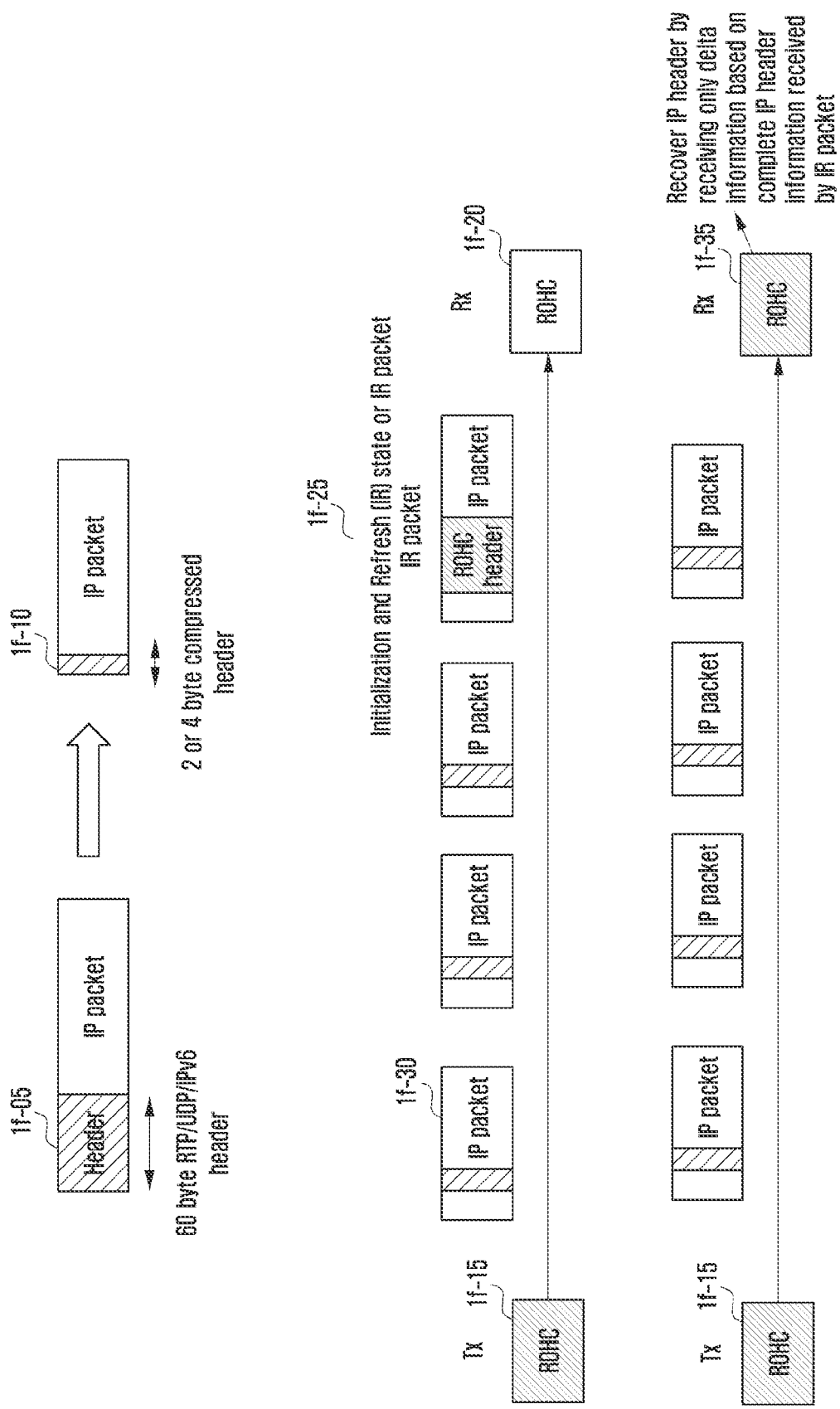

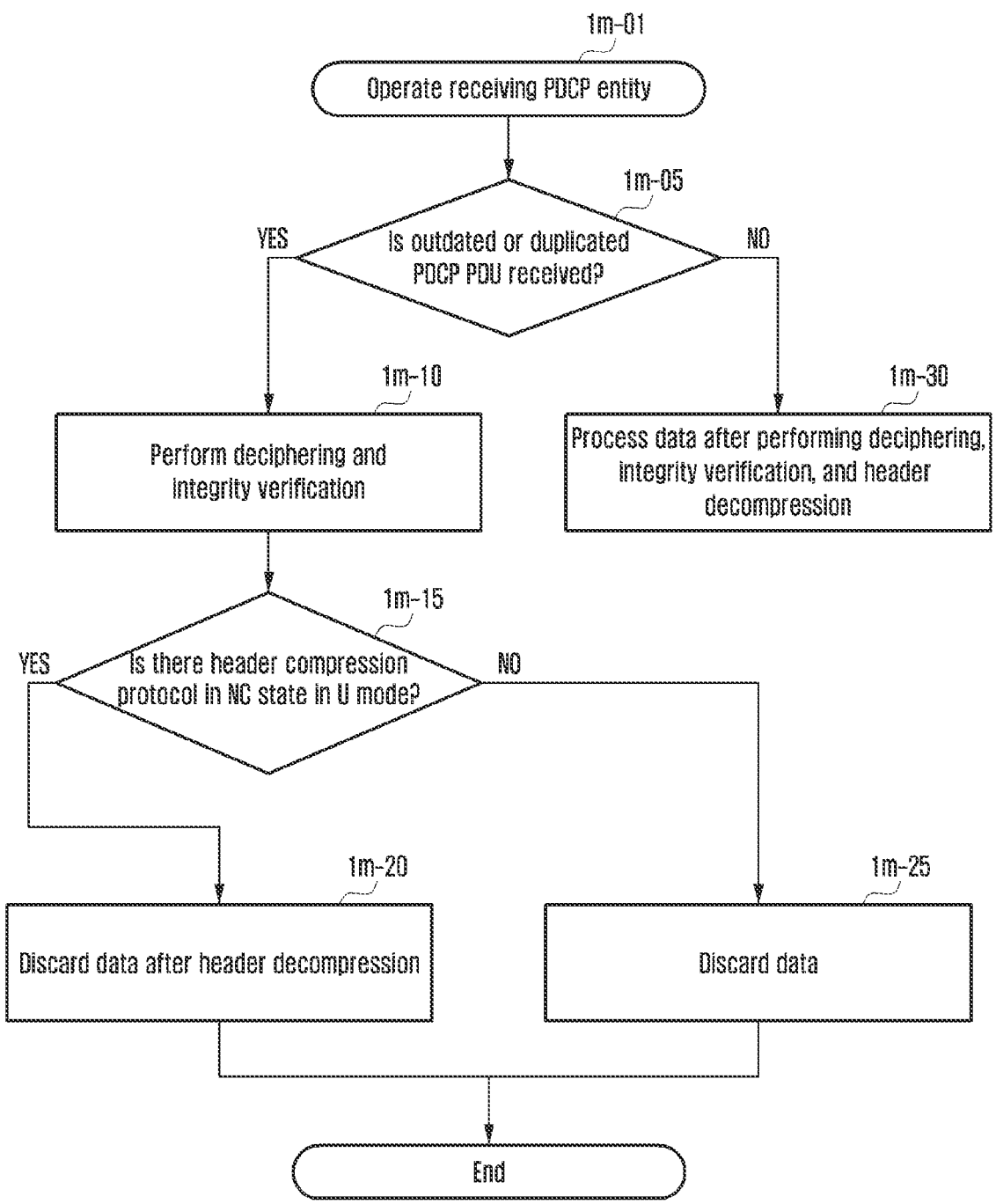

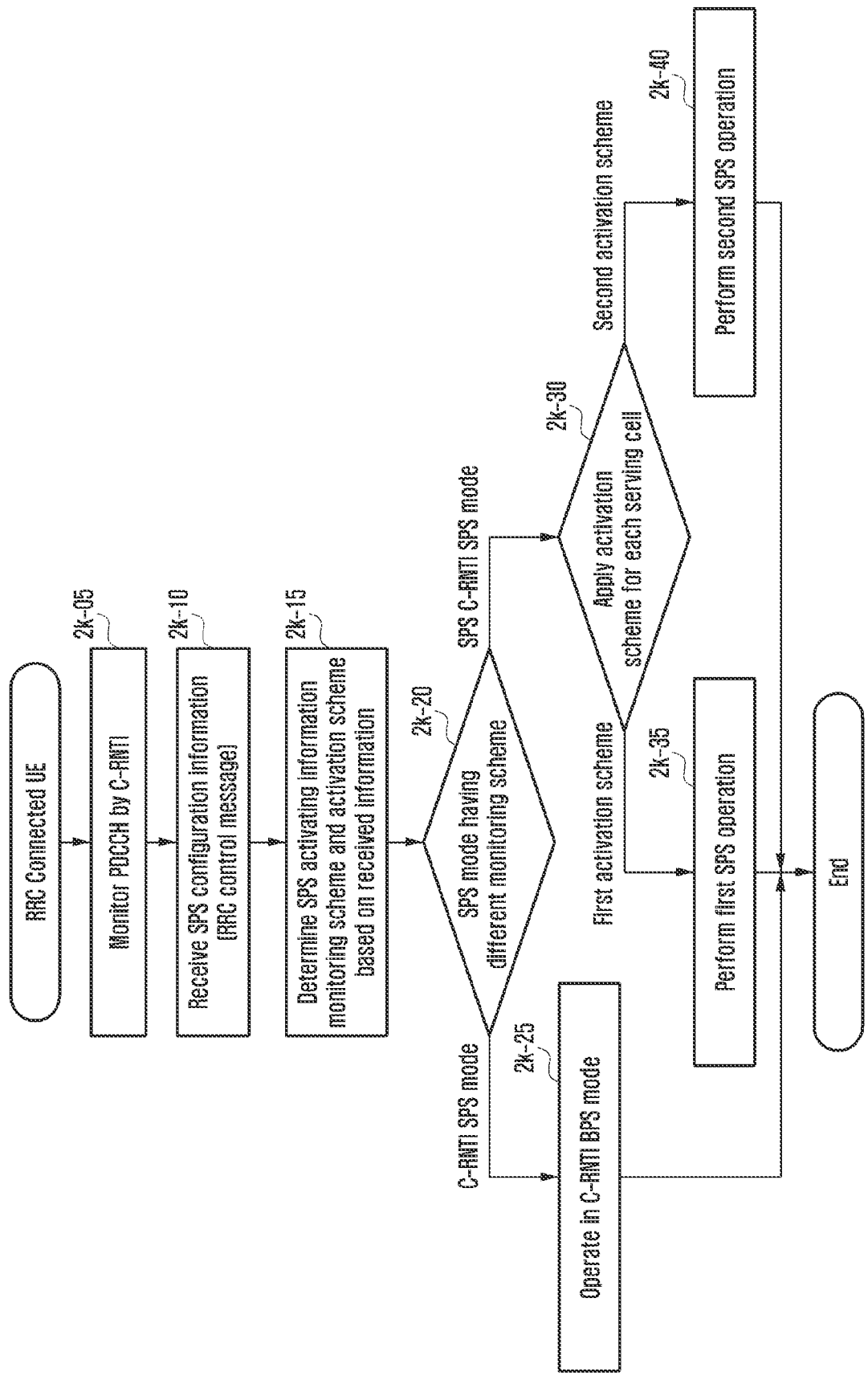

METHOD AND APPARATUS FOR REESTABLISHING PACKET DATA CONVERGENCE PROTOCOL (PDCP) ENTITY IN A WIRELESS COMMUNICATION SYSTEM

CROSS-REFERENCE TO RELATED APPLICATION(S)

This application is a Continuation of U.S. application Ser. No. 16/254,906 filed on Jan. 23, 2019, which is a Continuation of U.S. application Ser. No. 16/133,189 filed on Sep. 17, 2018, issued as U.S. Pat. No. 10,917,815 on Feb. 9, 2021 in the U.S. Patent and Trademark Office, which claims priority under 35 U.S.C. § 119 from Korean Patent Application No. 10-2017-0119723 filed on Sep. 18, 2017, in the Korean Intellectual Property Office and Korean Patent Application No. 10-2018-0049790 filed on Apr. 30, 2018, in the Korean Intellectual Property Office, the disclosures of which are herein incorporated by reference in their entireties.

BACKGROUND

1. Field

The disclosure relates to a method and apparatus for reestablishing a PDCP entity capable of preventing an error when a header compression protocol performs decompression in a next generation mobile communication system.

2. Description of Related Art

To meet a demand for radio data traffic that is on an increasing trend because commercialization of a fourth generation (4G) communication system, efforts to develop an improved fifth generation (5G) communication system or a pre-5G communication system have been conducted. For this reason, the 5G communication system or the pre-5G communication system is called a beyond 4G network communication system or a post Long Term Evolution (LTE) system.

To achieve a high data transmission rate, the 5G communication system is considered to be implemented in a very high frequency (mmWave) band (e.g., like 60 GHz band). To relieve a path loss of a radio wave and increase a transfer distance of the radio wave in the very high frequency band, in the 5G communication system, beamforming, massive multiple-input and multiple-output (MIMO), full dimensional MIMO (FD-MIMO), array antenna, analog beamforming, and large scale antenna technologies have been discussed.

Further, to improve a network of the system, in the 5G communication system, technologies such as an evolved small cell, an advanced small cell, a cloud radio access network (cloud RAN), an ultra-dense network, a device to device communication (D2D), a wireless backhaul, a moving network, cooperative communication, coordinated multi-points (CoMP), and reception interference cancellation have been developed.

In addition to this, in the 5G system, hybrid frequency-shift keying (FSK) and quadrature amplitude modulation (QAM) modulation (FQAM) and sliding window superposition coding (SWSC) that are an advanced coding modulation (ACM) scheme and a filter bank multi carrier (FBMC), a non-orthogonal multiple access (NOMA), and a sparse code multiple access (SCMA) that are an advanced access technology, and so on have been developed.

Meanwhile, the Internet has evolved from a human-centered connection network through which a human being generates and consumes information to the Internet of Things (IoT) network that relays information between distributed components and processes the information. The Internet of Everything (IoE) technology in which the big data processing technology, etc., is combined with the IoT technology by connection with a cloud server, etc. has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between devices has been researched. In the IoT environment, an intelligent Internet technology (IT) service that creates a new value in human life by collecting and analyzing data generated in the connected things may be provided. The IoT may be applied to fields, such as a smart home, a smart building, a smart city, a smart car or a connected car, a smart grid, health care, smart appliances, and an advanced healthcare service, by fusing and combining the existing information technology (IT) with various industries.

Therefore, various attempts to apply the 5G communication system to the IoT network have been conducted. For example, the 5G communication technologies, such as the sensor network, the machine to machine (M2M), and the machine type communication (MTC), have been implemented by techniques such as beamforming, MIMO, and array antenna. The application of the cloud radio access network (cloud RAN) as the big data processing technology described above may also be considered as an example of the fusing of the 5G communication technology with the IoT technology.

SUMMARY

In the next generation mobile communication system, the packet data convergence protocol (PDCP) layer can use a header compression protocol for compressing a header. However, to apply the header compression protocol, the transmitting-end PDCP layer and the receiving-end PDCP layer should exchange header compression protocol information with each other and be synchronized. However, if the PDCP layer does not take into account the previous data received out of order when the PDCP entity performs the re-establishment procedure in the handover or the radio link failure (RLF) procedure, the header compression protocol may fail to perform the header decompression and cause errors.

The disclosure relates to a method and apparatus for setting uplink semi-persistent scheduling in a plurality of serving cells using one radio resource control (RRC) message in the next generation mobile communication system and specifying an activation scheme of each uplink semi-persistent scheduling. In particular, in LTE, the semi-permanent scheduling is supported only in specific cells. However, in the next generation mobile communication system, various services need to be supported, so that traffic repeatedly transmitted with low latency can be generated even in other serving cells. To this end, it may be advantageous to perform an operation of instructing uplink transmission resource allocation and periodic transmission resource use in another serving cell.

Aspects of the disclosure are not limited to the above. That is, other aspects of the disclosure that are not mentioned may be understood by those skilled in the art to which the disclosure pertains from the following description.

According to an aspect of the disclosure, there is provided a packet processing method of a terminal in a wireless communication system, including: identifying a sequence number of a received packet; buffering the received packet, wherein a sequence number of the received packet is out of sequence among a sequence order of a plurality of packets; and performing header decompression on the received packet in response to receiving a packet data convergence protocol (PDCP) re-establishment request.

The performing of the header decompression may include: receiving the PDCP re-establishment request; identifying whether the header compression protocol is configured according to the PDCP re-establishment request; and performing the header decompression on the received packet using a header compression protocol when the header compression protocol is not configured according to the PDCP re-establishment request.

The header compression protocol may include a robust header compression (ROHC).

The packet processing method of the terminal may further include: receiving a subsequent packet a compressed header that is compressed using a configured header compression protocol after the PDCP re-establishment is completed; and buffering the subsequent packet, wherein after the PDCP re-establishment is completed, the received packet includes information on the configured header compression protocol.

The packet processing method of the terminal may further include: performing the header decompression on the received packet using the configured header compression protocol after the PDCP re-establishment is completed; identifying the sequence number of the received packet including the decompressed header; and transmitting the packet including the decompressed header to an upper layer when the sequence number of the received packet including the decompressed header is sequential.

According to an aspect of the disclosure, there is provided a packet transmission method of a base station in a wireless communication system, including: transmitting to a terminal a first packet including a compressed header that is compressed using a header compression protocol; determining whether to configure the header compression protocol when a packet data convergence protocol (PDCP) re-establishment is requested; and transmitting to the terminal a second packet including a compressed header that is compressed using a configured header compression protocol after the PDCP re-establishment is completed.

After the PDCP re-establishment is completed, a second packet transmitted to the terminal may include information on the configured header compression protocol.

The first header compression protocol and the configured header compression protocol may include a robust header compression (ROHC).

According to an aspect of the disclosure, there is provided a terminal in a wireless communication system, including: a transceiver; and a controller configured to identify a sequence number of a received packet, buffer the received packet, wherein a sequence number of the received packet is out of sequence among a sequence order of a plurality of packets, and perform header decompression on the received packet in response to receiving a packet data convergence protocol (PDCP) re-establishment request.

The controller may receive the PDCP re-establishment request, identify whether the header compression protocol is configured according to the PDCP re-establishment request, and perform the header decompression on the received packet using the header compression protocol when the header compression protocol is not configured according to the PDCP re-establishment request.

The header compression protocol may include a robust header compression (ROHC).

The controller may receive a subsequent packet including a compressed header that is compressed using a configured header compression protocol after the PDCP re-establishment is completed and buffer the subsequent packet, and after the PDCP re-establishment is completed, the received packet may include information on the configured header compression protocol.

The controller may perform a header decompression on the received packet using the configured header compression protocol after the PDCP re-establishment is completed, identify the sequence number of the received packet including the decompressed header, and transmit the packet including the decompressed header to an upper layer when the sequence number of the received packet including the decompressed header is sequential.

According to an aspect of the disclosure, there is provided a base station in a wireless communication system, including: a transceiver; and a controller configured to transmit to a terminal a first packet including a compressed header that is compressed using a header compression protocol, determine whether to configure the header compression protocol is updated when a packet data convergence protocol (PDCP) re-establishment is requested, and transmit to the terminal a second packet including a compressed header that is compressed using a configured header compression protocol to the terminal after the PDCP re-establishment is completed.

After the PDCP re-establishment is completed, a second packet transmitted to the terminal may include information on the configured header compression protocol.

According to an aspect of the disclosure, there is provided a data transmission method of a terminal includes: receiving information on a uplink grant for semi-persistent scheduling (SPS) through radio resource control (RRC) signaling; and transmitting data to a base station based on the information on the uplink grant, wherein the information on the uplink grant includes at least one of information on an identifier for identifying a terminal to which the semi-persistent scheduling is applied, information on the number of HARQ processors applied to the semi-persistent scheduling, information on a period of a resource allocated for the semi-persistent scheduling, and information on a transmission format of data transmitted through the semi-persistent scheduling.

According to aspects of the disclosure, there is provided a correct PDCP entity re-establishment procedure in the next generation mobile communication system so that the errors of the header decompression failure do not occur even if the PDCP entity performs the Re-establishment procedure due to the handover, the radio link failure (RLF) or the like.

It may be necessary to activate the fast transmission resources and the pre-configured resource use for traffic demanding the low latency and the high reliability in the next generation mobile communication system, but the structure for supporting the same is not defined. According to the disclosure, it is possible to support the fast transmission resource activation and the periodic transmission in not only a specific cell but also other serving cells by proposing the method for configuring and activating the uplink semi-persistent scheduling.

The effects that may be achieved by the aspects of the disclosure are not limited to the above. That is, other effects that are not mentioned may be understood by those skilled in the art to which the disclosure pertains from the following description.

BRIEF DESCRIPTION OF THE DRAWINGS

FIG. 1F is a diagram for describing a header compression protocol (robust header compression (ROHC)) in the disclosure, according to an embodiment;

FIG. 1M is a diagram illustrating an operation when the receiving PDCP entity outdates or receives a duplicated PDCP PDU, according to an embodiment;

FIG. 1O is a diagram illustrating a structure of a terminal, according to an embodiment;

FIG. 2K is a diagram illustrating the overall operation of a terminal, according to an embodiment;

DETAILED DESCRIPTION

Figure 1A:
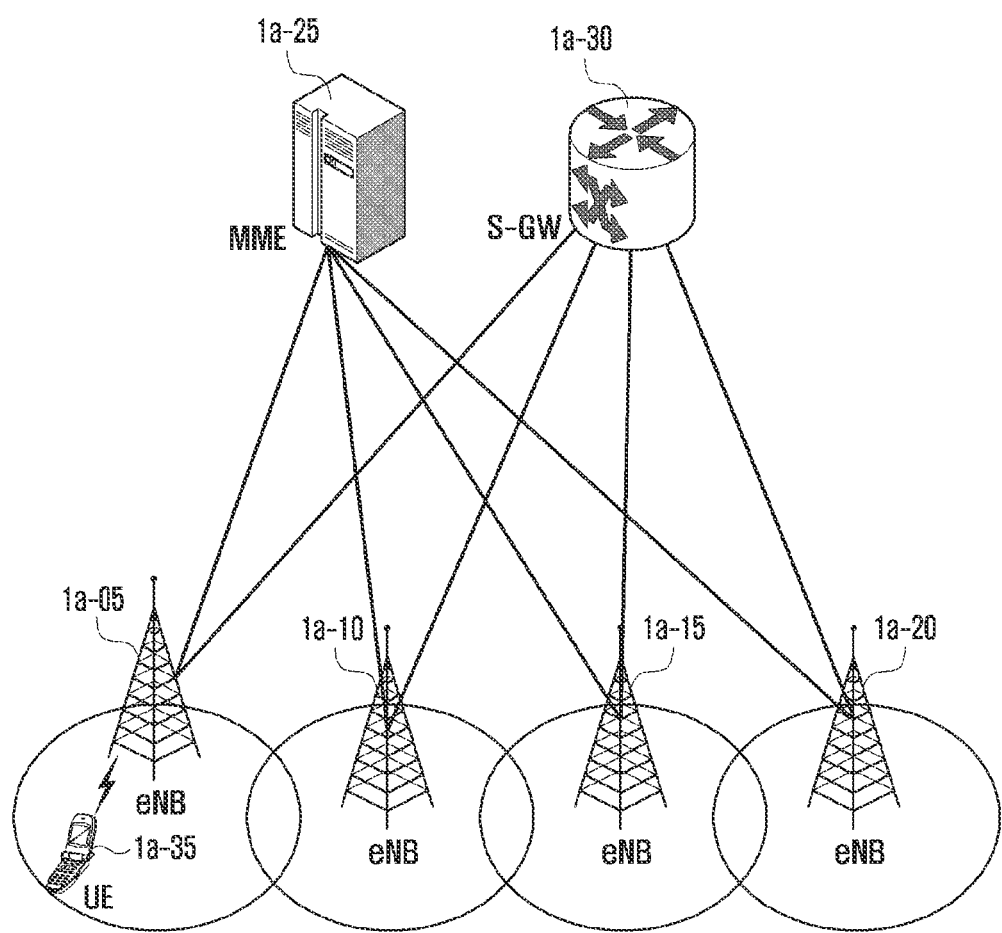
FIG. 1A is a diagram illustrating a structure of an LTE system to which the disclosure may be applied, according to an embodiment.

Hereinafter, exemplary embodiments of the disclosure will be described in detail with reference to the accompanying drawings. Like reference numerals denote like elements throughout the accompanying drawings. Further, detailed descriptions related to well-known functions or configurations are omitted to avoid unnecessarily obscuring the disclosure.

In describing the embodiments of the disclosure, a description of technical contents well known to those skilled in the art to which the disclosure belongs and are not directly connected with the disclosure will be omitted.

Some components are exaggerated, omitted, or schematically illustrated in the accompanying drawings. Further, the size of each component does not exactly reflect its real size.

Various aspects of the disclosure and methods accomplishing the same will become apparent from the following detailed description of embodiments with reference to the accompanying drawings. However, the disclosure is not limited to the embodiments disclosed herein but will be implemented in various forms. The embodiments have been described to be complete and are provided so that those skilled in the art can easily understand the scope of the disclosure.

In this case, it may be understood that each block of processing flow charts and combinations of the flow charts may be performed by computer program instructions. Because these computer program instructions may be stored in memory and executed by processors for a general computer, a special computer, or other programmable data processing apparatuses, these instructions executed by the processors for the computer or the other programmable data processing apparatuses perform functions described in block(s) of the flow charts. Because these computer program instructions may also be stored in a computer usable or computer readable memory of a computer or other programmable data processing apparatuses to implement the functions in a specific scheme, the computer program instructions stored in the computer usable or computer readable memory may also produce manufacturing articles including instruction means performing the functions described in block(s) of the flow charts. Because the computer program instructions may also be stored on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function(s). Further, functions mentioned in the blocks occur regardless of a sequence in some embodiments. For example, two blocks that are contiguously illustrated may be substantially simultaneously performed or be performed in a reverse sequence depending on corresponding functions.

Here, the term '~unit' used in the disclosure means software or hardware components such as FPGA and ASIC and the '~unit' performs any functions of an embodiment. However, the meaning of the '~unit' is not limited to software or hardware. The '~unit' may be configured to be in a storage medium that may be addressed and may also be configured to be reproduced by execution of one or more processors. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented by execution of one or more CPUs within a device or a security multimedia card.

First Embodiment

Terms identifying an access node, terms indicating network entity, terms indicating messages, terms indicating an interface between network entities, terms indicating various types of identification information, and so on, that are used in the following description are exemplified for convenience of explanation. Accordingly, the disclosure is not limited to terms to be described below and other terms indicating objects having the equivalent technical meaning may be understood.

Hereafter, for convenience of explanation, the disclosure uses terms and names defined in the 3rd generation partnership project long term evolution (3GPP LTE). However, the disclosure is not limited to the terms and names but may also be identically applied to the system according to other standards. In the disclosure, eNB or evolved NodeB can be used in combination with gNB for convenience of explanation. That is, a base station described by the eNB may represent the gNB, and the terminology thereof is not limited.

FIG. 1A is a diagram illustrating a structure of an LTE system to which the disclosure may be applied, according to an embodiment.

As illustrated in FIG. 1A, a radio access network of an LTE system is configured to include next generation base stations (evolved node B, hereinafter, ENB, Node B, or base station) 1a-05, 1a-10, 1a-15, and 1a-20, a mobility management entity (MME) 1a-25, and a serving-gateway (S-GW) 1a-30. User equipment (hereinafter, UE or terminal) 1a-35 accesses an external network, for example the Internet, through the ENBs 1a-05 to 1a-20 and the S-GW 1a-30.

In FIG. 1A, the ENBs 1a-05 to 1a-20 correspond to the existing node B of the Universal Mobile Telecommunications System (UMTS) system. The ENB is connected to the UE 1a-35 through a radio channel and performs a more complicated role than the existing node B. In the LTE system, in addition to a real-time service like a voice over Internet protocol (VoIP) through the Internet protocol, all user traffic is served through a shared channel; and therefore an apparatus for collecting and scheduling status information such as a buffer status, an available transmission power status, and a channel status of the terminals is required. Here, the ENBs 1a-05 to 1a-20 take charge of the collecting and scheduling. One ENB generally controls a plurality of cells. For example, to implement a transmission rate of 100 Mbps, the LTE system uses, as a radio access technology, orthogonal frequency division multiplexing (hereinafter, OFDM) in, for example, a bandwidth of 20 MHz. Further, an adaptive modulation and coding (hereinafter, referred to as AMC) scheme determining a modulation scheme and a channel coding rate according to a channel status of the terminal is applied. The S-GW 1a-30 is an apparatus for providing a data bearer and generates or removes the data bearer according to the control of the MME 1a-25. The MME is an apparatus for performing a mobility management function for the terminal and various control functions and is connected to a plurality of base stations.

Figure 1B:
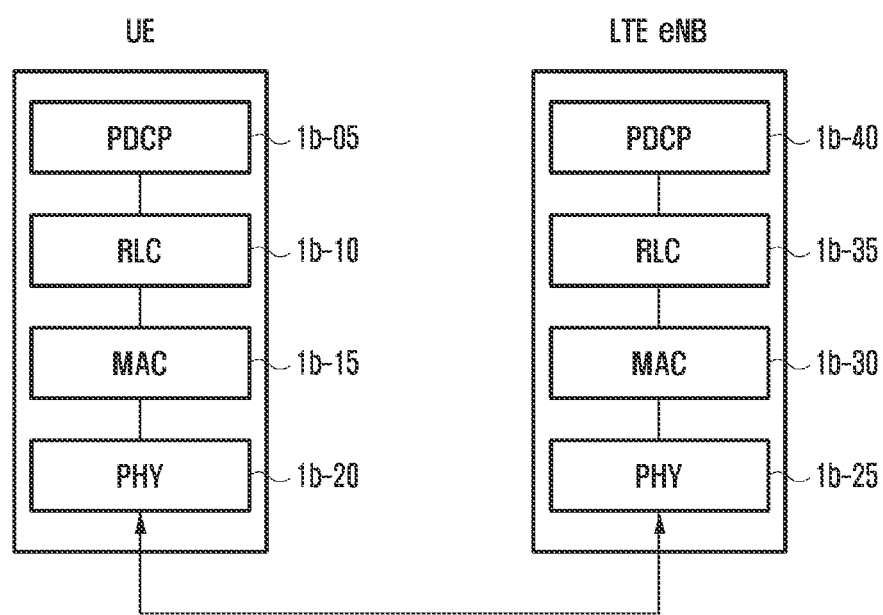
FIG. 1B is a diagram illustrating a radio protocol structure in the LTE system to which the disclosure may be applied, according to an embodiment.

FIG. 1B is a diagram illustrating a radio protocol structure in the LTE system to which the disclosure may be applied, according to an embodiment.

Referring to FIG. 1B, the radio protocol of the LTE system is configured to include packet data convergence protocols (PDCPs) 1b-05 and 1b-40, radio link controls (RLCs) 1b-10 and 1b-35, medium access controls (MACs) 1b-15 and 1b-30, and physical layers 1b-20 and 1b-25, respectively, in the terminal and the ENB, respectively. The packet data convergence protocols (PDCPs) 1b-05 and 1b-40 are in charge of operations such as IP header compression and decompression. The main functions of the PDCP are summarized as follows:

Header compression and decompression function (Header compression and decompression: ROHC only);

Transfer function of user data (Transfer of user data);

In-sequence delivery function (In-sequence delivery of upper layer PDUs at PDCP Re-establishment procedure for RLC AM);

Reordering function (For split bearers in DC (only support for RLC AM) PDCP PDU routing for transmission and PDCP PDU reordering for reception);

Duplicate detection function (Duplicate detection of lower layer SDUs at PDCP Re-establishment procedure for RLC AM);

Retransmission function (Retransmission of PDCP SDUs at handover and, for split bearers in DC, of PDCP PDUs at PDCP data-recovery procedure, for RLC AM);

Ciphering and deciphering function (Ciphering and deciphering); and

Timer-based SDU discard function (Timer-based SDU discard in uplink).

The radio link controls (hereinafter, referred to as RLCs) 1b-10 and 1b-35 reconfigure the PDCP packet data unit (PDU) to an appropriate size to perform the ARQ operation or the like. The main functions of the RLC are summarized as follows:

Data transfer function (Transfer of upper layer PDUs);

ARQ function (Error Correction through ARQ (only for AM data transfer));

Concatenation, segmentation, reassembly functions (Concatenation, segmentation and reassembly of RLC SDUs (only for UM and AM data transfer));

Re-segmentation function (Re-segmentation of RLC data PDUs (only for AM data transfer));

Reordering function (Reordering of RLC data PDUs (only for UM and AM data transfer);

Duplicate detection function (Duplicate detection (only for UM and AM data transfer));

Error detection function (Protocol error detection (only for AM data transfer));

RLC SDU discard function (RLC SDU discard (only for UM and AM data transfer)); and RLC re-establishment function (RLC Re-establishment).

The MACs 1b-15 and 1b-30 are connected to several RLC layer entities configured in one terminal and perform an operation of multiplexing RLC protocol data units (PDUs) into an MAC PDU and demultiplexing the RLC PDUs from the MAC PDU. The main functions of the MAC are summarized as follows:

Mapping function (Mapping between logical channels and transport channels);

Multiplexing/demultiplexing function (Multiplexing/demultiplexing of MAC SDUs belonging to one or different logical channels into/from transport blocks (TB) delivered to/from the physical layer on transport channels);

Scheduling information reporting function (Scheduling information reporting);

HARQ function (Error correction through HARQ);

Priority handling function between Logical channels (Priority handling between logical channels of one UE);

Priority handling function between terminals (Priority handling between UEs by means of dynamic scheduling);

MBMS service identification function (MBMS service identification);

Transport format selection function (Transport format selection); and

Padding function (Padding).

Physical layers 1b-20 and 1b-25 perform an operation of channel-coding and modulating upper layer data, making the upper layer data as an OFDM symbol and transmitting them to a radio channel, or demodulating and channel-decoding the OFDM symbol received through the radio channel and delivering the demodulated and channel-decoded OFDM symbol to the upper layer.

Figure 1C:
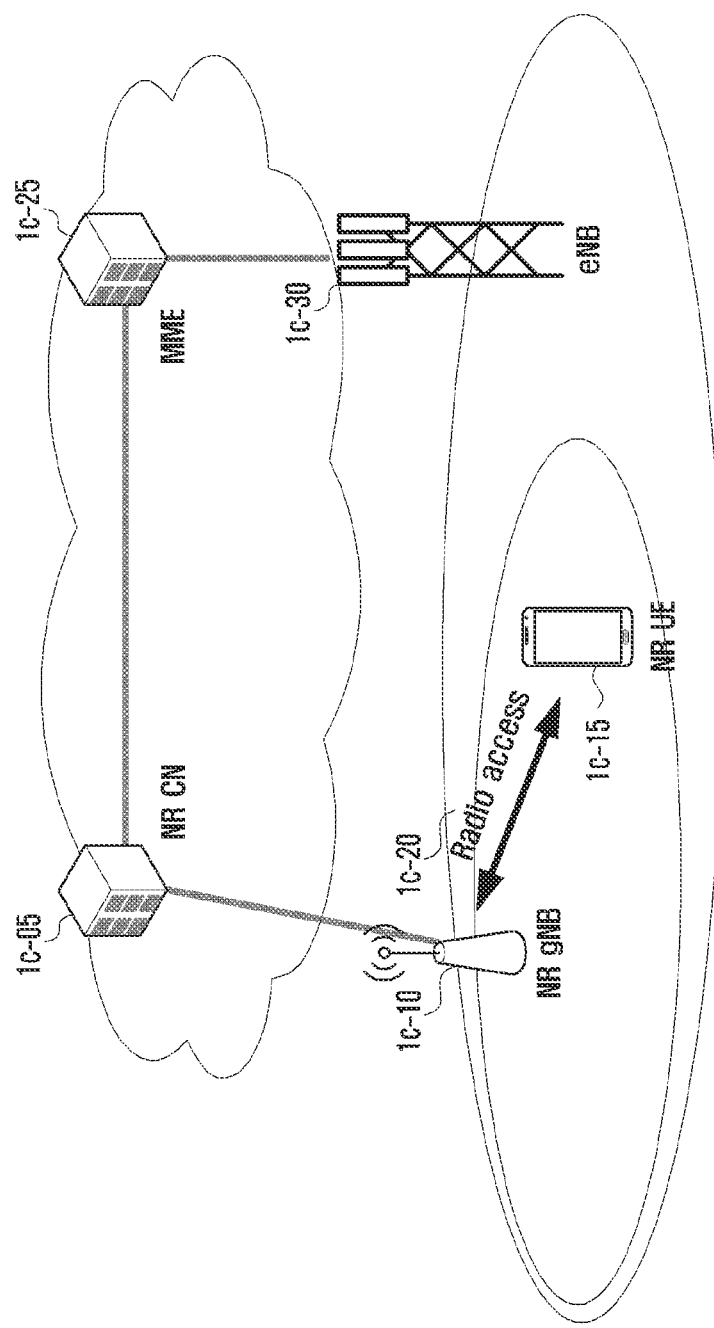
FIG. 1C is a diagram illustrating a structure of a next generation mobile communication system to which the disclosure may be applied, according to an embodiment.

FIG. 1C is a diagram illustrating a structure of a next generation mobile communication system to which the disclosure may be applied, according to an embodiment.

Referring to FIG. 1C, a radio access network of a next generation mobile communication system (hereinafter referred to as NR or 5G) is configured to include a next generation base station (New radio node B, hereinafter NR gNB or NR base station) 1c-10 and a new radio core network (NR CN) 1c-05. The user terminal (new radio user equipment, hereinafter, NR UE or UE) 1c-15 accesses the external network through the NR gNB 1c-10 and the NR CN 1c-05.

In FIG. 1C, the NR gNB 1c-10 corresponds to an evolved node B (eNB) of the existing LTE system. The NR gNB 1c-10 is connected to the NR UE 1c-15 via a radio channel and may provide a service superior to the existing node B. In the next generation mobile communication system, because all user traffic is served through a shared channel, an apparatus for collecting state information such as a buffer state, an available transmission power state, and a channel state of the UEs to perform scheduling is required. The NR gNB 1c-10 may serve as the device. One NR gNB generally controls a plurality of cells. To realize high-speed data transmission compared with the current LTE, the NR gNB may have a greater maximum bandwidth, and may be additionally incorporated into a beam-forming technology using orthogonal frequency division multiplexing (hereinafter, referred to as OFDM) as a radio access technology. Further, an adaptive modulation and coding (hereinafter, referred to as AMC) scheme determining a modulation scheme and a channel coding rate according to a channel status of the terminal is applied. The NR CN 1c-05 may perform functions such as mobility support, bearer setup, QoS setup, and the like. The NR CN is an apparatus for performing a mobility management function for the terminal and various control functions and is connected to a plurality of base stations. In addition, the next generation mobile communication system can interwork with the existing LTE system, and the NR CN is connected to the MME 1c-25 through the network interface. The MME is connected to the eNB 1c-30 which is the existing base station.

Figure 1D:
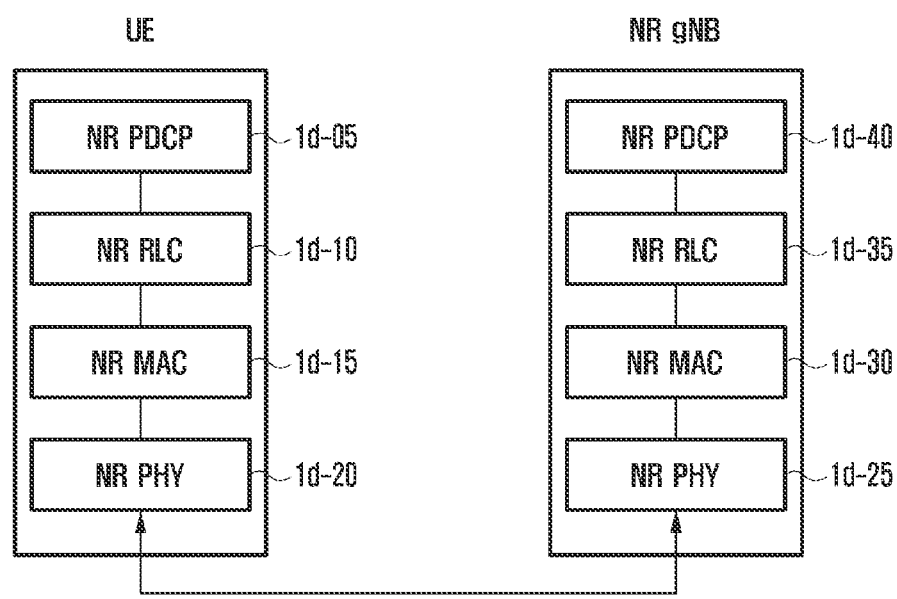
FIG. 1D is a diagram illustrating a radio protocol structure of the next generation mobile communication system to which the disclosure may be applied, according to an embodiment.

FIG. 1D is a diagram illustrating a radio protocol structure of the next generation mobile communication system to which the disclosure may be applied, according to an embodiment.

Referring to FIG. 1D, the radio protocol of the next generation mobile communication system is configured to include NR PDCPs 1d-05 and 1d-40, NR RLCs 1d-10 and 1d-35, NR MACs 1d-15 and 1d-30, and NR PHYs 1d-20 and 1d-25, respectively, in the terminal and the NR base station. The main functions of the NR PDCPs 1d-05 and 1d-40 may include some of the following functions:

Header compression and decompression function (Header compression and decompression: ROHC only);

Transfer function of user data (Transfer of user data);

In-sequence delivery function (In-sequence delivery of upper layer PDUs);

Out-of-sequence delivery function (Out-of-sequence delivery of upper layer PDUs);

Reordering function (PDCP PDU reordering for reception);

Duplicate detection function (Duplicate detection of lower layer SDUs);

Retransmission function (Retransmission of PDCP SDUs);

Ciphering and deciphering function (Ciphering and deciphering); and

Timer-based SDU discard function (Timer-based SDU discard in uplink).

In this case, the reordering function of the NR PDCP entity refers to a function of rearranging PDCP PDUs received in a lower layer in order based on a PDCP sequence number (SN) and may include a function of delivering data to an upper layer in the rearranged order, a function of directly transferring data without considering an order, a function of recording PDCP PDUs lost by rearranging an order, a function of reporting a state of the lost PDCP PDUs to a transmitting side, and a function of requesting a retransmission of the lost PDCP PDUs.

The main functions of the NR RLCs 1*d*-10 and 1*d*-35 may include some of the following functions:

Data transfer function (Transfer of upper layer PDUs);
In-sequence delivery function (In-sequence delivery of upper layer PDUs);
Out-of-sequence delivery function (Out-of-sequence delivery of upper layer PDUs);
ARQ function (Error correction through ARQ);
Concatenation, segmentation, reassembly function (Concatenation, segmentation and reassembly of RLC SDUs);
Re-segmentation function (Re-segmentation of RLC data PDUs);
Reordering function (Reordering of RLC data PDUs);
Duplicate detection function (Duplicate detection);
Error detection function (Protocol error detection);
RLC SDU discard function (RLC SDU discard); and
RLC Re-establishment function (RLC Re-establishment).

In the above description, the in-sequence delivery function of the NR RLC apparatus refers to a function of delivering RLC SDUs received from a lower layer to an upper layer in order, and may include a function of reassembling and delivering an original RLC SDU that is divided into a plurality of RLC SDUs and received, a function of rearranging the received RLC PDUs based on the RLC sequence number (SN) or the PDCP sequence number (SN), a function of recording the RLC PDUs lost by the reordering, a function of reporting a state of the lost RLC PDUs to the transmitting side, a function of requesting a retransmission of the lost RLC PDUs, a function of delivering only the RLC SDUs before the lost RLC SDU to the upper layer in order when there is the lost RLC SDU, a function of delivering all the received RLC SDUs to the upper layer in order before a predetermined timer starts if the timer expires even if there is the lost RLC SDU, or a function of delivering all the RLC SDUs received until now to the upper layer in order if the predetermined timer expires even if there is the lost RLC SDU. Further, the NR RLC may process the RLC PDUs in the received order (in order of arrival regardless of the order of a sequence number and the sequence number), and may deliver the processed RLC PDUs to the PDCP entity in the out-of-sequence order. In the case of the segment, the NR RLC may receive the segments stored in the buffer or to be later received and reconfigure the RLC PDUs into one complete RLC PDU and then deliver the complete RLC PDU to the PDCP entity. The NR RLC layer may not include the concatenation function and may perform the function in the NR MAC layer or may be replaced by the multiplexing function of the NR MAC layer.

In this case, the out-of-sequence delivery function of the NR RLC apparatus refers to a function of directly delivering the RLC SDUs received from the lower layer to the upper layer regardless of order. The NR RLC apparatus may include a function of reassembling and delivering an original RLC SDU that is divided into several RLC SDUs and received, and a function of storing and reordering the RLC SN or the PDCP SN of the received RLC PDUs to record the missed (lost) RLC PDUs.

The NR MACs 1*d*-15 and 1*d*-30 may be connected to several NR RLC layer apparatus configured in one terminal, and the main functions of the NR MAC may include some of the following functions:

Mapping function (Mapping between logical channels and transport channels);
Multiplexing and demultiplexing function (Multiplexing/demultiplexing of MAC SDUs);
Scheduling information reporting function (Scheduling information reporting);
HARQ function (Error correction through HARQ);
Priority handling function between Logical channels (Priority handling between logical channels of one UE);
Priority handling function between terminals (Priority handling between UEs by means of dynamic scheduling);
MBMS service identification function (MBMS service identification);
Transport format selection function (Transport format selection); and
Padding function (Padding).

The NR PHY layers 1*d*-20 and 1*d*-25 may perform an operation of channel-coding and modulating upper layer data, making the upper layer data as an OFDM symbol and transmitting them to a radio channel, or demodulating and channel-decoding the OFDM symbol received through the radio channel and delivering the demodulated and channel-decoded OFDM symbol to the upper layer.

Figure 1E:
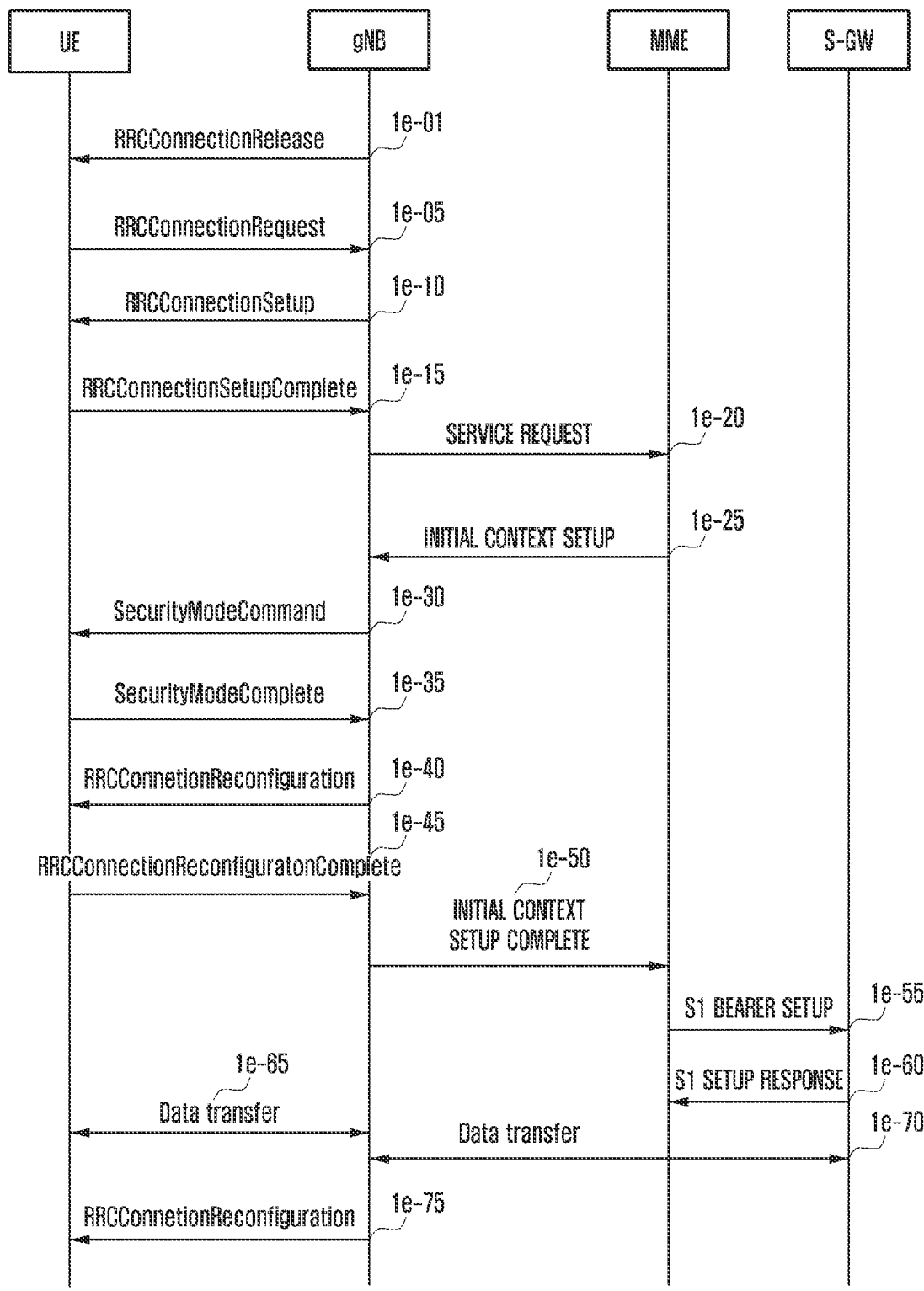
FIG. 1E is a diagram for describing a procedure for establishing a connection to a network by switching a terminal from an RRC idle mode to an RRC connected mode in the disclosure, according to an embodiment.

FIG. 1E is a diagram for describing a procedure for establishing a connection to a network by switching a terminal from an RRC idle mode to an RRC connected mode in the disclosure, according to an embodiment.

In FIG. 1E, the base station can transmit an RRCConnectionRelease message to the terminal if the terminal transmitting and receiving data does not transmit or receive data for a predetermined time in the RRC connected mode to switch the terminal to RRC idle mode (1*e*-01). If the terminal (hereinafter, idle mode UE) that is not currently connected generates data to be later transmitted, the terminal performs an RRC connection setup procedure with the base station. The terminal establishes uplink transmission synchronization with the base station through a random access procedure and transmits an RRCConnectionRequest message to the base station (1*e*-05). The message includes establishmentCause of connection with the identifier of the terminal. The base station transmits an RRCConnectionSetup message to allow the terminal to set the RRC connection (1*e*-10). The message includes configuration information for each service/bearer/each RLC apparatus or each logical channel or each bearer, and may include information on whether to use the ROHC for each bearer/logical channel, the ROHC configuration information (for example, ROHC version, initial information or the like), statusReportRequired information (information that the base station indicates the PDCP status report to the terminal), drb-ContinueROHC information (configuration information indicating that the ROHC configuration information is maintained in a current configuration and may be transmitted by being included in the MobilityControlInfo message), an indicator (delayedRetransmission) that receives and retransmits a PDCP status report when the retransmission is performed at the time of the handover, and so on. The RRCConnectionSetup message includes the RRC connection establishment information, etc. The RRC connection is also called a signaling radio bearer (SRB) and is used for transmission and reception of the RRC message that is a control message between the terminal and the base station. The terminal establishing the RRC connection transmits an RRCConnectionSetupComplete message to the base station (1*e*-15). The message includes a control message called a service request that allows the terminal to request a bearer setup for a predetermined service to the MME. The base station (BS) transmits a service request message included in the RRCConnectionSetupComplete message to the MME (1*e*-20)

and the MME determines whether to provide the service that the UE requests. As the determination result, if the MME decides to provide the service that the terminal requests, the MME transmits an initial context setup request message to the base station (1e-25). The initial context setup request message may include information such as quality of service (QoS) information to be applied when setting up a data radio bearer (DRB) and security related information (e.g., security key, security algorithm) to be applied to the DRB. The base station exchanges a SecurityModeCommand message 1e-30 and a SecurityModeComplete message 1e-35 with the terminal to establish security. When the security establishment is completed, the base station transmits an RRCConnectionReconfiguration message to the UE (1e-40). The message includes configuration information for each service/bearer/ each RLC apparatus or each logical channel or each bearer, and may include information on whether to use the ROHC for each bearer/logical channel, the ROHC configuration information (for example, ROHC version, initial information or the like), statusReportRequired information (information that the base station indicates the PDCP status report to the terminal), drb-ContinueROHC information (configuration information indicating that the ROHC configuration information is maintained in a current configuration and may be transmitted by being included in the MobilityControlInfo message), an indicator (delayedRetransmission) that receives and retransmits a PDCP status report when the retransmission is performed at the time of the handover, and so on. In addition, the message includes the configuration information of the DRB in which user data are processed, and the UE applies the information to setup the DRB and transmits an RRCConnectionReconfigurationComplete message to the BS (1e-45). The base station that completes the DRB setup with the terminal transmits an initial context setup complete message to the MME (1e-50) and the MME receiving the message exchanges an S1 bearer setup message and an S1 bearer setup response message with the S-GW to setup an S1 bearer (1e-55 and 1e-60). The S1 bearer is a data transmission connection established between the S-GW and the base station and corresponds to a DRB on a one-to-one basis. If all of the procedures are completed, the terminal transmits data to and receives data from the BS through the S-GW (1e-65 and 1e-70). As described above, the normal data transmission procedure largely consists of three stages: RRC connection setup, security setup, and DRB setup. In addition, the base station may transmit an RRCConnectionReconfiguration message to renew, add, or change the configuration to the terminal for a predetermined reason (1e-75). The message includes configuration information for each service/bearer/each RLC apparatus or each logical channel or each bearer, and may include information on whether to use the ROHC for each bearer/logical channel, the ROHC configuration information (for example, ROHC version, initial information or the like), statusReportRequired information (information the base station indicates that the PDCP status report to the terminal), drb-ContinueROHC information (configuration information indicating that the ROHC configuration information is maintained and used as it is and may be transmitted by being included in the MobilityControlInfo message), an indicator (delayedRetransmission) that receives and retransmits a PDCP status report when the retransmission is performed at the time of the handover, and so on.

FIG. 1F is a diagram for describing a header compression protocol (robust header compression (ROHC)) in the disclosure, according to an embodiment.

The reason for applying the header compression protocol (ROHC) as shown in 1f-05 and 1f-10 in FIG. 1F is that the header overhead of the IP packet can be greatly reduced. For example, assuming that an IPv6 header is used, the IP header 1f-05 having a size of 60 bytes can be compressed into a header 1f-10 having a size of 2 bytes or 4 bytes. The header compression method of the ROHC protocol is not a method for using compression coding or source coding. That is, according to a method for compressing a header in the ROHC protocol, the transmitting PDCP entity and the receiving PDCP entity share the overall header information (source IP address, destination IP address, TCP/IP sequence number, or the like) of the IP header and the configuration information (context identifier (CID)) of the ROHC protocol. The overall information is transmitted by being included in an initialization and refresh state packet (IR) packet, and the transmitting PDCP entity transmits the overall information to the receiving PDCP entity by piggybacking on the PDCP data PDU and the receiving PDCP entity receives and shares the overall information. Most of this shared information is fixed information (source IP address, destination IP address, etc.) that does not change until the connection is Re-established, and there are only a few dynamically changing information (context identifier (CID), TCP/IP sequence number, etc.). Therefore, after the entire header information and the ROHC protocol configuration information are shared once, the transmitting PDCP entity transmits only the dynamically changed information to the receiving PDCP entity. Therefore, instead of transmitting the entire information of the IP header, only the changed information is transmitted, thereby reducing, compressing and transmitting the header overhead. Accordingly, the ROHC protocol can be normally operated only when the receiving PDCP entity normally receives the IR packet.

The header compression protocol can be applied in the PDCP entity, and if the entire IP header information and the ROHC protocol information are shared but are not synchronized between the transmitting-end PDCP entity 1f-15 and the receiving-end PDCP entity 1f-20, the ROHC protocol may not be used normally. That is, even if the IP header is compressed and transmitted by the transmitting-end, the receiving-end cannot decompress the IP header.

Accordingly, the transmitting PDCP entity 1f-15 first transmits the IR packet 1f-25 including the entire IP header information and the ROHC protocol information to the receiving-end, and the receiving PDCP entity 1f-35 receives the IR packet 1f-25 and completes a synchronization with the transmitting PDCP entity 1f-15. Thereafter, for the IP packet 1f-30, the ROCH protocol compresses and transmits the header. The receiving-end PDCP entity performs the procedure of decompressing the ROHC compression header.

Figure 1G:
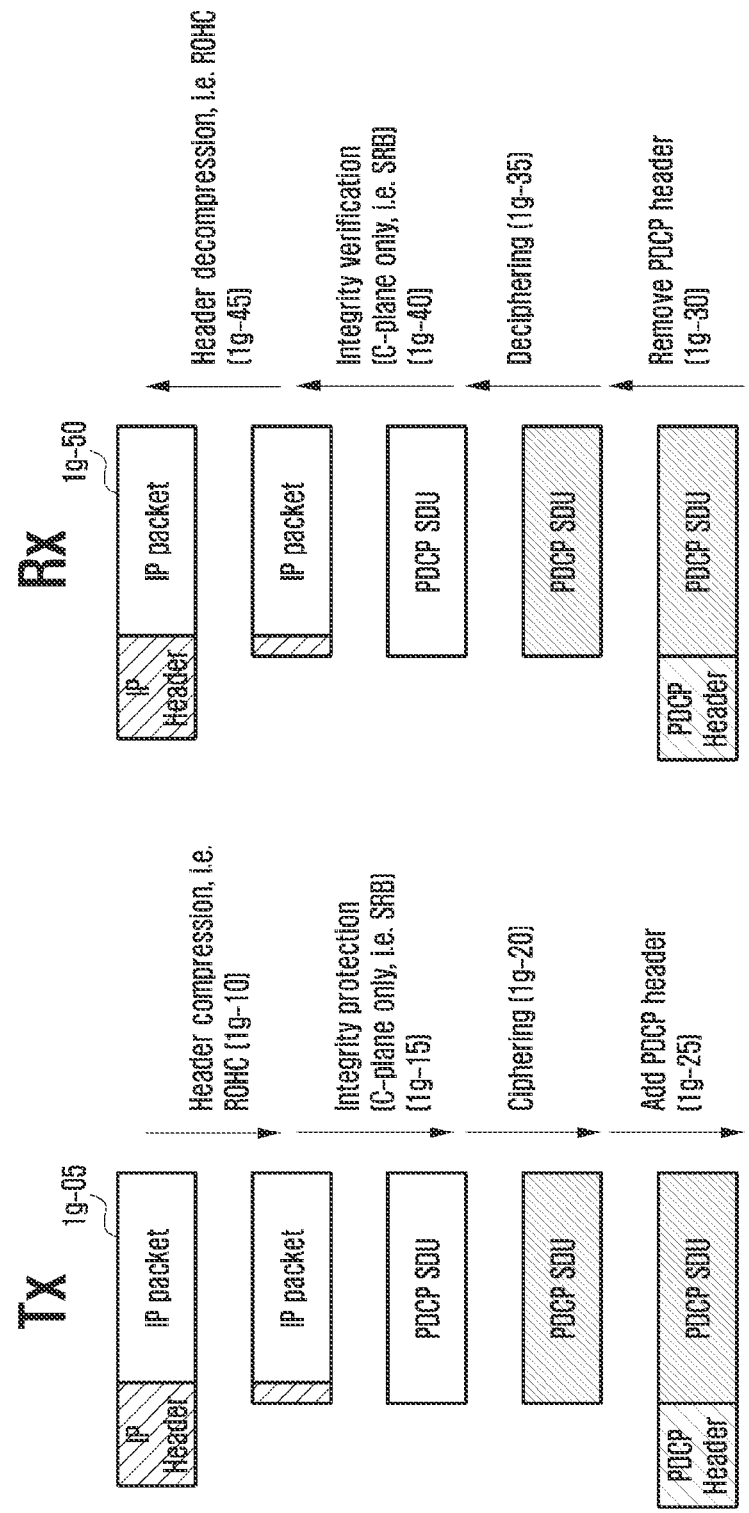
FIG. 1G is a diagram for describing a data processing procedure of a transmitting PDCP entity and a receiving PDCP entity in the disclosure, according to an embodiment.

FIG. 1G is a diagram for describing a data processing procedure of a transmitting PDCP entity and a receiving PDCP entity in the disclosure, according to an embodiment.

If the IP packet arrives at the transmitting PDCP entity 1g-05, the PDCP entity performs the header compression on the IP header when the ROHC protocol is used (1g-10) and performs integrity protection on control plane data (or SRB) (1g-15). The ciphering is performed on the data using the security key and the COUNT value (1g-20). The PDCP sequence number is allocated, the header field corresponding to the data (control plane data or user plane data) is formed, and the header is delivered to the lower layer while attached to the ciphered data (1g-25).

Upon receiving the PDCP PDU from the lower layer, the receiving PDCP entity reads the PDCP sequence number and the header field of the PDCP header and removes the header (1g-30). The deciphering is performed on the data from which the header is removed using the security key and the COUNT value (1g-35). The integrity verification is performed on the control plane data (or SRB) (1g-40). If the header is compressed by the ROHC protocol, the header is decompressed and the original IP header is restored (1g-45). In addition, the restored IP packet (1g-50) is delivered to the upper layer.

Throughout the disclosure, an order refers to an ascending order. In the disclosure, the performance of the header decompression refers to that the header compression protocol (ROHC) includes the procedure of identifying the header of the TCP/IP packet or the upper layer packet, and if the packet is an IR packet, the operation of identifying the information of the IR packet and updating the configuration information of the header compression protocol depending on the information is included. In addition, the performance of the header compression refers to that the configuration information of the header compression protocol is identified to perform the decompression and the decompressed header is restored.

The transmitting-end PDCP entity and the receiving-end PDCP entity described in the disclosure may refer to that each PDCP entity may be an apparatus belonging to the terminal or an apparatus belonging to the base station, depending on the downlink scenario and the uplink scenario. That is, in the uplink scenario, the transmitting-end PDCP entity refers to the terminal apparatus and the receiving-end PDCP entity refers to the base station apparatus. In addition, in the downlink scenario, the transmitting-end PDCP entity refers to the base station apparatus and the receiving-end PDCP entity refers to the terminal apparatus. The re-establishment procedure of the transmitter-end PDCP entity and the receiver-end PDCP entity proposed in the disclosure may be applied to all the scenarios, and the operation of the proposed transmitting-end PDCP entity and the operation of the receiver-end PDCP entity may also be applied to all the scenarios.

Figure 1H:
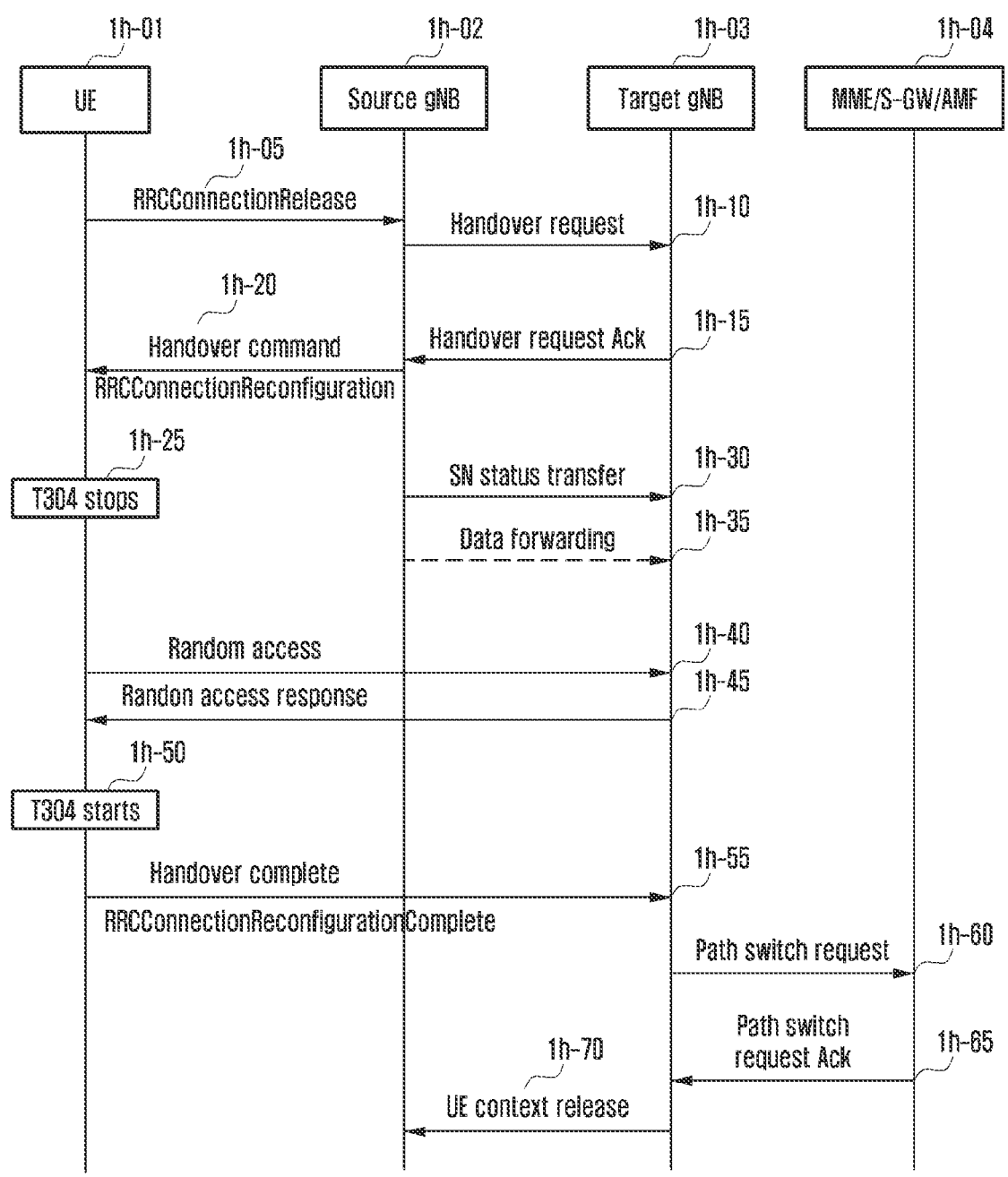
FIG. 1H is a diagram for describing a handover procedure in a next generation mobile communication system, according to an embodiment.

FIG. 1H is a diagram for describing a handover procedure in a next generation mobile communication system, according to an embodiment.

The terminal 1h-01 in the connected mode state reports the cell measurement information to a source base station (source eNB) 1h-02 when the periodic or specific event is satisfied (1h-05). Based on the measurement information, the source base station determines whether to perform a handover to neighboring cells by the terminal. The handover is a technology of changing the source base station providing the service to the terminal in the connected mode state to another base station (or other cells in the same base station). When the source base station determines to perform a handover, the source base station sends a handover (HO) request message to a new base station, i.e., a target base station (target eNB) 1h-03 that provides a service to the terminal to request the handover (1h-10). If the target base station accepts the handover request, the target base station transmits the HO request acknowledgement (ACK) message to the source base station (1h-15). The source base station receiving the message transmits an HO command message to the terminal (1h-20). The source base station delivers the HO command message to the terminal using the RRC ConnectionReconfiguration message (1h-20). When the terminal receives the message, the terminal stops transmitting data to and/or receiving data from the source base station and starts a T304 timer (1h-25). If the handover of the terminal to the target base station fails for a predetermined time, the T304 returns to the original establishment of the terminal and switches to the RRC Idle state. The source base station transmits a sequence number (SN) status for the uplink/downlink data (1h-30) and delivers the data to the target base station if there is downlink data (1h-35). The terminal attempts random access to the target cell 1h-03 indicated by the source base station (1h-40). The random access is to fit the uplink synchronization simultaneously with notifying a target cell that the terminal moves through the handover. For the random access, the terminal transmits the preamble corresponding to the preamble ID received from the source base station or the randomly selected preamble ID to the target cell. After a certain number of subframes have passed after the preamble is transmitted, the terminal monitors whether a random access response (RAR) is transmitted from the target cell. The time period in which the monitoring is performed is referred to as a random access response window (RAR window). If the RAR is received during the specific time (1h-45), the terminal transmits a HO complete message in an RRCConnectionReconfiguration-Complete message to the target base station (1h-55). Upon successfully receiving the random access response from the target base station as described above, the terminal ends the T304 timer (1h-50). The target base station requests the source base station 1h-04 to switch the path to switch the configured path of the bearers (1h-60) and receives the response to the path switch request (1h-65). The target base station notifies the source base station to delete the UE context of the terminal (1h-70). Accordingly, the terminal attempts to receive data from the RAR window starting time for the target base station, and receives the RAR and then starts the transmission to the target base station while transmitting the RRCConnectionReconfigurationComplete message.

Figure 1I:
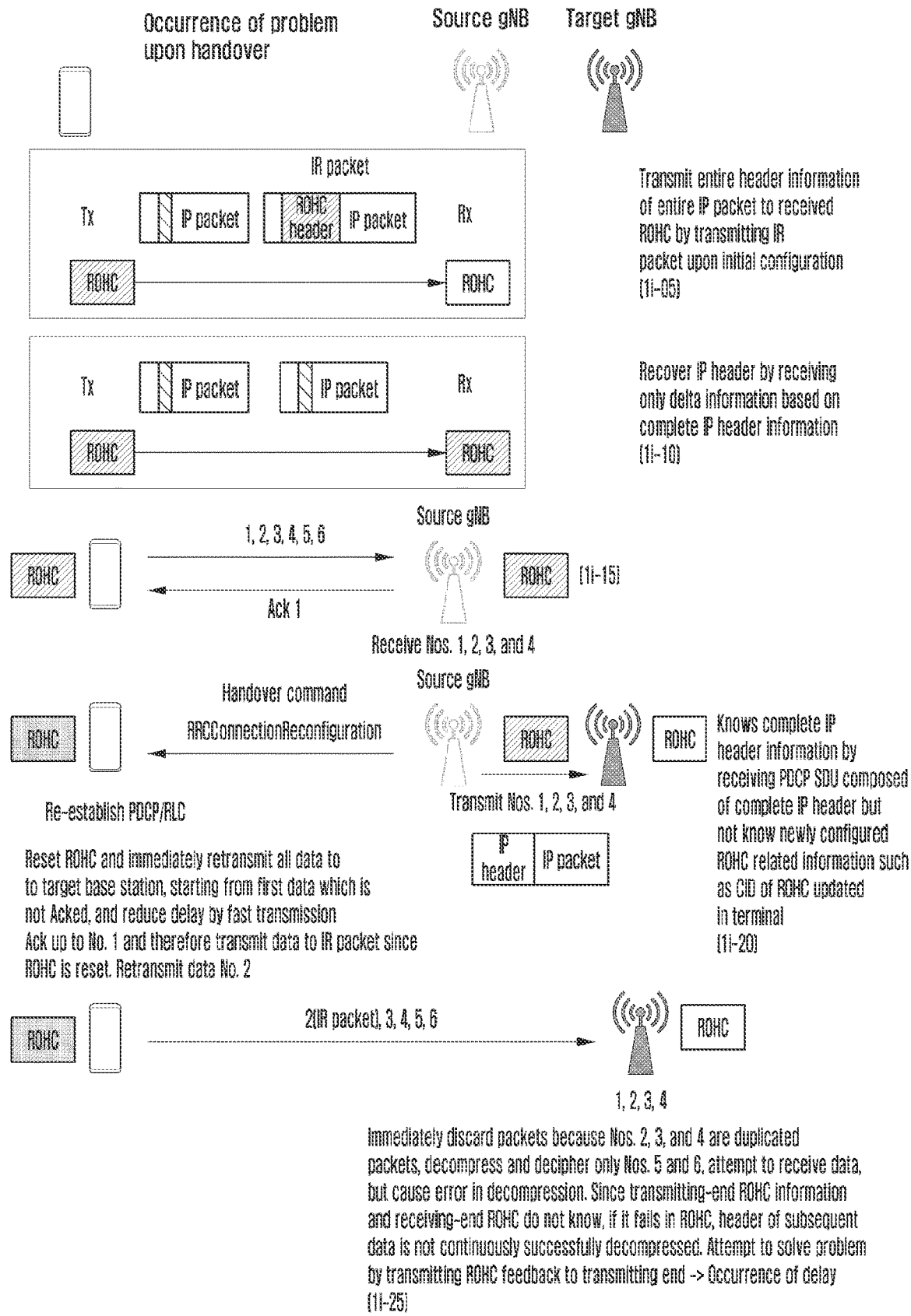
FIG. 1I is a diagram for describing a scenario in which a decompression error occurs in a receiving-end PDCP entity when a transmitting-end PDCP entity and the receiving-end PDCP entity are using the ROHC protocol in the handover procedure as illustrated in FIG. 1H, according to an embodiment.

FIG. 1I is a diagram for describing a scenario in which a decompression error occurs in a receiving-end PDCP entity when a transmitting-end PDCP entity and the receiving-end PDCP entity are using the ROHC protocol in the handover procedure as illustrated in FIG. 1H, according to an embodiment.

If the out of delivery indicator is not configured in the RRC message and the terminal having the receiving PDCP entity (AM DRB, AM data radio bearer) connected to or configured with the RLC apparatus supporting the AM mode configures the connection to the source base station and receives the configuration from the base station to use the ROHC protocol prior to transmitting data (configurable as the RRC message like 1e-10, 1e-40, and 1e-75 in FIG. 1E), the terminal completes the bearer configuration and the ROHC protocol configuration and configures and transmits the IR packet, and the receiving-end PDCP entity receives the IR packet and synchronizes the ROHC protocol with the transmitting-end. That is, the receiving PDCP entity identifies and stores the entire header information of the IP packet header and the ROHC protocol-related configuration information, and decompresses the header compressed by the ROHC protocol (1i-05).

If the synchronization between the ROHC protocol of the transmitting-end PDCP entity and the ROHC protocol of the receiving-end PDCP entity is completed in step 1i-05, the transmitting-end compresses the IP packet header using the ROHC protocol and the receiving-end ROHC protocol may decompress and recover the transmitted data and transmit the transmitted data to the upper layer (1i-10).

In this scenario, it is assumed that the terminal transmits data corresponding to the PDCP sequence Nos. 1, 2, 3, 4, 5 and 6 to the base station, the base station actually successfully receives the PDCP sequence number 1 and then successfully receives only the PDCP sequence number 2, 3 and 4, and the terminal receives the RLC ACK corresponding to the PDCP sequence number 1 (1i-15).

In this scenario, when the terminal receives the handover command from the source base station, the terminal re-establishes the PDCP (PDCP Re-establishment) entity. The re-establishment of the PDCP entity resets the ROHC protocol and performs the retransmission to the target base station successively starting from the first PDCP sequence number in which the ACK is not acknowledged from the lower layer. The source base station delivers the data received from the terminal to the target base station (1i-20). Because the target base station also newly configures the ROHC protocol for the PDCP entity corresponding to the terminal, the target base station is not synchronized with the ROHC protocol of the terminal PDCP entity.

In the above scenario, the terminal completes the connection setup to the target base station and configures the IR packet including the entire header information and the ROHC protocol configuration information to synchronize the ROHC protocol of the PDCP entity and the ROHC protocol of the PDCP entity of the target base station, and thus transmits the IR packet by piggybacking the IR packet on data number 2, which is a first PDCP sequence number that has not received ACK from the lower layer, and performs the retransmission even in PDCP sequence Nos. 3, 4, 5, and 6 (1i-25). In the above description, the IP headers of the IP packets corresponding to the PDCP sequence Nos. 3, 4, 5, and 6 may be compressed by the ROHC protocol.

However, because the target base station has already received the data for the PDCP sequence Nos. 1, 2, 3, and 4 (received from the source base station), the target base station considers the data as a duplicate packet to discard the data immediately (in addition, the same problem may occur for the outdated packet instead of the duplicated packet). Therefore, because the IR packet is lost, the ROHC protocol of the PDCP entity of the target base station is not synchronized with the ROHC protocol of the PDCP entity of the terminal, the target base station may not perform decompression on data received by being later compressed by the ROHC protocol, thereby causing the decompression error. In this way, the ROHC protocol of the receiving-end PDCP entity transmits the ROHC feedback to perform the synchronization, and a delay occurs in this process.

Figure 1J:
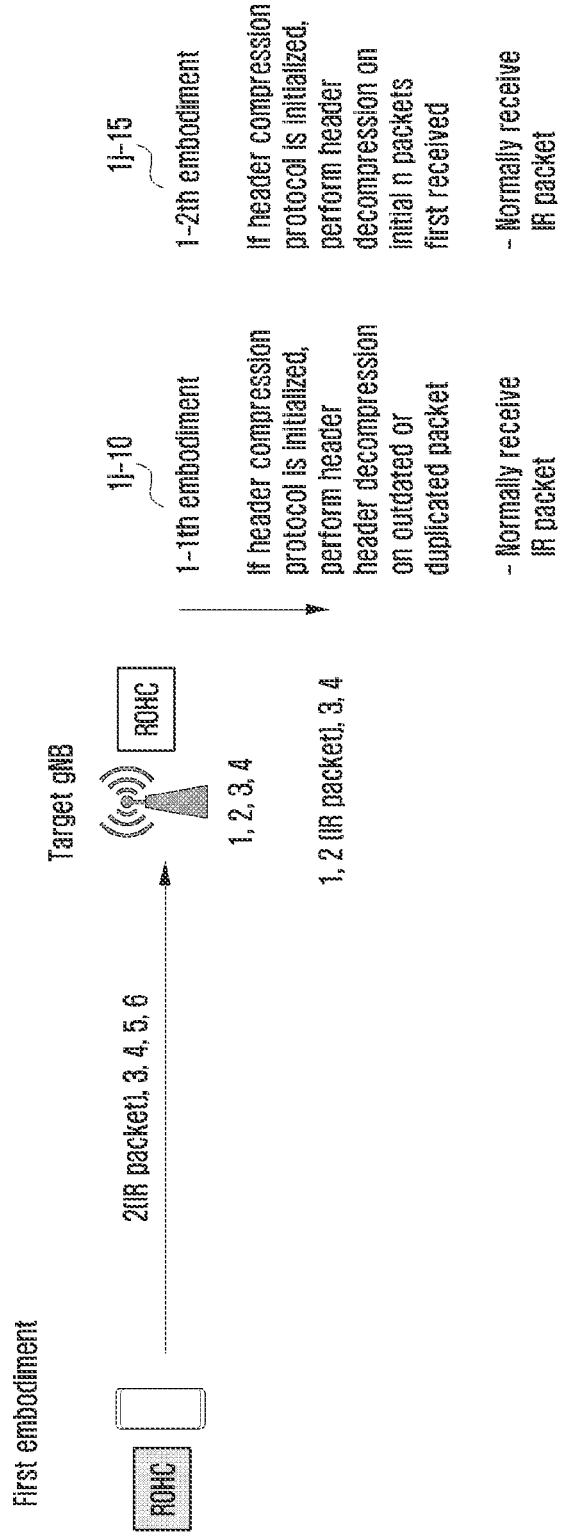
FIG. 1J is a diagram for describing an embodiment for solving the problems as shown in FIG. 1I in the next generation mobile communication system according to an embodiment.

FIG. 1J is a diagram for describing an embodiment for solving the problems as shown in FIG. 1I in the next generation mobile communication system according to an embodiment.

Although the problem has been described with reference to the example of the uplink in FIG. 1I, the same problem may occur in the downlink. That is, in FIG. 1I, the terminal may be the source base station or the target base station, and the source base station or the target base station may operate as one base station, and thus the same problem may occur in the handover process or the PDCP re-establishment process in the downlink. Therefore, the methods proposed with respect to the uplink may be applied to both the uplink and the downlink.

In other words, in the uplink is described as an example, the terminal describes the operation of the transmitting PDCP entity, and the base station describes the operation of the receiving PDCP entity. Therefore, in the case of the downlink, the base station can perform the operation of the transmission PDCP entity, and the terminal may perform the operation of the receiving PDCP entity. That is, the operation of the transmitting PDCP entity and the operation of the receiving PDCP entity proposed in the disclosure can be applied to both the uplink and the downlink.

FIG. 1J is a diagram for describing an embodiment for solving the problems as shown in FIG. 1I in the next generation mobile communication system according to an embodiment.

In FIG. 1J, the terminal receives the handover command from the base station, performs the PDCP re-establishment procedure, performs the handover to the target base station (BS), and then retransmits a first PDCP PDU, for which ACK is not acknowledged, in order from the lower layer. Therefore, even if the target base station has already received data corresponding to the PDCP sequence Nos. 2, 3, and 4, because the ACK is received only for the PDCP sequence number 1, the target base station performs transmission from the PDCP sequence number 2. Therefore, the ROHC protocol of the transmitting-end PDCP entity transmits the IR packet by piggybacking the IR data on the data corresponding to the PDCP sequence number 2 (because the IR packet is an important packet for resetting and configuring the ROHC protocol, the IR packet can be transmitted by being piggybacked on the data corresponding to the PDCP sequence Nos. 3 and 4 according to the implementation).

In 1j-10, if the ROHC protocol (header compression protocol) is reset, for example, if there is no context state of a unidirectional mode (U mode), the receiving-end PDCP entity may decipher the packet without being immediately discarded even if the packet is outdated or duplicated, perform the integrity verification, and perform the header decompression to normally receive the IR packet without losing the IR packet. The above operation may be performed so that the receiving ROHC protocol is performed in the no context (NC) state or a static context (SC) state of the unidirectional mode (U mode), a bidirectional optimistic mode (O mode), or a bidirectional reliable mode (R mode). That is, the receiving-end PDCP entity deciphers even the outdated packet or the duplicated packet without immediately discarding the packet, performs the integrity verification, and performs the header decompression. Therefore, even if the IR packet is piggybacked on the duplicated packet, the receiving-end PDCP entity may receive the IR packet to identify the entire header information and the ROHC protocol configuration information and complete the synchronization with the transmitting-end ROHC protocol. Therefore, the header compressed PDCP PDUs transmitted from the transmitting-end can be successfully decompressed by the header (1j-10).

In 1j-15, if the ROHC protocol (header compression protocol) is reset or the PDCP entity re-establishment is performed, the receiving-end PDCP entity can perform the header decompression procedure on N packets first received. That is, the receiving-end PDCP entity may perform the PDCP re-establishment procedure irrespective of whether data are outdated data or duplicated PDCP PDUs data or performs the header decompression procedure on the n PDCP PDUs first received after resetting the header compression protocol, such that the IR packet can be prevented from being lost. The quantity of N packets can be adjusted according to the implementation, and may be commonly set to one value in a standard manner. In addition, the quantity of N packets can also be set by using RRC message (i.e., a specific N value can be indicated in the RRC message).

Figure 1K:
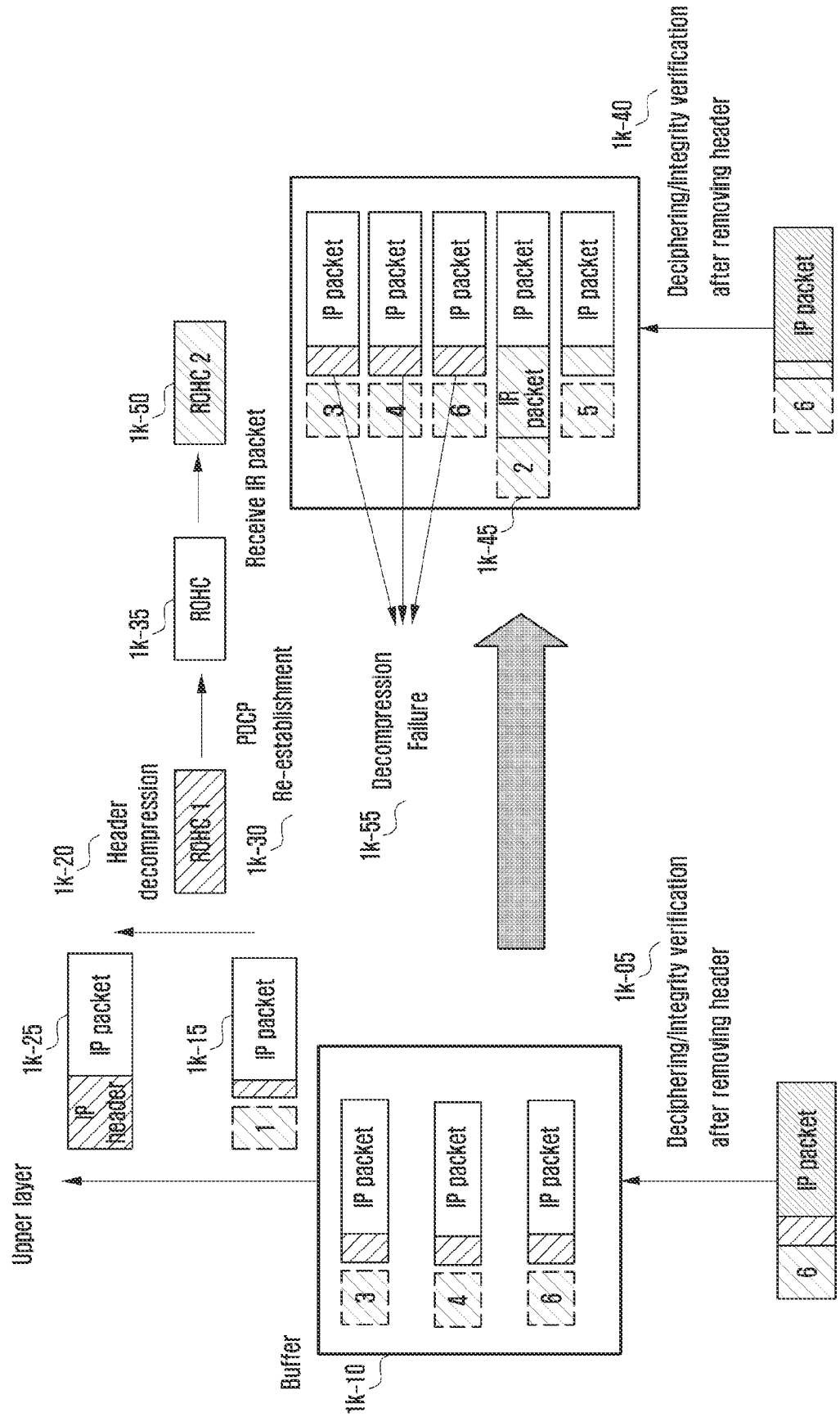
FIG. 1K is a diagram for describing another scenario in which a decompression error occurs in a receiving-end PDCP entity when a transmitting-end PDCP entity and the receiving-end PDCP entity are using the ROHC protocol in the handover procedure as illustrated in FIG. 1H, according to an embodiment.

FIG. 1K is a diagram for describing another scenario in which a decompression error occurs in a receiving-end PDCP entity when a transmitting-end PDCP entity and the receiving-end PDCP entity are using the ROHC protocol in the handover procedure as illustrated in FIG. 1H, according to an embodiment.

The out-of-delivery indicator is not configured in the RRC message, and the receiving PDCP entity (AM DRB, AM data radio bearer) connected to or configured with the RLC apparatus supporting the AM mode may receive the PDCP PDUs corresponding to PDCP sequence Nos. 0, 1, 3, 4, and 6. Because the out of deliver delivery is not indicated, the receiving PDCP entity removes and deciphers the PDCP header for the PDCP PDUs corresponding to Nos. 0 and 1 and performs the integrity verification on the PDCP header, and may perform the header decompression on the packets using the header compression protocol configured by the first header compression protocol and deliver the PDCP PDUs corresponding to Nos. 0 and 1 to the upper layer (1$k$-05, 1$k$-15, 1$k$-20, and 1$k$-25). In the above description, the first header compression protocol configuration means the configuration information configured by first resetting the header compression protocol configuration and then receiving the IR packet. For the PDCP PDUs corresponding to the PDCP sequence Nos. 3, 4, and 6 that have not been received in order, the header is removed and stored in the buffer (1$k$-10).

Thereafter, if the base station determines to handover, the receiving PDCP entity may perform the PDCP entity re-establishment procedure (1$k$-30). In the above description, if the receiving PDCP entity performs the PDCP entity re-establishment, the header compression protocol (ROHC) is reset.

If the PDCP PDUs corresponding to PDCP sequence Nos. 2 and 5 are later received, the receiving PDCP entity may remove and decipher the header and perform the integrity verification on the header when receiving the PDCP PDU corresponding to No. 2, perform the header decompression to identify the IR packet and use the new header compression protocol configuration information to configure the second header compression protocol (1$k$-40, 1$k$-45, and 1$k$-50). Because the PDCP PDUs corresponding to No. 2 are received in the above, the header decompression procedure may be performed on packets corresponding to Nos. 3 and 4 in order, and the packets may be delivered to the upper layer. At this time, the packets corresponding to Nos. 3 and 4 are the headers compressed with the first header compression protocol configuration information, and the decompression fails because the packets are now trying to decompress the compressed headers with the second header compression protocol configuration information, such that an error occurs. The decompression can be successfully performed on the newly received PDCP PDU No. 5, but the header decompression is unsuccessful for the packets corresponding to Nos. 3, 4, and 6 previously received (1$k$-55).

Figure 1L:
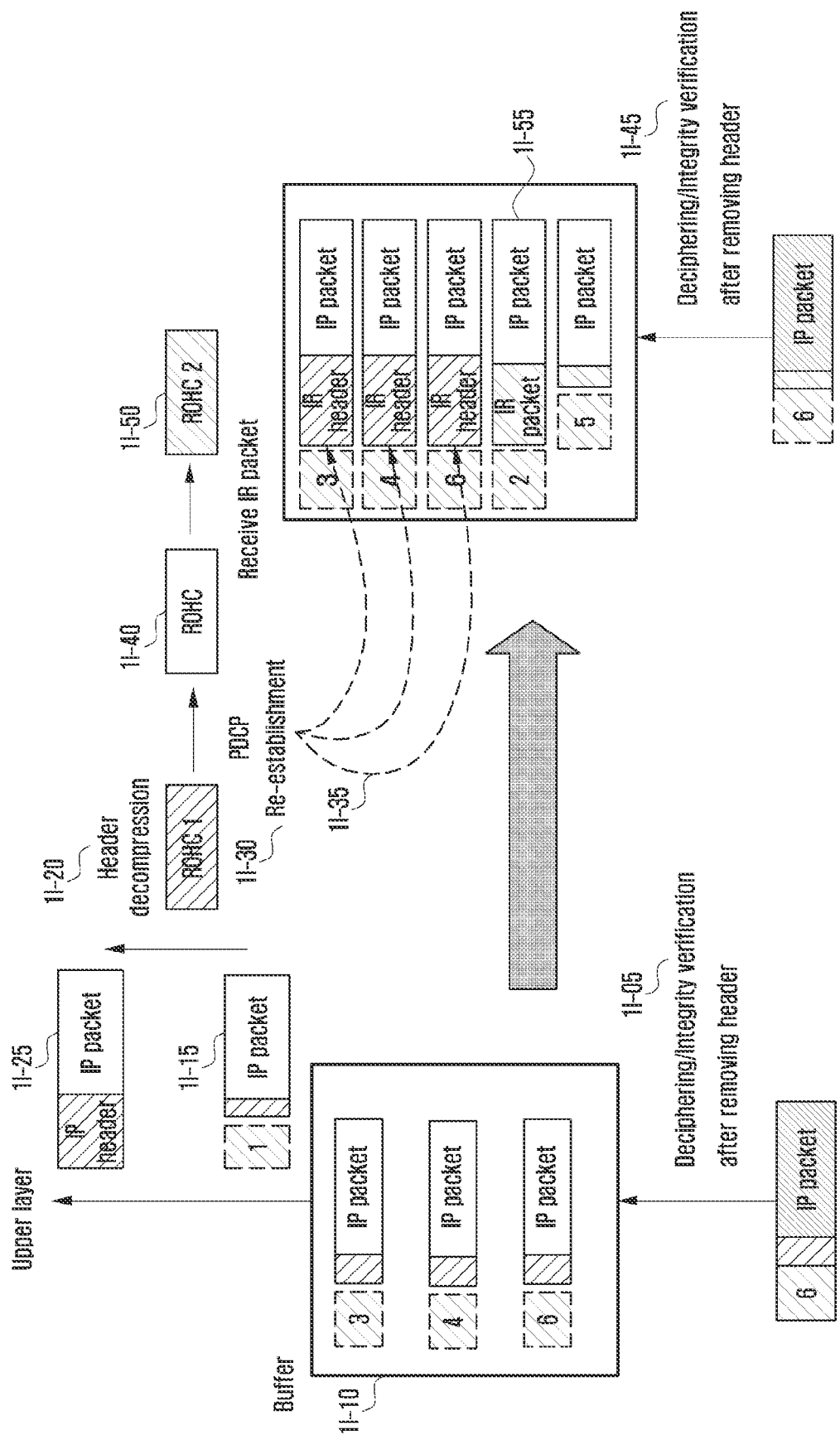
FIG. 1L is a diagram for describing an embodiment for solving the problems as shown in FIG. 1K in the next generation mobile communication system according to the disclosure, according to an embodiment.

FIG. 1L is a diagram for describing an embodiment for solving the problems as shown in FIG. 1K in the next generation mobile communication system according to an embodiment.

The out-of-delivery indicator is not configured in the RRC message, and the receiving PDCP entity (AM DRB, AM data radio bearer) connected to or configured with the RLC apparatus supporting the AM mode may receive the PDCP PDUs corresponding to PDCP sequence Nos. 0, 1, 3, 4, and 6. Because the out of delivery is not indicated, the receiving PDCP entity removes and deciphers the PDCP header for the PDCP PDUs corresponding to Nos. 0 and 1 and performs the integrity verification on the PDCP header, and may perform the header decompression on the packets using the header compression protocol configured by the first header compression protocol configuration and deliver the PDCP PDUs corresponding to Nos. 0 and 1 to the upper layer (1$l$-05, 1$l$-15, 1$l$-20, and 1$l$-25). In the above description, the first header compression protocol configuration means the configuration information configured by first resetting the header compression protocol and then receiving the IR packet. For the PDCP PDUs corresponding to the PDCP sequence Nos. 3, 4, and 6 that have not been received in order, the header is removed and stored in the buffer (1$l$-10).

Thereafter, if the base station determines to handover, the receiving PDCP entity may perform the PDCP entity re-establishment procedure (1$l$-30).

Here, when the receiving PDCP entity performs the PDCP entity re-establishment, the receiving PDCP entity performs the header decompression on the headers (TCP/IP header) corresponding to the PDCP SDUs of the existing PDCP PDU that first exists in the buffer before the header compression protocol (ROHC) is reset by using the first header compression protocol configuration information and stores the decompressed headers (1$l$-35). After performing the decompression procedure, the header compression protocol is reset (1$l$-40).

If the PDCP PDUs corresponding to PDCP sequence Nos. 2 and 5 are later received, the receiving PDCP entity may remove and decipher the header and perform the integrity verification on the header when receiving the PDCP PDU corresponding to No. 2, perform the header decompression to identify the IR packet, and use the new header compression protocol configuration information to configure the second header compression protocol (1$l$-45 and 1$l$-50). Because the PDCP PDUs corresponding to No. 2 is received in the above description, the header decompression procedure may be performed on packets corresponding to Nos. 3 and 4 in order, but the packets may be delivered to the upper layer because the decompression is already performed in the above procedure. The newly received PDCP PDU No. 5 can be successfully decompressed using the second header compression protocol configuration, and may be delivered to the upper layer along with the packet (its header is decompressed by using the first header compression protocol configuration in advance in the above description) corresponding to the already received PDCP PDU No. 6.

The operations of the transmitting PDCP entity for performing the receiving data processing operation and the PDCP re-establishment procedure of the receiving PDCP entity according to the embodiments of the disclosure are as follows. In the following operation, when the base station configures the PDCP entity (pdcp-config) in the RRC message or configures the out-of-delivery for the bearer or the PDCP entity in the logical channel configuration or (logicalchannelconfig) bearer configuration (drb-config), the base station embodies even the receive packet processing operation of the receiving PDCP entity for supporting the out-of-delivery in the PDCP entity.

Receive packet processing operation of receiving PDCP entity (Receive operation).

The window state variables used in the receive packet processing operation of the receiving PDCP entity are as follows, and the window state variables maintains the COUNT value.

In this section, following definitions are used:

HFN(State Variable): the HFN part (i.e. the number of most significant bits equal to HFN length) of the State Variable;

SN(State Variable): the SN part (i.e. the number of least significant bits equal to PDCP SN length) of the State Variable;

RCVD_SN: The PDCP SN of the received PDCP Data PDU, included in the PDU header;

RCVD_HFN: the HFN of the received PDCP Data PDU, calculated by the receiving PDCP entity;

RCVD_COUNT: the COUNT of the received PDCP Data PDU=[RCVD_HFN, RCVD_SN];

RX_NEXT: This state variable indicates the COUNT value of the next PDCP SDU expected to be received. The reset value is 0;

RX_DELIV: This state variable indicates the COUNT value of the first PDCP SDU not delivered to the upper layers. The reset value is 0;

RX_REORD: This state variable indicates the COUNT value following the COUNT value associated with the PDCP Data PDU which triggered t-Reordering; and t-Reordering: The duration of the timer is configured by upper layers (RRC layer, configured in RRC message, 1e-10, 1e-40. and 1e-75 in FIG. 1E). This timer is used to detect loss of PDCP Data PDUs, and only one t-Reordering per receiving PDCP entity is running at a given time.

(Actions When a PDCP Data PDU is Received from Lower Layers)

At reception of a PDCP Data PDU from lower layers, the receiving PDCP entity shall determine the COUNT value of the received PDCP Data PDU, i.e. RCVD_COUNT, as follows:

if RCVD_SN<=SN(RX_DELIV)−Window_Size:
RCVD_HFN=HFN(RX_DELIV)+1;
else if RCVD_SN>SN(RX_DELIV)+Window_Size:
RCVD_HFN=HFN(RX_DELIV)−1;
else:
RCVD_HFN=HFN(RX_DELIV)
RCVD_COUNT=[RCVD_HFN, RCVD_SN]

After determining the COUNT value of the received PDCP Data PDU=RCVD_COUNT, the receiving PDCP entity shall:

if RCVD_COUNT<RX_DELIV, or if the PDCP Data PDU with COUNT=RCVD_COUNT has been received before: (For packet outdated or elapsed duration or out of window or duplicated);

Perform deciphering and integrity verification of the PDCP Data PDU using COUNT=RCVD_COUNT;
 if integrity verification fails
 indicate the integrity verification failure to upper layer and discard the PDCP Data PDU;
 if header decompression protocol (ROHC) is NC state in U-mode (or header compression protocol is reset and not reconfigured)
 performs header decompression for the received packet (otherwise already discarded);
 discard the PDCP Data PDU (otherwise already discarded);
 else:
 Perform deciphering and integrity verification of the PDCP Data PDU using COUNT=RCVD_COUNT
 if integrity verification fails
 indicate the integrity verification failure to upper layer;
 discard the PDCP Data PDU;

(In case of 1j-10 and 1j-15, when the header compression protocol is in the NC state in the U mode in the receiving operation or reset, the packets (may be applied irrespective of whether the packets are outdated or duplicated) of the first n times (or n numbers) may be always subjected to the header decompression procedure.

If the received PDCP Data PDU with COUNT value=RCVD_COUNT is not discarded above, the receiving PDCP entity shall;

store the resulting PDCP SDU in the reception buffer;
if RCVD_COUNT>=RX_NEXT:
update RX_NEXT to RCVD_COUNT+1;
if outOfOrderDelivery is configured (if outOfOrderDelivery is indicated)
 deliver the resulting PDCP SDU to upper layers;
if RCVD_COUNT=RX_DELIV;
 deliver to upper layers in ascending order of the associated COUNT value after performing header decompression;
 all stored PDCP SDU(s) with consecutively associated COUNT value(s) starting from COUNT=RX_DELIV;
 update RX_DELIV to the COUNT value of the first PDCP SDU which has not been delivered to upper layers, with COUNT value>=RX_DELIV;
if t-Reordering is running, and if RX_DELIV>=RX_REORD;
 stop and reset t-Reordering.
if t-Reordering is not running (includes the case when t-Reordering is stopped due to actions above), and RX_DELIV<RX_NEXT;
 update RX_REORD to RX_NEXT;
 start t-Reordering.

When t-Reordering expires, the receiving PDCP entity shall:

(The receiving PDCP entity when a t-Reordering expires shall:)

deliver to upper layers in ascending order of the associated COUNT value after performing header decompression;
 all stored PDCP SDU(s) with associated COUNT value(s)<RX_REORD;
 all stored PDCP SDU(s) with consecutively associated COUNT value(s) starting from RX_REORD;
 update RX_DELIV to the COUNT value of the first PDCP SDU which has not been delivered to upper layers, with COUNT value>=RX_REORD;
 if RX_DELIV<RX_NEXT;
 update RX_REORD to RX_NEXT;
 start t-Reordering.

Detailed procedures for re-establishing the transmitting-end PDCP entity and receiving-end PDCP entity (1j-15) are as follows.

PDCP Entity Re-Establishment Procedure

When requesting the PDCP entity Re-establishment in an upper layer, the transmitting PDCP entity is operated as follows:

For UM DRB and AM DRB (for example, drb-ContinuROHC is included in the MobilityControlInfo of the handover command message, that is, the RRC Connection Reconfiguration message. Generally, it is configured at the time of handover to other cells in the source base station), if drb-ContinuROHC is not configured, the header compression protocol (ROHC) for the uplink is reset and starts in the IR state in the U mode;

For UM DRB and SRB, the TX_NEXT variables are set to the initial value (TX_NEXT indicates the COUNT value for the PDCP SDU to be subsequently transmitted from the transmitting PDCP entity. TX_NEXT: This state variable indicates the COUNT value of the next PDCP SDU to be transmitted. The initial value is 0);

Apply the ciphering algorithm and the key provided by the upper layer in the PDCP Re-establishment procedure; and Apply the integrity protection algorithm and the key provided by the upper layer in the PDCP Re-establishment procedure;

For UM DRB, the PDCP SDUs that have already been assigned the PDCP sequence number but have not yet been delivered to the lower layer are processed as follows:

The PDCP SDUs are processed as if they were received from the upper layer.

The PDCP SDUs are transmitted in the order of the assigned COUNT values before the PDCP Re-establishment procedure, and the PDCP discard timer does not restart.

or AM DRB, the retransmission or the transmission is performed in the order of the assigned COUNT value from the first PDCP SDU that has not been confirmed to be successfully transmitted from the lower layer before the PDCP Re-establishment procedure, and the following procedure is performed.

The header compression is performed on the PDCP SDU.

The ciphering and the integrity protection are performed using the COUNT value corresponding to the PDCP SDU.

The PDCP data PDU resulting from the above procedure is delivered to the lower layer.

When upper layers request a PDCP entity re-establishment, the transmitting PDCP entity shall:

for UM DRBs and AM DRBs, reset the header compression protocol for uplink and start with an IR state in U-mode if drb-ContinueROHC is not configured;

for UM DRBs and SRBs, set TX_NEXT to the initial value;

for SRBs, discard all stored PDCP SDUs and PDCP PDUs;

apply the ciphering algorithm and key provided by upper layers during the PDCP entity Re-establishment procedure;

apply the integrity protection algorithm and key provided by upper layers during the PDCP entity Re-establishment procedure;

for UM DRBs, for each PDCP SDU already associated with a PDCP SN but for which a corresponding PDU has not previously been submitted to lower layers:

consider the PDCP SDUs as received from upper layer;

perform transmission of the PDCP SDUs in ascending order of the COUNT value associated to the PDCP SDU prior to the PDCP re-establishment without restarting the discardTimer.

For AM DRBs, from the first PDCP SDU for which the successful delivery of the corresponding PDCP Data PDU has not been confirmed by lower layers, perform retransmission or transmission of all the PDCP SDUs already associated with PDCP SNs in ascending order of the COUNT values associated to the PDCP SDU prior to the PDCP entity re-establishment as specified below:

perform header compression of the PDCP SDU;

perform integrity protection and ciphering of the PDCP SDU using the COUNT value associated with this PDCP SDU;

submit the resulting PDCP Data PDU to lower re.

When upper layers request a PDCP entity Re-establishment, the receiving PDCP entity shall:

for SRBs, discard all stored PDCP SDUs and PDCP PDUs for UM DRBs, if t-Reordering is running:

stop and reset t-Reordering;

deliver all stored PDCP SDUs to the upper layers in ascending order of associated COUNT values after performing header decompression;

for AM DRBs, perform header decompression for all stored PDCP PDUs and store them in the reception buffer if drb-ContinueROHC is not configured;

for UM DRBs and AM DRBs, reset the header compression protocol for downlink and start with NC state in U-mode if drb-ContinueROHC is not configured;

(for AM DRBs, perform header decompression for the first received n PDCP PDUs if header compression protocol is reset in the above.)

for UM DRBs and SRBs, set RX_NEXT and RX_DELIV to the initial value;

apply the ciphering algorithm and key provided by upper layers during the PDCP entity re-establishment procedure;

apply the integrity protection algorithm and key provided by upper layers during the PDCP entity re-establishment procedure.

For the AM DRB driven by the AM mode RLC layer apparatus in the above procedure, the following operation is performed when the receiving PDCP entity performs the PDCP re-establishment.

For AM DRBs, perform header decompression for all stored PDCP PDUs and store them in the reception buffer if drb-ContinueROHC is not configured;

The reason for performing the above operation is as follows.

For example, the terminal may receive downlink data from the base station to the AM bearer (which means the bearer driven in the AM mode of the RLC layer supporting the ARQ function). That is, the base station transmits the PDCP PDUs corresponding to the PDCP sequence numbers 0, 1, 2, 3 and 4 to the terminal as downlink data, and the receiving PDCP entity of the terminal may first receive the PDCP PDUs corresponding to Nos. 1, 3, and 4 out of order during the transmission. When the receiving PDCP layers of the terminal are transmitted in order (when the out-of-delivery indicator is not indicated by the RRC configuration), the headers for the PDCP PDUs corresponding to Nos 1, 3, and 4 are analyzed, deciphered, subjected to the integrity verification, and stored in the buffer (the header decompression is performed only when arranged in order and delivered to the upper layer). The header decompression does not refer to the PDCP header but refers to the decompression for the TCP/IP header of the IP packet of the PDCP SDU (data part of the PDCP PDU). At this time, if the base station determines the handover and instructs the terminal to transmit a handover command with an RRC message (RRConnectionReconfiguration), the receiving PDCP entity of the terminal receiving the instruction re-establishes the PDCP entity (PDCP re-establishment). That is, the header compression protocol (ROHC) is reset immediately. The IR packet is received later to complete the header compression protocol configuration, and if in addition to Nos. 1, 3, and 4, the PDCP PDUs corresponding to Nos. 0 and 2 are later received, the order can be rearranged, they are subjected to the header decompression and should be delivered to the upper layer. At this time, because the TCP/IP header of the PDCP SDU corresponding to 1, 3 and 4 is compressed with the previously configured header compression configuration, and the PDCP SDU corresponding to Nos. 0 and 2 is compressed with the newly configured header compression protocol configuration, it is possible to cause a failure or an error when the header decompression is performed on the TCP/IP header of the PDCP SDU corresponding to Nos. 1, 3, and 4 with the new header compression protocol configuration. To solve this problem, in the PDCP re-establishment procedure of an embodiment of the disclosure, when the re-establishment of the receiving PDCP entity is to be performed, if there are PDCP SDUs stored in the existing buffer before the header compression protocol is reset, a method for decompressing the TCP/IP headers of the PDCP SDUs with the existing header compression protocol, storing the TCP/IP headers in the buffer, and then resetting the header compression protocol is proposed. The proposed method is an operation of being suitable when drb-ContinueROHC (an indicator that the current ROHC setting is used as it is) is not configured. If the drb-ContinueROHC is configured, it means that the current ROHC configuration is to be used as it is. Therefore, the header compression protocol will not be reset and performing the header decompression on PDCP PDUs previously stored in the buffer as in the above procedure may be unnecessary.

In the disclosure, the performance of the header decompression refers to that the header compression protocol (ROHC) includes the procedure of identifying the header of the TCP/IP packet or the upper layer packet, and if the packet is an IR packet, the operation of identifying the information of the IR packet and updating the configuration information of the header compression protocol depending on the information is included. In addition, the performance of the header decompression refers to that the configuration information of the header compression protocol is identified to perform the decompression and the decompressed header is restored.

FIG. 1M is a diagram illustrating an operation when the receiving PDCP entity outdates or receives a duplicated PDCP PDU, according to an embodiment.

In FIG. 1M, if the receiving PDCP entity receives (1m-01) the outdated or duplicated data (1m-05), the receiving PDCP entity first performs the deciphering and the integrity verification (1m-10, if the integrity verification fails, such is reported to the upper layer and immediately discarded). Then, if the mode and the state of the current header compression protocol (ROHC) are in the NC state in the U mode (1m-15), the header decompression is performed (it is identified whether there is the IR packet, and if so, the header compression protocol configuration information is updated) and the data are discarded (1m-20). If the mode and the state of the current header compression protocol are different from the NC state in the U mode (1m-15), the data are discarded (1m-25). If the received PDCP PDU is not outdated or duplicated (1m-05), the deciphering and the integrity verification are performed, the header decompression is performed, and then the data processing is performed (1m-30).

In case of the embodiments of the disclosure, when the header compression protocol is in the NC state in the U mode in the receiving operation or reset, the packets (may be applied irrespective of whether the packets are outdated or duplicated) of the first n times (or n numbers) may be always subjected to the header decompression procedure.

Figure 1N:
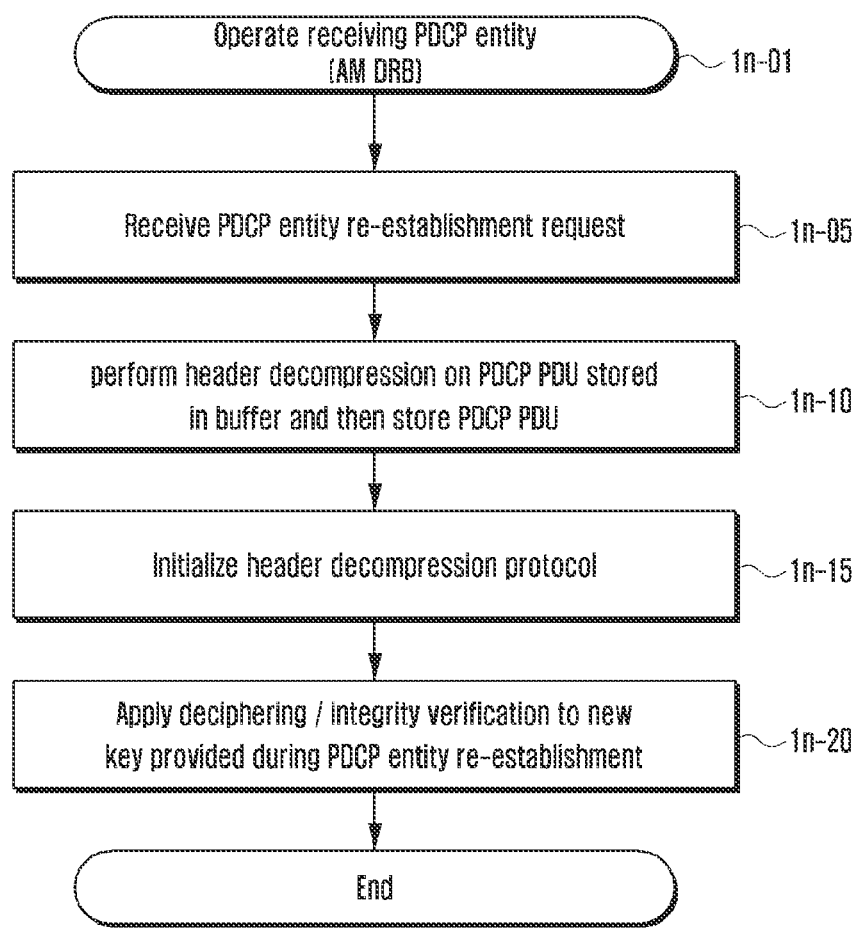
FIG. 1N is a diagram illustrating an operation when the receiving PDCP entity operated in an AM DRB receives a PDCP entity Re-establishment request, according to an embodiment.
Figure 10:
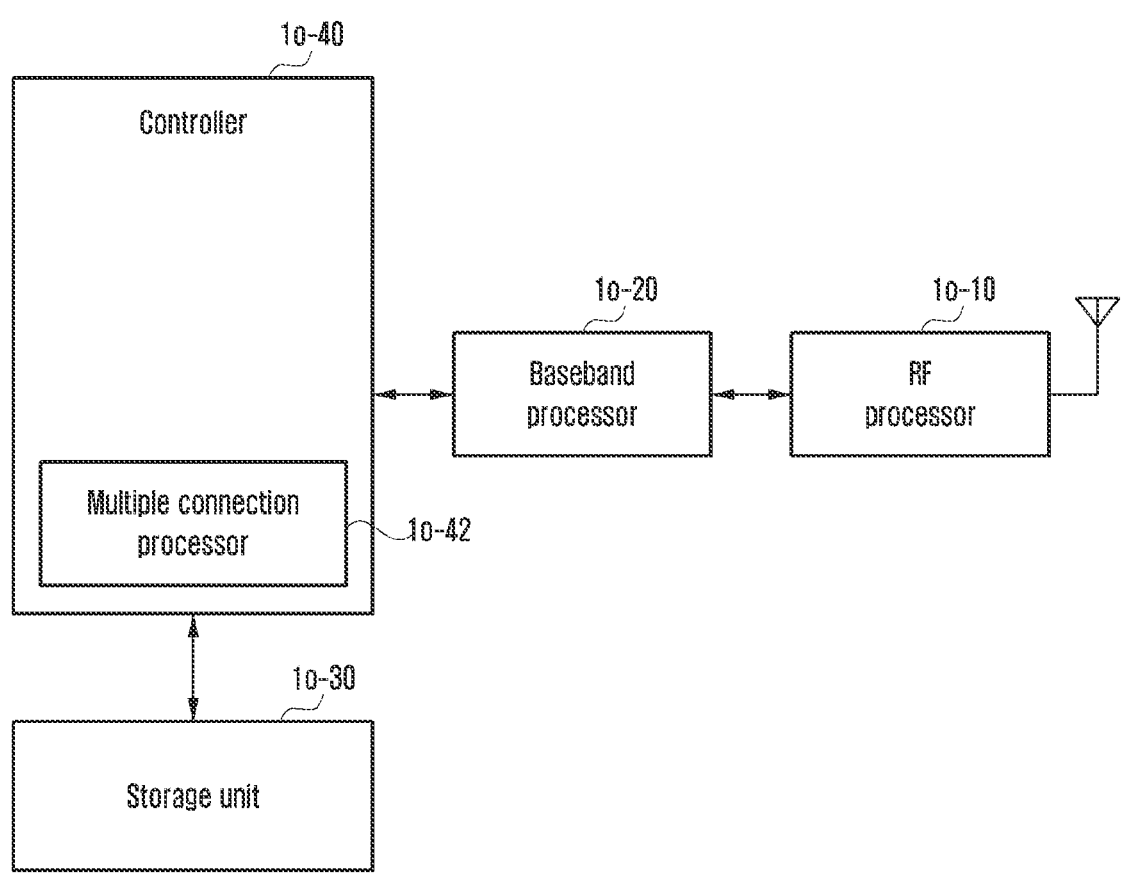

FIG. 1N is a diagram illustrating an operation when the receiving PDCP entity operated in an AM DRB receives a PDCP entity re-establishment request, according to an embodiment.

In FIG. 1N, when the receiving PDCP entity receives the PDCP entity re-establishment request (1n-05), the receiving PDCP entity performs the header decompression on the PDCP PDUs or the PDCP SDUs stored in the current buffer and stores the PDCP PDUs or the PDCP SDUs in the buffer (1n-10). The header decompression protocol is reset (1n-15). The new key provided during the PDCP entity re-establishment is applied to the deciphering/integrity verification algorithm (1n-20).

In case of the embodiments of the disclosure, when the header compression protocol is in the NC state in the U mode in the receiving operation or reset, the packets (may be applied irrespective of whether the packets are outdated or duplicated) of the first n times (or n numbers) may be always subjected to the header decompression procedure.

In FIG. 1N, the PDCP entity re-establishment operation proposed by the disclosure can be summarized as follows:

Start of PDCP Re-establishment procedure;

Among the AM DRBs, the first operation is applied to the DRBs in which the header compression protocol is configured and the drb-ContinueROHC is configured;

Among the AM DRBs, the second operation is applied to the DRBs in which the header compression protocol is configured and the drb-ContinueROHC is not configured;

The first operation may include the following operations:

Header compression protocol reset;

If the RCVD_COUNT=RX_NEXT condition of the PDCP PDU received after PDCP Re-establishment is established (that is, if the order is arranged by the received PDCP PDU), the following operation is performed:

deliver to upper layers in ascending order of the associated COUNT value after performing header decompression;

The second operation may include the following operations:

perform header decompression for all stored PDCP PDUs and store them in the reception buffer;

Header compression protocol reset;

When the RCVD_COUNT=RX_NEXT condition of the PDCP PDU received after PDCP Re-establishment is established (that is, if the order is arranged by the received PDCP PDU), the header of the PDCP PDU to which the header decompression has not yet been performed is restored (decompressed) and is delivered to the upper layer according to the COUNT sequence; and deliver to upper layers in ascending order of the associated COUNT value after performing header decompression if having not already been performed;

The disclosure proposes a procedure in which the receiving PDCP entity performs the PDCP entity re-establishment in the handover procedure. However, the handover procedure described in the disclosure is an example of performing the PDCP entity re-establishment, and when the radio link failure (RLF) or the RRC deactivation terminal stops the connection or resumes the connection, or when the RRC message triggering the PDCP entity re-establishment is received, the receiving PDCP entity may perform the PDCP entity re-establishment procedure proposed in the disclosure.

In the following description of the disclosure, when the terminal receives an indication for stored UE AS context to be used in the RRC deactivation mode from the base station in a current configuration when the terminal accesses the connection to the network in the RRC deactivation mode, the 2-2th embodiment in which, when the base station configures the PDCP entity (pdcp-config) in the RRC message or configures the out-of-delivery for the bearer or the PDCP entity in the logical channel configuration or (logicalchannelconfig) bearer configuration (drb-config), the base station embodies even the receive packet processing operation of the receiving PDCP entity for supporting the out-of-delivery in the PDCP entity, is proposed. That is, the re-establishment procedure of the transmitting-end and receiving-end PDCP entities for supporting the RRC deactivation mode terminal in the next generation mobile communication system is proposed as follows. The ROHC decompression failure problem described in the disclosure can also occur when the RRC deactivation mode terminal re-accesses the network. Therefore, the embodiment is proposed as follows:

PDCP entity re-establishment;

When upper layers request a PDCP entity Re-establishment, the transmitting PDCP entity shall:

For UM DRB and AM DRB (for example, drb-ContinuROHC is included in MobilityControlInfo of handover command message, that is, RRC Connection Reconfiguration message. Generally, it is configured at the time of handover to other cells in the source base station), if drb-ContinuROHC is not configured, the header compression protocol (ROHC) for the uplink is reset and starts in the IR state in the U mode;

For UM DRBs and SRBs, set TX_NEXT to the initial value (TX_NEXT indicates the COUNT value for the PDCP SDU to be subsequently transmitted from the transmitting PDCP entity);

TX_NEXT: This state variable indicates the COUNT value of the next PDCP SDU to be transmitted. The initial value is 0;

Apply the ciphering algorithm and key provided by upper layers during the PDCP entity Re-establishment procedure;

Apply the integrity protection algorithm and key provided by upper layers during the PDCP entity Re-establishment procedure;

For UM DRBs, for each PDCP SDU already associated with a PDCP SN but for which a corresponding PDU has not previously been submitted to lower layers;

Consider the PDCP SDUs as received from upper layer.

Perform transmission of the PDCP SDUs in ascending order of the COUNT value associated to the PDCP SDU prior to the PDCP Re-establishment without restarting the discard Timer.

For AM DRBs, from the first PDCP SDU for which the successful delivery of the corresponding PDCP Data PDU has not been confirmed by lower layers, perform retransmission or transmission of all the PDCP SDUs already associated with PDCP SNs in ascending order of the COUNT values associated to the PDCP SDU prior to the PDCP entity Re-establishment as specified below:

Perform header compression of the PDCP SDU.

Perform integrity protection and ciphering of the PDCP SDU using the COUNT value associated with this PDCP SDU.

Submit the resulting PDCP Data PDU to lower layer.

When upper layers request a PDCP entity Re-establishment, the receiving PDCP entity shall:

For SRBs, discard all stored PDCP SDUs and PDCP PDUs.

For UM DRBs, if t-Reordering is running, stop and reset t-Reordering.

deliver all stored PDCP SDUs to the upper layers in ascending order of associated COUNT values after performing header decompression.

For AM DRBs, perform header decompression for all stored PDCP PDUs, and stores the header decompression PDCP SDUs in the current receiving buffer except if upper layers indicate stored UE AS context is used and drb-ContinueROHC is configured.

For UM DRBs, reset the header compression protocol for downlink and start with NC state in U-mode if drb-ContinueROHC is not configured.

For AM DRBs, reset header decompression for downlink and starts in NC state in U mode, except if upper layers indicate stored UE AS context is used and drb-ContinueROHC is configured.

In case of an embodiment of the disclosure, when the header compression protocol is in the NC state in the U mode in the receiving operation or reset, the packets (may be applied irrespective of whether the packets are outdated or duplicated) of the first n times (or n numbers) may be always subjected to the header decompression procedure.

For UM DRBs and SRBs, set RX_NEXT and RX_DELIV to the initial value.

Apply the ciphering algorithm and key provided by upper layers during the PDCP entity Re-establishment procedure.

Apply the integrity protection algorithm and key provided by upper layers during the PDCP entity Re-establishment procedure.

For AM DRB driven by the AM mode RLC layer apparatus in the above procedure, the following operation is performed when the receiving PDCP entity performs the PDCP Re-establishment.

For AM DRBs, perform header decompression for all stored PDCP PDUs, and stores the header decompression PDCP SDUs in the current receiving buffer except if upper layers indicate stored UE AS context is used and drb-ContinueROHC is configured.

For AM DRBs, perform header decompression for all stored PDCP PDUs, except if upper layers indicate stored UE AS context is used and drb-ContinueROHC is configured in TS 38.331 [3];

The above operation may also be as follows as the same meaning.

For AM DRBs, perform header decompression for all stored PDCP PDUs, and stores the header decompression PDCP SDUs in the current receiving buffer except if upper layers does not indicate stored UE AS context is used and drb-ContinueROHC is not configured.

For AM DRBs, perform header decompression for all stored PDCP PDUs if drb-ContinueROHC is not configured or if upper layers don't indicate stored UE AS context is used in 3GPP TS 38.331 [3]: "NR Radio Resource Control (RRC); Protocol Specification."

The reason for performing the above operation is as follows.

For example, the terminal may receive downlink data from the base station to the AM bearer (which means the bearer driven in the AM mode of the RLC layer supporting the ARQ function). That is, the base station transmits the PDCP PDUs corresponding to the PDCP sequence Nos. 0, 1, 2, 3 and 4 to the terminal as downlink data, and the receiving PDCP entity of the terminal may first receive the PDCP PDUs corresponding to Nos. 1, 3, and 4 out of order during the transmission. When the receiving PDCP layers of the terminal are transmitted in order (when the out-of-delivery indicator is not indicated by the RRC configuration), the headers for the PDCP PDUs corresponding to Nos. 1, 3, and 4 are analyzed, deciphered, subjected to the integrity verification, and stored in the buffer (The header decompression is performed only when arranged in order and delivered to the upper layer. The header decompression does not refer to the PDCP header but refers to the decompression for the TCP/IP header of the IP packet of the PDCP SDU (data part of the PDCP PDU)). At this time, if the base station determines the handover and instructs the terminal to transmit a handover command with an RRC message (RRCConnectionReconfiguration), the receiving PDCP entity of the terminal receiving the instruction Re-establishes the PDCP entity (PDCP reestablishment). That is, the header compression protocol (ROHC) is reset immediately. The IR packet is later received to complete the header compression protocol configuration, and if in addition to Nos. 1, 3, and 4, the PDCP PDUs corresponding to Nos. 0 and 2 are later received, the order can be rearranged, they are subjected to the header decompression and needs to be delivered to the upper layer. At this time, because the TCP/IP headers of the PDCP SDU corresponding to Nos. 1, 3 and 4 are compressed with the previously configured header compression protocol configuration, and the PDCP SDUs corresponding to Nos. 0 and 2 are compressed with the newly configured header compression protocol configuration, it is possible to cause a failure or an error when the header decompression is performed on the TCP/IP headers of the PDCP SDU corresponding to Nos. 1, 3, and 4 with the new header compression protocol configuration. To solve this problem, in the PDCP re-establishment procedure of an embodiment of the disclosure, when the re-establishment of the receiving PDCP entity is to be performed, if there are PDCP SDUs stored in the existing buffer before the header compression protocol is reset, a method for decompressing the TCP/IP headers of the PDCP SDUs with the existing header compression protocol, storing the TCP/IP headers in the buffer, and then resetting the header compression protocol is proposed. The proposed method is an appropriate operation when drb-ContinueROHC (an indicator that the current ROHC configuration is to be used as it is) is not set or when it is not signaled to use the stored UE AS context. That is, the above operation can be applied except that drb-ContinueROHC is configured and the upper layer instructs to use the stored UE AS context. The case in which the drb-ContinueROHC is configured and instructed to use the stored UE AS context to the upper layer means that the current ROHC configuration is used in the current configuration. Therefore, the header compression protocol will not be reset the header decompression on the PDCP PDUs previously stored in the buffer as in the above procedure is unnecessary.

In the an embodiment of the re-establishment procedure of the transmitting-end and receiving-end PDCP entities for supporting the RRC deactivation mode terminal in the next generation mobile communication system of the disclosure, if the drb-ContinueROHC is not configured for the UM DRB, the header compression protocol is reset and the header compression protocol is reset except that the drb-ContinueROHC is configured for the AM DRB and the upper layer instructs to use the stored UE AS context in the current configuration. The reasons for processing the UM DRB and the AM DRB to distinguish the UM DRB and the AM DRB are as follows.

For the AM DRB, if the drb-ContinueROHC is configured but the header compression protocol is not reset, there is the data retransmission procedure in the PDCP Re-establishment procedure and the header of the data is compressed again during this retransmission process. Therefore, the header of the previously compressed data is compressed again, so that the order of header compression can be mixed. That is, if the compression is performed in the order of the PDCP sequence Nos. 1, 2, 3, 4, and 5 and the Nos. 3 and 4 is well received by the PDCP status report, when the Nos. 1, 2, and 5 are newly compressed, the problem occur that the No. 1 is compressed five times and then the No. 1 is compressed again by content. In the above description, because there is the case in which the version of the header compression protocol is various and any header compression protocol is compressed in order, the protocol error may occur.

However, for the AM DRB, if the drb-ContinueROHC is configured and the upper layer instructs to use the stored UE AS context in the current configuration, the RRC deactivation terminal re-access the network and therefore there is no data to be retransmitted. Therefore, there is no problem that the header of the data is compressed in the out-of-order manner as described above.

In addition, for the UM DRB, because there is no procedure of retransmitting in the PDCP re-establishment procedure, if the drb-ContinueROHC is configured, the problem does not occur even if the header compression protocol is not reset.

Therefore, in the embodiment of the re-establishment procedure of the transmitting-end and receiving-end PDCP entities for supporting the RRC deactivation mode terminal in the next generation mobile communication system of the disclosure, if the drb-ContinueROHC is not configured for the UM DRB, the header compression protocol is reset and the header compression protocol is reset except that the drb-ContinueROHC is configured for the AM DRB and the upper layer instructs to use the stored UE AS context in the current configuration.

During the re-establishment procedure of the receiving PDCP entity of the embodiment proposed above, the following procedure may be performed only when drb-ContinueROHC is not configured, so that it is performed irrespective of terminal context maintenance:

For AM DRBs, perform header decompression for all stored PDCP PDUs, and stores the header decompression PDCP SDUs in the current receiving buffer except if upper layers indicate stored UE AS context is used and drb-ContinueROHC is configured That is, the above procedure may be performed regardless of the UE context maintenance as in the following procedure, For AM DRBs, perform header decompression for all stored PDCP PDUs and store them in the reception buffer if drb-ContinueROHC is not configured.

FIG. 1O is a diagram illustrating a structure of a terminal, according to an embodiment.

Referring to FIG. 1O, the terminal includes a radio frequency (RF) processor 1o-10, a baseband processor 1o-20, a storage unit 1o-30, and a controller 1o-40.

The RF processor 1o-10 transmits and receives signals through a radio channel, such as band conversion and amplification of a signal. That is, the RF processor 1o-10 up-converts a baseband signal provided from the baseband processor 1o-20 into an RF band signal and then transmits the RF band signal through an antenna and down-converts the RF band signal received through the antenna into the baseband signal. For example, the RF processor 1o-10 may include a transmitting filter, a receiving filter, an amplifier, a mixer, an oscillator, a digital to analog converter (DAC), an analog to digital converter (ADC), or the like. In the above figure, only one antenna is illustrated, but the terminal may include a plurality of antennas. Further, the RF processor 1o-10 may include a plurality of RF chains. Further, the RF processor 1o-10 may perform beamforming. For beamforming, the RF processor 1o-10 may adjust a phase and a size of each of the signals transmitted and received through a plurality of antennas or antenna elements. In addition, the RF processor may perform MIMO and may receive a plurality of layers when performing a MIMO operation. The RF processor 1o-10 may perform reception beam sweeping by appropriately configuring a plurality of antennas or antenna elements under the control of the controller or adjust a direction and a beam width of the reception beam so that the reception beam is resonated with the transmission beam.

The baseband processor 1o-20 performs a conversion function between a baseband signal and a bit string according to a physical layer standard of a system. For example, when data are transmitted, the baseband processor 1o-20 generates complex symbols by coding and modulating a transmitted bit string. Further, when data are received, the baseband processor 1o-20 recovers the received bit string by demodulating and decoding the baseband signal provided from the RF processor 1o-10. For example, according to the orthogonal frequency division multiplexing (OFDM) scheme, when data are transmitted, the baseband processor 1o-20 generates the complex symbols by coding and modulating the transmitting bit string, maps the complex symbols to sub-carriers, and then performs an inverse fast Fourier transform (IFFT) operation and a cyclic prefix (CP) insertion to construct the OFDM symbols. Further, when data are received, the baseband processor 1o-20 divides the baseband signal provided from the RF processor 1o-10 in an OFDM symbol unit and recovers the signals mapped to the sub-carriers by a fast Fourier transform (FFT) operation and then recovers the received bit string by the modulation and decoding.

The baseband processor 1o-20 and the RF processor 1o-10 transmit and receive a signal as described above. Therefore, the baseband processor 1o-20 and the RF processor 1o-10 may be called a transmitter, a receiver, a transceiver, or a communication unit. Further, at least one of the baseband processor 1o-20 and the RF processor 1o-10 may include a plurality of communication modules to support a plurality of different radio access technologies. Further, at least one of the baseband processor 1o-20 and the RF processor 1o-10 may include different communication modules to process signals in different frequency bands. For example, the different wireless access technologies may include an LTE network, an NR network, and the like. Further, the different frequency bands may include a super high frequency (SHF) (for example: 2.5 GHz, 5 GHz) band, a millimeter wave (for example: 60 GHz) band.

The storage unit 1o-30 stores data and software such as basic programs, application programs, and configuration information for the operation of the terminal. The storage unit 1o-30 provides the stored data according to the request of the controller 1o-40.

The controller 1o-40 controls the overall operations of the terminal. For example, the controller 1o-40 controls transmission and reception of a signal through the baseband processor 1o-20 and the RF processor 1o-10. Further, the controller 1o-40 records data to and reads from the storage unit 1o-30. For this purpose, the controller 1o-40 may include at least one processor, microprocessor, central processing unit, or the like. For example, the controller 1o-40 may include a communication processor (CP) performing a control for communication and an application processor (AP) controlling an upper layer such as the application programs. In addition, according to the embodiment of the disclosure, the controller 1o-40 may include a multiple connection processor 1o-42 that performs processing to be operated in a multi connection mode.

Figure 1P:
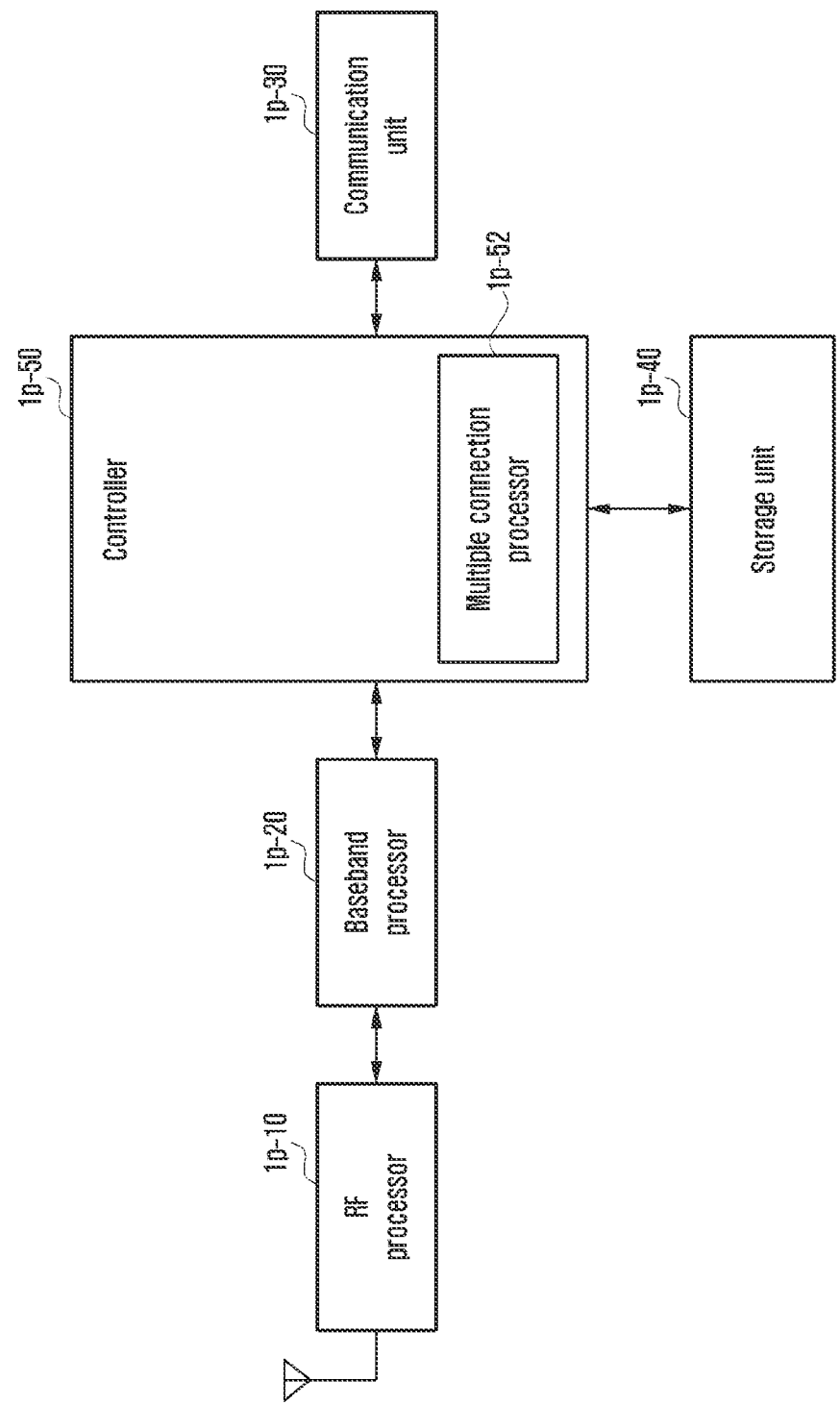
FIG. 1P is a block diagram illustrating a configuration of a base station in a wireless communication system, according to an embodiment.

FIG. 1P is a block diagram illustrating a configuration of a base station in a wireless communication system, according to an embodiment.

As illustrated in FIG. 1P, the base station is configured to include an RF processor 1p-10, a baseband processor 1p-20, a backhaul communication unit 1p-30, a storage unit 1p-40, and a controller 1p-50.

The RF processor 1p-10 serves to transmit and receive a signal through a radio channel, such as band conversion and amplification of a signal. That is, the RF processor 1p-10 up-converts a baseband signal provided from the baseband processor 1p-20 into an RF band signal and then transmits the RF band signal through an antenna and down-converts the RF band signal received through the antenna into the baseband signal. For example, the RF processor 1p-10 may include a transmitting filter, a receiving filter, an amplifier, a mixer, an oscillator, a digital to analog converter (DAC), an analog to digital converter (ADC), or the like. In FIG. 1P, only one antenna is illustrated, but the first access node may include a plurality of antennas. Further, the RF processor 1p-10 may include a plurality of RF chains. Further, the RF processor 1p-10 may perform beamforming. For beamforming, the RF processor 1p-10 may adjust a phase and a size of each of the signals transmitted/received through a plurality of antennas or antenna elements. The RF processor may perform a downward MIMO operation by transmitting one or more layers.

The baseband processor 1p-20 performs a conversion function between the baseband signal and the bit string according to the physical layer standard of the first radio access technology. For example, when data is transmitted, the baseband processor 1p-20 generates complex symbols by coding and modulating a transmitted bit string. Further, when data is received, the baseband processor 1p-20 recovers the received bit string by demodulating and decoding the baseband signal provided from the RF processor 1p-10. For example, according to the OFDM scheme, when data is transmitted, the baseband processor 1p-20 generates the complex symbols by coding and modulating the transmitting bit string, maps the complex symbols to the sub-carriers, and then performs the IFFT operation and the CP insertion to construct the OFDM symbols. Further, when data is received, the baseband processor 1p-20 divides the baseband signal provided from the RF processor 1p-10 in the OFDM symbol unit and recovers the signals mapped to the sub-carriers by the FFT operation and then recovers the receiving bit string by the modulation and decoding. The baseband processor 1p-20 and the RF processor 1p-10 transmit and receive a signal as described above. Therefore, the baseband processor 1p-20 and the RF processor 1p-10 may be called a transmitter, a receiver, a transceiver, communication unit or a wireless communication unit.

The communication unit 1p-30 provides an interface for performing communication with other nodes within the network.

The storage unit 1p-40 stores data and software such as basic programs, application programs, and configuration information for the operation of the main base station. In particular, the storage unit 1p-40 may store the information on the bearer allocated to the accessed terminal, the measured results reported from the accessed terminal, etc. Further, the storage unit 1p-40 may store information that is a determination criterion on whether to provide a multiple connection to the terminal or stop the multiple connection to the terminal. Further, the storage unit 1p-40 provides the stored data according to the request of the controller 1p-50.

The controller 1p-50 controls the overall operations of the main base station. For example, the controller 1p-50 transmits and receives signals through the baseband processor 1p-20 and the RF processor 1p-10 or the backhaul communication unit 1p-30. Further, the controller 1p-50 records data to and reads data from the storage unit 1p-40. For this purpose, the controller 1p-50 may include at least one processor. In addition, according to the embodiment of the disclosure, the controller 1p-50 may include a multiple connection processor 1p-42 that performs processing to be operated in a multi connection mode.

Second Embodiment

Figure 2A:
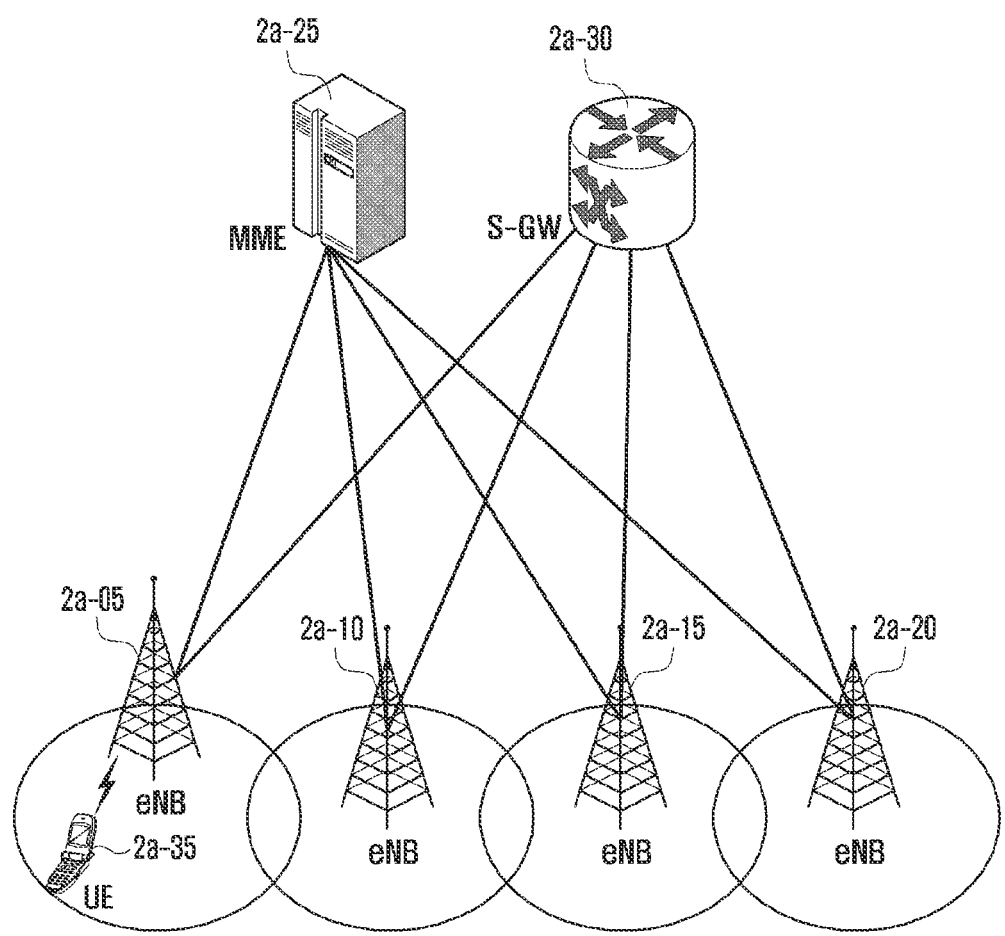
FIG. 2A is a diagram illustrating a structure of an LTE system referenced for the explanation of the disclosure.

FIG. 2A is a diagram illustrating a structure of an LTE system referenced for the explanation of the disclosure.

As illustrated in FIG. 2A, a radio access network of an LTE system is configured to include next generation base stations (evolved node B, hereinafter, eNB, Node B, or base station) 2a-05, 2a-10, 2a-15, and 2a-20, a mobility management entity (MME) 2a-25, and a serving-gateway (S-GW) 2a-30. User equipment (hereinafter, UE or terminal) 2a-35 accesses an external network through the eNBs 2a-05 to 2a-20 and the S-GW 2a-30.

In FIG. 2A, the eNB 2a-05 to 2a-20 correspond to the existing node B of the UMTS system. The eNB is connected to the UE 2a-35 through a radio channel and performs a more complicated role than the existing node B. In the LTE system, in addition to a real-time service like a voice over Internet protocol (VoIP) through the Internet protocol, all user traffic is served through a shared channel and therefore an apparatus for collecting and scheduling status information such as a buffer status, an available transmission power status, and a channel state of the UEs is required. Here, the eNBs 2a-05 to 2a-20 take charge of the collecting and scheduling. One eNB generally controls a plurality of cells. For example, to implement a transmission rate of 100 Mbps, the LTE system uses, as a radio access technology, orthogonal frequency division multiplexing (hereinafter, OFDM) in, for example, a bandwidth of 20 MHz. Further, an adaptive modulation and coding (hereinafter, referred to as AMC) scheme determining a modulation scheme and a channel coding rate according to a channel status of the terminal is applied. The S-GW 2a-30 is an apparatus for providing a data bearer and generates or removes the data bearer according to the control of the MME 2a-25. The MME is an apparatus for performing a mobility management function for the terminal and various control functions and is connected to a plurality of base stations.

Figure 2B:
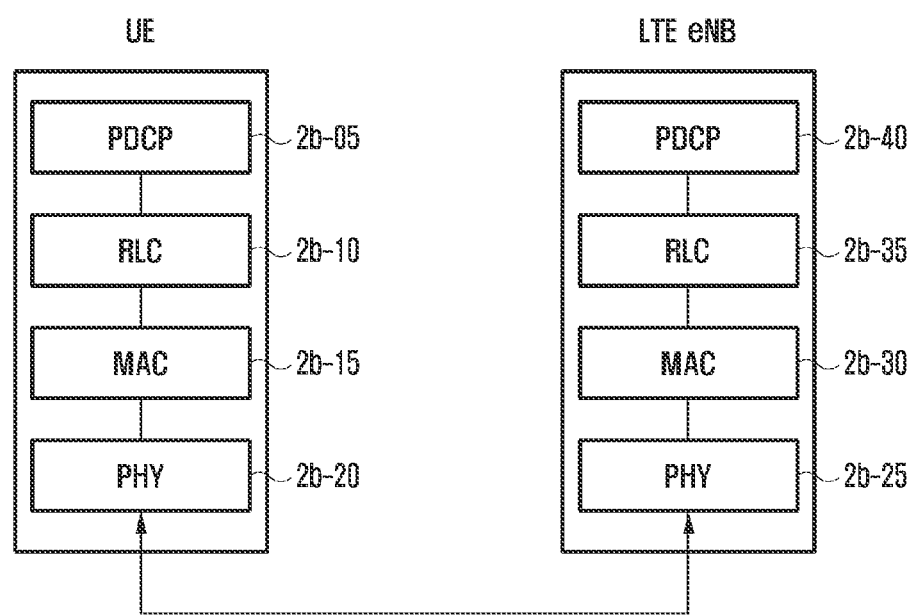
FIG. 2B is a diagram illustrating a radio protocol structure in the LTE system referenced for the explanation of the disclosure.

FIG. 2B is a diagram illustrating a radio protocol structure in the LTE system referenced for the explanation of the disclosure.

Referring to FIG. 2B, the radio protocol of the LTE system is configured to include packet data convergence protocols (PDCPs) 2b-05 and 2b-40, radio link controls (RLCs) 2b-10 and 2b-35, medium access controls (MACs) 2b-15 and 2b-30, and physical layers 2b-20 and 2b-25, respectively, in the terminal and the eNB, respectively. The PDCPs 2b-05 and 2b-40 are in charge of operations such as IP header compression/decompression. The main functions of the PDCP are summarized as follows:

Header compression and decompression function (Header compression and decompression: ROHC only);

Transfer function of user data (Transfer of user data);

In-sequence delivery function (In-sequence delivery of upper layer PDUs at PDCP Re-establishment procedure for RLC AM);

Reordering function (For split bearers in DC (only support for RLC AM): PDCP PDU routing for transmission and PDCP PDU reordering for reception);

Duplicate detection function (Duplicate detection of lower layer SDUs at PDCP Re-establishment procedure for RLC AM);

Retransmission function (Retransmission of PDCP SDUs at handover and, for split bearers in DC, of PDCP PDUs at PDCP data-recovery procedure, for RLC AM);

Ciphering and deciphering function (Ciphering and deciphering); and

Timer-based SDU discard function (Timer-based SDU discard in uplink);

The radio link controls (hereinafter, referred to as RLCs) 2b-10 and 2b-35 reconfigure the PDCP packet data unit (PDU) to an appropriate size to perform the ARQ operation or the like. The main functions of the RLC are summarized as follows:

Data transfer function (Transfer of upper layer PDUs);

ARQ function (Error Correction through ARQ (only for AM data transfer));

Concatenation, segmentation, reassembly functions (Concatenation, segmentation and reassembly of RLC SDUs (only for UM and AM data transfer));

Re-segmentation function (Re-segmentation of RLC data PDUs (only for AM data transfer));

Reordering function (Reordering of RLC data PDUs (only for UM and AM data transfer);

Duplicate detection function (Duplicate detection (only for UM and AM data transfer));

Error detection function (Protocol error detection (only for AM data transfer));

RLC SDU discard function (RLC SDU discard (only for UM and AM data transfer)); and RLC Re-establishment function (RLC Re-establishment).

The MACs 2b-15 and 2b-30 are connected to several RLC layer devices configured in one terminal and perform an operation of multiplexing RLC PDUs into an MAC PDU and demultiplexing the RLC PDUs from the MAC PDU. The main functions of the MAC are summarized as follows:

Mapping function (Mapping between logical channels and transport channels);

Multiplexing/demultiplexing function (Multiplexing/demultiplexing of MAC SDUs belonging to one or different logical channels into/from transport blocks (TB) delivered to/from the physical layer on transport channels);

Scheduling information reporting function (Scheduling information reporting);

HARQ function (Error correction through HARQ);

Priority handling function between logical channels (Priority handling between logical channels of one UE);

Priority handling function between terminals (Priority handling between UEs by means of dynamic scheduling);

MBMS service identification function (MBMS service identification);

Transport format selection function (Transport format selection); and

Padding function (Padding).

Physical layers 2b-20 and 2b-25 perform an operation of channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer.

Figure 2C:
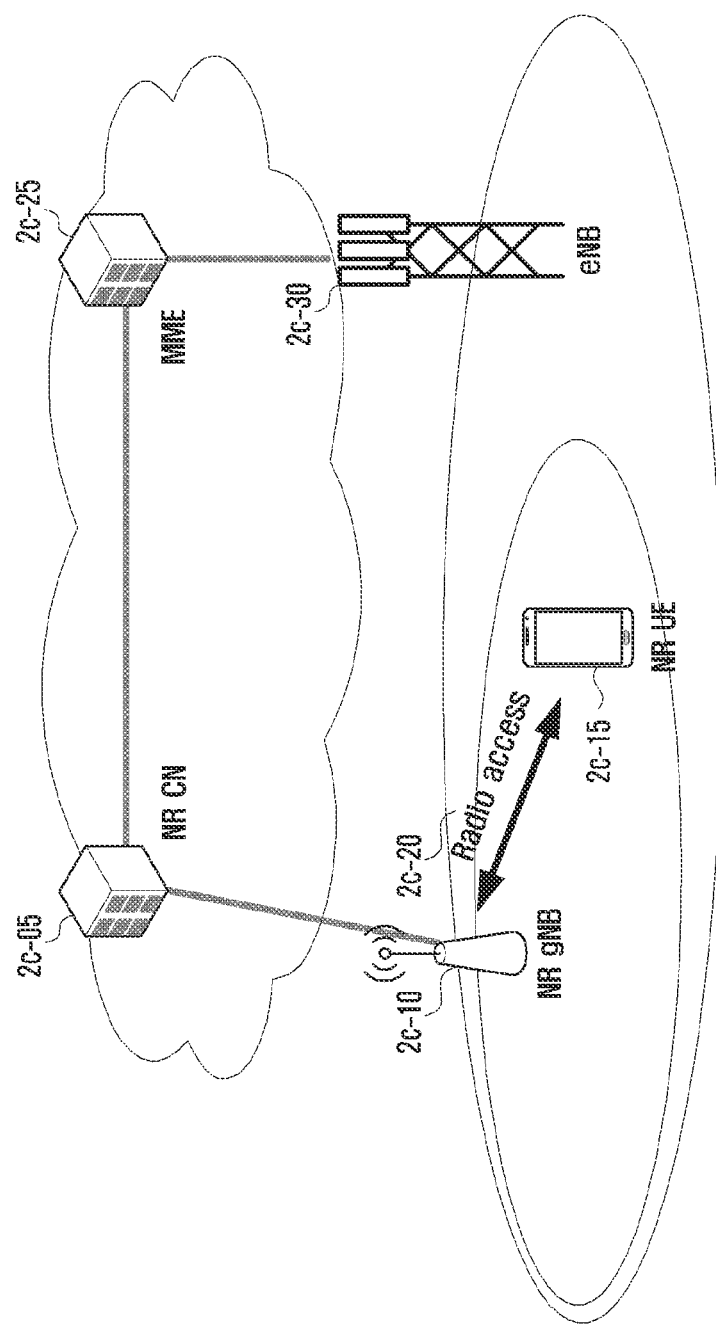
FIG. 2C is a diagram illustrating a structure of a next generation mobile communication system to which the disclosure is applied, according to an embodiment.

FIG. 2C is a diagram illustrating a structure of a next generation mobile communication system to which the disclosure is applied, according to an embodiment.

Referring to FIG. 2C, a radio access network of a next generation mobile communication system (hereinafter referred to as NR or 5G) is configured to include a next generation base station (new radio node B, hereinafter NR NB or NR gNB) 2c-10 and a new radio core network (NR CN) 2c-05. The user terminal (new radio user equipment, hereinafter, NR UE or UE) 2c-15 accesses the external network through the NR gNB 2c-10 and the NR CN 2c-05.

In FIG. 2C, the NR gNB 2c-10 corresponds to an evolved node B (eNB) of the existing LTE system. The NR gNB is connected to the NR UE 2c-15 via a radio channel and may provide a service superior to the existing node B. In the next generation mobile communication system, because all user traffic is served through a shared channel, an apparatus for collecting state information such as a buffer state, an available transmission power state, and a channel state of the UEs to perform scheduling is required. The NR gNB 2c-10 may serve as the device. One NR gNB generally controls a plurality of cells. To realize the high-speed data transmission compared with the existing LTE, the NR gNB may have an increased maximum bandwidth, and may be additionally configured to provide a beam-forming technology by using orthogonal frequency division multiplexing (hereinafter, referred to as OFDM) as a radio access technology. Further, an adaptive modulation and coding (hereinafter, referred to as AMC) scheme determining a modulation scheme and a channel coding rate according to a channel status of the terminal is applied. The NR CN 2c-05 may perform functions such as mobility support, bearer setup, QoS setup, and the like. The NR CN is a device for performing a mobility management function for the terminal and various control functions and is connected to a plurality of base stations. In addition, the next generation mobile communication system can interconnect with the existing LTE system, and the NR CN is connected to the MME 2c-25 through the network interface. The MME is connected to the eNB 2c-30 which is the existing base station.

Figure 2D:
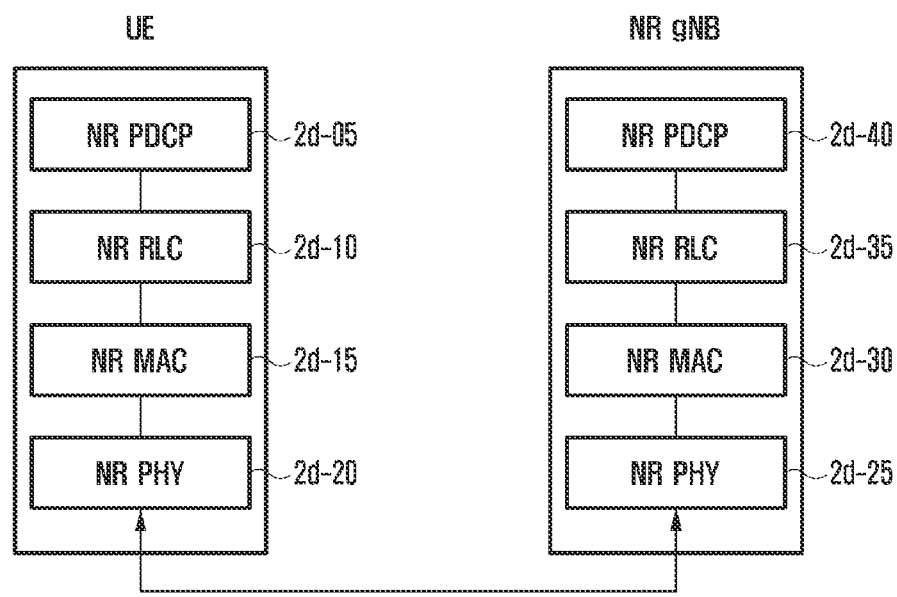
FIG. 2D is a diagram illustrating a radio protocol structure of the next generation mobile communication system to which the disclosure may be applied, according to an embodiment.

FIG. 2D is a diagram illustrating a radio protocol structure of the next generation mobile communication system to which the disclosure may be applied, according to an embodiment.

Referring to FIG. 2D, the radio protocol of the next generation mobile communication system is configured to include NR PDCPs 2d-05 and 2d-40, NR RLCs 2d-10 and 2d-35, NR MACs 2d-15 and 2d-30, and NR PHY 2d-20 and 2d-25, respectively, in the terminal and the NR base station. The main functions of the NR PDCPs 2d-05 and 2d-40 may include some of the following functions:

Header compression and decompression function (Header compression and decompression: ROHC only);
Transfer function of user data (Transfer of user data);
In-sequence delivery function (In-sequence delivery of upper layer PDUs);
Reordering function (PDCP PDU reordering for reception);
Duplicate detection function (Duplicate detection of lower layer SDUs);
Retransmission function (Retransmission of PDCP SDUs);
Ciphering and deciphering function (Ciphering and deciphering); and
Timer-based SDU discard function (Timer-based SDU discard in uplink).

In this case, the reordering function of the NR PDCP entity refers to a function of reordered PDCP PDUs received in a lower layer in order based on a PDCP sequence number (SN) and may include a function of transferring data to the upper layer in the reordered order, a function of recording PDCP PDUs missed by the reordering, a function of reporting a state of the missed PDCP PDUs to a transmitting side, and a function of requesting a retransmission of the missed PDCP PDUs.

The main functions of the NR RLCs 2d-10 and 2d-35 may include some of the following functions:

Data transfer function (Transfer of upper layer PDUs);
In-sequence delivery function (In-sequence delivery of upper layer PDUs);
Out-of-sequence delivery function (Out-of-sequence delivery of upper layer PDUs);
ARQ function (Error correction through HARQ);
Concatenation, segmentation, reassembly function (Concatenation, segmentation and reassembly of RLC SDUs);
Re-segmentation function (Re-segmentation of RLC data PDUs);
Reordering function (Reordering of RLC data PDUs);
Duplicate detection function (Duplicate detection);
Error detection function (Protocol error detection);
RLC SDU discard function (RLC SDU discard); and
RLC re-establishment function (RLC re-establishment).

In the above description, the in-sequence delivery function of the NR RLC apparatus refers to a function of delivering RLC SDUs received from a lower layer to an upper layer in order, and may include a function of reassembling and delivering an original RLC SDU that is divided into a plurality of RLC SDUs and received, a function of rearranging the received RLC PDUs based on the RLC sequence number (SN) or the PDCP sequence number (SN), a function of recording the RLC PDUs lost by the reordering, a function of reporting a state of the lost RLC PDUs to the transmitting side, a function of requesting a retransmission of the lost RLC PDUs, a function of delivering only the RLC SDUs before the lost RLC SDU to the upper layer in order when there is the lost RLC SDU, a function of delivering all the received RLC SDUs to the upper layer in order before a predetermined timer starts if the timer expires even if there is the lost RLC SDU, or a function of delivering all the RLC SDUs received until now to the upper layer in order if the predetermined timer expires even if there is the lost RLC SDU. Further, the NR RLC may process the RLC PDUs in the received order (in order of arrival regardless of the order of a sequence number and the sequence number), and may deliver the processed RLC PDUs to the PDCP entity according to the out-of-sequence delivery. In the case of the segment, the NR RLC may receive the segments which are stored in the buffer or to be later received and reconfigure the RLC PDUs into one complete RLC PDU and then deliver the complete RLC PDU to the PDCP entity. The NR RLC layer may not include the concatenation function and may perform the function in the NR MAC layer or may be replaced by the multiplexing function of the NR MAC layer.

In this case, the out-of-sequence delivery function of the NR RLC apparatus refers to a function of directly delivering the RLC SDUs received from the lower layer to the upper layer regardless of order. The NR RLC apparatus may include a function of reassembling and delivering an original RLC SDU that is divided into several RLC SDUs and received, and a function of storing and reordering the RLC SN or the PDCP SN of the received RLC PDUs to record the lost RLC PDUs.

The NR MACs 2d-15 and 2d-30 may be connected to several NR RLC layer apparatuses configured in one terminal, and the main functions of the NR MAC may include some of the following functions:

Mapping function (Mapping between logical channels and transport channels);
Multiplexing and demultiplexing function (Multiplexing/demultiplexing of MAC SDUs);
Scheduling information reporting function (Scheduling information reporting);
HARQ function (Error correction through HARQ);
Priority handling function between logical channels (Priority handling between logical channels of one UE);

Priority handling function between terminals (Priority handling between UEs by means of dynamic scheduling);

MBMS service identification function (MBMS service identification);

Transport format selection function (Transport format selection); and

Padding function (Padding).

The NR PHY layers 2d-20 and 2d-25 may perform an operation of channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer.

Figure 2E:
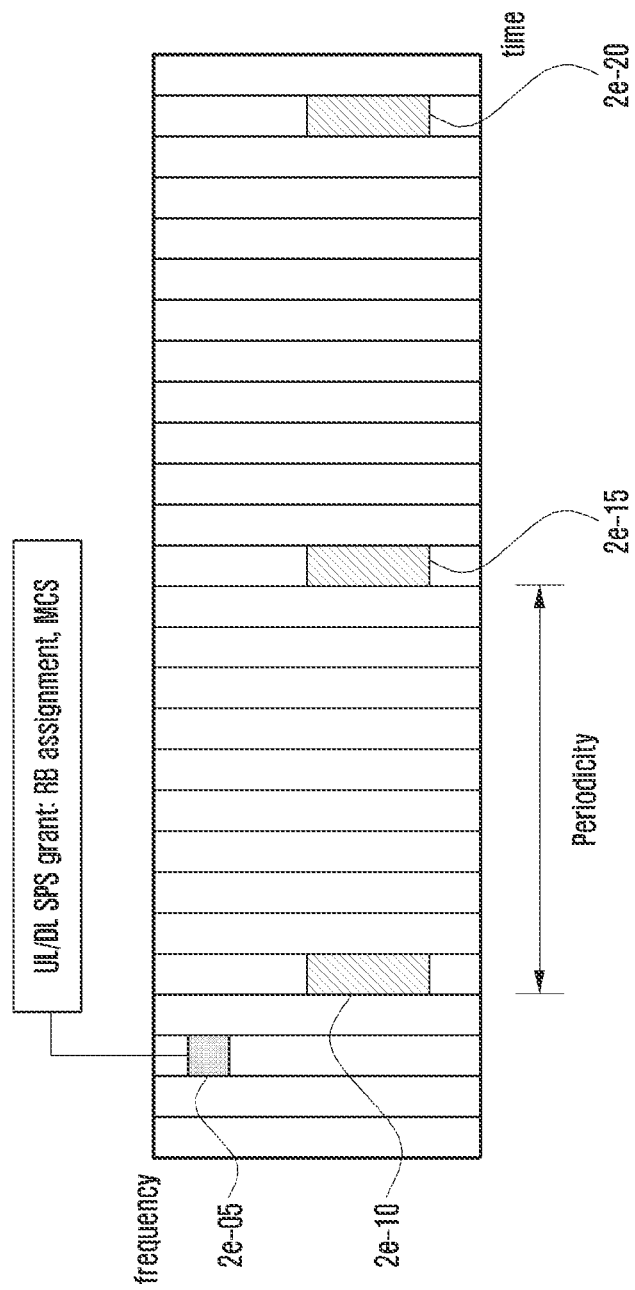
FIG. 2E is a diagram for describing a semi-persistent scheduling operation in the LTE system, according to an embodiment.

FIG. 2E is a diagram for describing a semi-persistent scheduling operation in the LTE system, according to an embodiment.

In the LTE system, the semi-persistent scheduling (SPS) is a method used for scheduling services where small data is frequently generated, which is required to reduce the amount of control information increased in proportion to the number of users and secure system capacity for user data transmission. In particular, in the LTE system, the SPS is used for VoIP. Basically, the base station transmits the common configuration information for the SPS to the terminal through the RRC control message, and instructs the activation/deactivation of the configured SPS through the DCI transmitted on the PDCCH. That is, the SPS is a method for once transmitting uplink/downlink resource block assignment control information 2e-05 by the base station to the terminal and performing, by the base station and the terminal, an operation for data 2e-10, 2e-15, and 2e-20 generated later depending on the transmitted control information. That is, the SPS in LTE allocates one transmission resource for the transmission of the MAC PDUs every period. The resources assigned by the control information are valid until the SPS activation or SPS deactivation/release is generated. Alternatively, in the case of the uplink SPS, the terminal and the base station can be implicitly deactivated when there is no data transmission for the SPS transmission resource for the preset N times. That is, if there is no data to be transmitted to the resources corresponding to the configured SPS set period, the terminal can pad and transmit 0, including padding BSR and PHR, and the like.

The SPS operation for the uplink/downlink in the LTE system is as follows.

First, the base station sets parameters for the SPS operation to the terminal through the RRC control message. The RRC message may include SPS C-RNTI, an SPS period (semiPersistSchedIntervalDL, semiPersistSchedIntervalUL), a maximum number (numberOfConfSPS-Processes, numberOfConfUlSPS-Processes) of an HARQ processes for the SPS, or the like.

Second, when the SPS is configured for the uplink/downlink, the base station transmits a downlink control information (DCI) format including the downlink resource allocation control information (2e-05) to the terminal by the SPS C-RNTI of the physical downlink control channel (PDCCH). The DCI may include an allocation type (FDD/TDD), an MCS level, a new data indicator (NDI), a redundancy version (RV), an HARQ process number, and resource block assignment information of data. For reference, the DCI format 0 is used for activation/deactivation of the uplink SPS, and the DCI format 1/1A/2/2A/2B/2C is used for activation/deactivation of the downlink SPS.

TABLE 1

DCI configuration of activation of SPS

| | DCI Format 0 | DCI Format 1/1A | DCI Format 2/2A/2B/2C |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

TABLE 2

DCI configuration of deactivation of SPS

| | DCI Format 0 | DCI Format 1/1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | set to all '1' | N/A |
| HARQ process number | N/A | FDD: set to '000' TDD: set to '0000' |
| Modulation and coding scheme | N/A | set to '1111' |
| Redundancy version | N/A | set to '00' |
| Resource block assignment | N/A | set to all '1' |

Figure 2F:
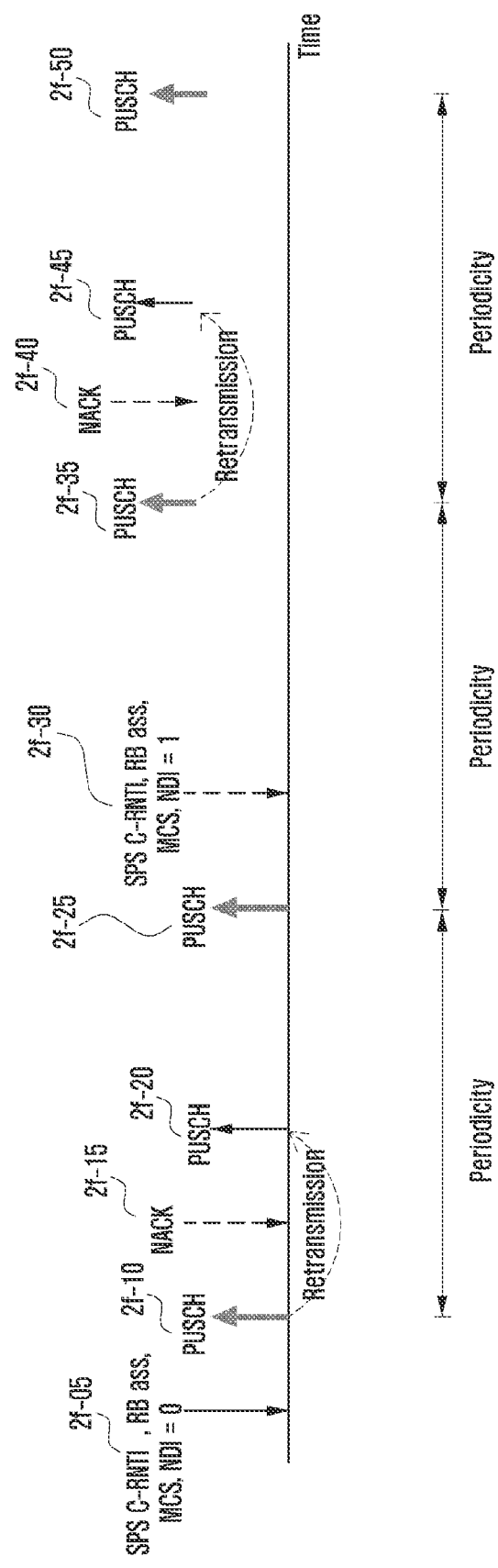
FIG. 2F is a diagram for describing data transmission and retransmission operations in the LTE system, according to an embodiment.

FIG. 2F is a diagram for describing data transmission and retransmission operations in the LTE system, according to an embodiment.

In the LTE system, the hybrid automatic repeat request (HARQ) with soft combining is supported to improve transmission data reception performance. The HARQ is used in a stop-and-wait process in the form of multiple histories for the DL-SCH and the UL-SCH. Upon receipt of the transport block, the receiver performs decoding on the transport block, and then determines whether to retransmit (ACK/NACK) according to whether the corresponding decoding is successfully performed. From the receiver's perspective, it is necessary to know which HARQ process the corresponding ACK signal is associated with. The LTE downlink HARQ operation is basically operated by an asynchronous protocol and the uplink HARQ operation is operated by a synchronous protocol. Here, the asynchronous operation means that the retransmission after the initial transmission can occur at any time. To support this, the base station needs to explicitly signal the HARQ retransmission at a certain time. On the other hand, in the synchronous operation, because the retransmission after the initial transmission is fixed after a specified time, the base station does not need to separately signal the HARQ retransmission time. In addition, in the case of the uplink HARQ retransmission, HARQ retransmission can be divided into adaptive HARQ (retransmission RB assignment to PDCCH/DCI) and non-adaptive HARQ (retransmission instruction by transmitting 1 bit ACK/NACK on the PHICH).

The LTE uplink HARQ operation, which can be referenced in the disclosure, will be described in detail. The retransmission indication method differs according to the data transmission through the dynamic resource allocation and the uplink SPS transmission.

1. Indication by retransmission C-RNTI for dynamic resource assignment:

NDI bit is toggled: Mean new transmission; and

NDI bit is same: Adaptive retransmission (possible transmission resource change indication).

2. Indication by retransmission SPS C-RNTI for uplink SPS transmission:

NDI bit is 0: new transmission+SPS assignment; and

NDI bit is 1: Adaptive retransmission (possible transmission resource change indication).

Referring to FIG. 2F, the retransmission method for the uplink SPS transmission is illustrated by example. In step 2f-05, the terminal receives the DCI indicated by the SPS C-RNTI, and the corresponding DCI includes resource block allocation (RB), MCS, and NDI values. Here, a new SPS transmission with an NDI value of 0 is activated. Thereafter, in step 2f-10, the terminal transmits data to the fixed SPS transmission resource. If the base station does not successfully receive data delivered from the SPS transmission resource, the base station transmits NACK to the terminal 2f-15. The NACK may be delivered to the PHICH channel. In step 2f-20, the terminal retransmits data corresponding to the initial transmission. In step 2f-25, when the terminal transmits the next data packet in accordance with the fixed SPS period and in step 2f-30, the base station desires to adaptively change the RB on which the corresponding SPS transmission is performed, the NDI bit is set to be 1 to deliver the DCI. The terminal receiving the DCI signal applies the RB indicated by the corresponding DCI to perform a subsequent uplink SPS operation. That is, in step 2f-35, the data packet is transmitted to the new RB, the retransmission is performed in accordance with the retransmission request 2f-40 of the base station 2f-45 and the subsequent uplink SPS transmission is performed 2f-50.

If the base station desires to release the corresponding SPS or configures a new uplink SPS while the uplink SPS transmission operation is being performed, the base station may change and indicate the content configuration (NDI bit, etc.) of the DCI.

The disclosure includes the overall operation of the uplink SPS in the next generation mobile communication system. In particular, an operation of activate grant-free semi-persistent transmission to support ultra-reliable and low latency (URLL) communication, and a method for supporting an uplink SPS in a plurality of other serving cells different form the existing LTE, and the like are included. In addition, the disclosure also includes a method for reducing complexity when a terminal performs blind decoding using SPS C-RNTI in a plurality of serving cells and an SPS confirmation operation for reducing signaling of an uplink SPS operation.

In an embodiment, a method and an apparatus for activating an uplink SPS in NR are proposed. That is, a method and apparatus for configuring an uplink SPS in a plurality of serving cells using one RRC control message and specifying an activation scheme of each uplink SPS are proposed.

In the disclosure, the uplink SPS can be initialized and activated in one of two ways. The first is the method for performing uplink SPS configuration and activation by an L3 control message (RRC message), and the second is a method for performing an uplink SPS activation by PDCCH/DCI. The first scheme can be used to transmit, to the SPS, traffic extremely sensitive to latency like URLLC, and the second scheme can be applied to traffic that is generally served by SPS, like VoIP. Hereinafter, the scheme for initially activating an uplink SPS with an RRC control message is referred to as a first activation scheme, and the scheme for initially activating an uplink SPS with PDCCH/DCI is referred to as a second activation scheme.

In the disclosure, the SPS is used as the same meaning as the grant-free uplink transmission.

Also, to use the SPS, the terminal and the base station pre-share various pieces of information in advance. In the disclosure, such information is classified into first SPS configuration information, second SPS configuration information, third SPS configuration information, and fourth SPS configuration information.

The first SPS configuration information is commonly valid (applied) information in various serving cells in which the uplink SPS is configured, and is composed of the following information:

SPS C-RNTI: SPS transmission activation/retransmission/Re-activation/release can be indicated on the PDCCH, which is an identifier for specifying the terminal. For reference, the terminal also has a C-RNTI for scheduling through a general transmission resource other than the SPS;

The number of SPS uplink HARQ processes: The number of uplink HARQ processes to be used for SPS transmission. A total of N HARQ processes can be configured in one terminal, and only a part of them are used for the SPS transmission. The identifier of the HARQ processes for the SPS is specified based on the information on the number of uplink HARQ processes. For example, if the number of SPS uplink HARQ processes is N, N consecutive processes starting from a predetermined HARQ process identifier are processes for the SPS;

Uplink SPS interval: Period at which the uplink SPS transmission resource is allocated;

The second SPS configuration information is information that is commonly valid (applied) in various serving cells in which the first activation scheme is used, and is composed of the following information:

UL grant: Information specifying the uplink SPS transmission resource and the transmission format and configured as the information indicating in which frequency resource (physical resource block) the SPS transmission resource is configured and the transmission format information to be applied to the data to be transmitted by the SPS transmission resource. The transmission format information includes information such as a modulation and coding scheme (MCS), a transport block size or the like.

The third SPS configuration information is commonly valid information in one serving cell in which the first activation scheme is used, and is composed of the following information:

SPS start time: Information that specifies when the uplink SPS is activated. The time information may be represented by a system frame number (SFN) and a small time unit number of a specific serving cell among a plurality of serving cells configured in the terminal. In this case, the specific serving cell which is a reference of the time information and the serving cell to which the SPS start time is applied may be different serving cells. The specific serving cell may be a primary cell (PCell). Here, the SFN is a monotonically increasing integer for each radio frame. That is, the radio frame is a time interval having a predetermined length. The SFN is explicitly signaled through system information and so on. In addition, a small time unit is a time interval having a length shorter than a radio frame. One radio frame consists of a number of small time units, each small time unit being identified as a monotonically increasing integer within one radio frame. The small time unit number is not explicitly signaled and the terminal and the base station implicitly determine the small time unit number according to the temporal/relative position of the small time unit. The small time unit may be composed of, for example, a subframe number, a slot number, and a symbol number.

Serving cell information: Information specifying the serving cell to which the SPS start time is applied. If this information is not signaled, a predetermined serving cell, for example PCell is specified. In the NR, the uplink transmission and the downlink transmission may be performed in different carriers. Therefore, the serving cells in which the uplink SPS and the downlink SPS are performed may be differently designated. The signaling examples are shown in the table below.

TABLE 3

Method for specifying serving cell to which SPS is applied

| DL SPS-config | UL SPS-config | |
| --- | --- | --- |
| No serving cell id | No serving cell id | DL SPS in PCell, UL SPS in PCell |
| No serving cell id | Serving cell x | DL SPS in PCell, UL SPS in x |
| Serving cell y | No serving cell id | DL SPS and UL SPS in y |
| Serving cell y | Serving cell x | DL SPS in y, UL SPS in x |

The fourth SPS configuration information is the information for specifying the configured serving cells to which the second activation scheme is applied, and is composed of a serving cell list. In the serving cells configured in the list, the initial activation of the uplink SPS is performed by the PDCCH/DCI.

The SPS configuration information is delivered to the terminal through one or several RRC control messages. The terminal and the base station determine in which serving cell the uplink SPS is configured and in which serving cell the first activation scheme is applied and in which cell the second activation scheme is applied according to whether there is the information.

For reference, the number of SPS configuration information and how to apply it may be summarized as follows:

The first SPS configuration information is always and the number of first SPS information is 1;

The second SPS configuration information is if there is at least one serving cell to which the first activation scheme is applied, and the number of second SPS configuration information is 1;

The third SPS configuration information is if there is at least one serving cell to which the first activation scheme is applied, and the number of third SPS configuration information is N. The N is the number of serving cells to which the first activation scheme is applied; and The fourth SPS configuration information is if there is at least one serving cell to which the second activation scheme is applied, and the number of fourth SPS configuration information is 1.

Examples and scenarios of the operations proposed in the disclosure are as follows:

First, if there are one second SPS configuration information and n third SPS configuration information and there is no fourth SPS configuration information, the uplink SPS is configured in n serving cells specified in the third SPS configuration information, and activates the SPS in the first scheme in n serving cells.

Second, if there are one second SPS configuration information and n third SPS configuration information, there is no one fourth SPS configuration information, and m serving cells are specified in the fourth SPS configuration information, the uplink SPS is configured in n serving cells specified in the third SPS configuration information and the SPS is activated in the first scheme in the n serving cells. The SPS is activated in the second scheme in the m serving cells specified in the fourth SPS configuration information.

Third, if the second SPS configuration information, the third SPS configuration information, and the fourth SPS configuration information are not, the SPS is activated in the second scheme in a predetermined serving cell, for example, PCell. (The method for activating existing LTE uplink SPS)

Figure 2G:
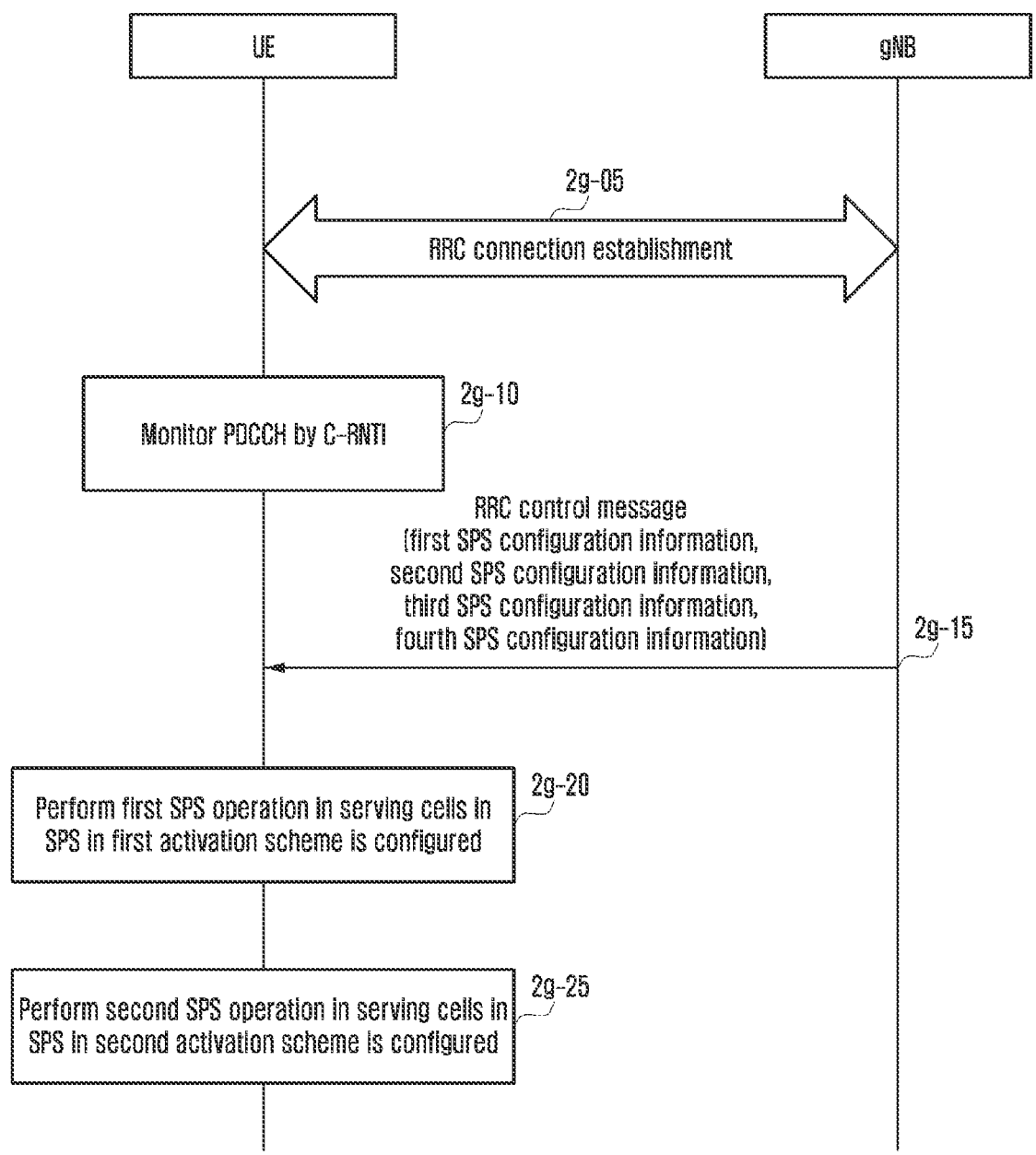
FIG. 2G is a diagram illustrating an overall operation of an embodiment of the disclosure.

FIG. 2G is a diagram illustrating an overall operation of an embodiment of the disclosure.

In step 2g-05, the terminal establishes an RRC connection with the base station. In this step, the terminal transmits the control message requesting the RRC connection establishment through the random access procedure, and upon receiving the response message thereto, the RRC connection is established. In the above procedure, an identifier of a unique terminal in a cell called C-RNTI is allocated to the terminal, and the terminal performs data transmission/reception with the base station using the C-RNTI. For reference, the serving cell where the terminal establishes the RRC connection is the PCell of the terminal.

In step 2g-10, the terminal monitors the PDCCH using the C-RNTI and monitors whether there is no downlink assignment or uplink grant allocated to the terminal.

In step 2g-15, the terminal receives the RRC control message (including the RRCConnectionReconfiguration message in the LTE). The control message may include one first SPS configuration information, k second SPS configuration information, n third SPS configuration information, and m fourth SPS configuration information: k is 0 or 1, n is an integer between 0 and x, x is the number of serving cells configured in the terminal, in particular, the number of serving cells in which the uplink is configured, and m is 0 or 1. In addition, the RRC control message may be configured immediately after the initial RRC connection (2g-05). The terminal uses the received first SPS configuration information, the second SPS configuration information, the third SPS configuration information, and the fourth SPS configuration information to determine the serving cells in which the SPS of the first activation scheme is configured and in the serving cells in which the SPS of the second activation scheme is configured.

In step 2g-20, the terminal performs the first SPS operation in the serving cells in which the SPS of the first activation scheme is configured.

In step 2g-15, the terminal performs the second SPS operation in the serving cells in which the SPS of the second activation scheme is configured.

The first SPS operation means the operation of performing the SPS initial activation through the RRC control message and controlling the SPS retransmission/modification/release with the PDCCH. Alternatively, the uplink SPS initial transmission is indicated by a Layer 3 signal/RRC control message (or performed in the indicated transmission resource/transmission format) and the uplink SPS retransmission is indicated by a Layer 1 signal/PDCCH (or performed in the indicated transmission resource/transmission format).

The second SPS operation refers to an operation in which all the initial activation/retransmission/modification/release of the SPS is initially controlled by the PDCCH. Alternatively, the second SPS operation means the operation of indicating both the initial transmission of the uplink SPS and the retransmission of the uplink SPS by the Layer 1 signal/PDCCH. The above operation may be similar to the SPS activation scheme in the existing LTE.

It is necessary that the basic SPS configuration information for the first SPS operation and the second SPS operation is received through the RRC control message.

Figure 2H:
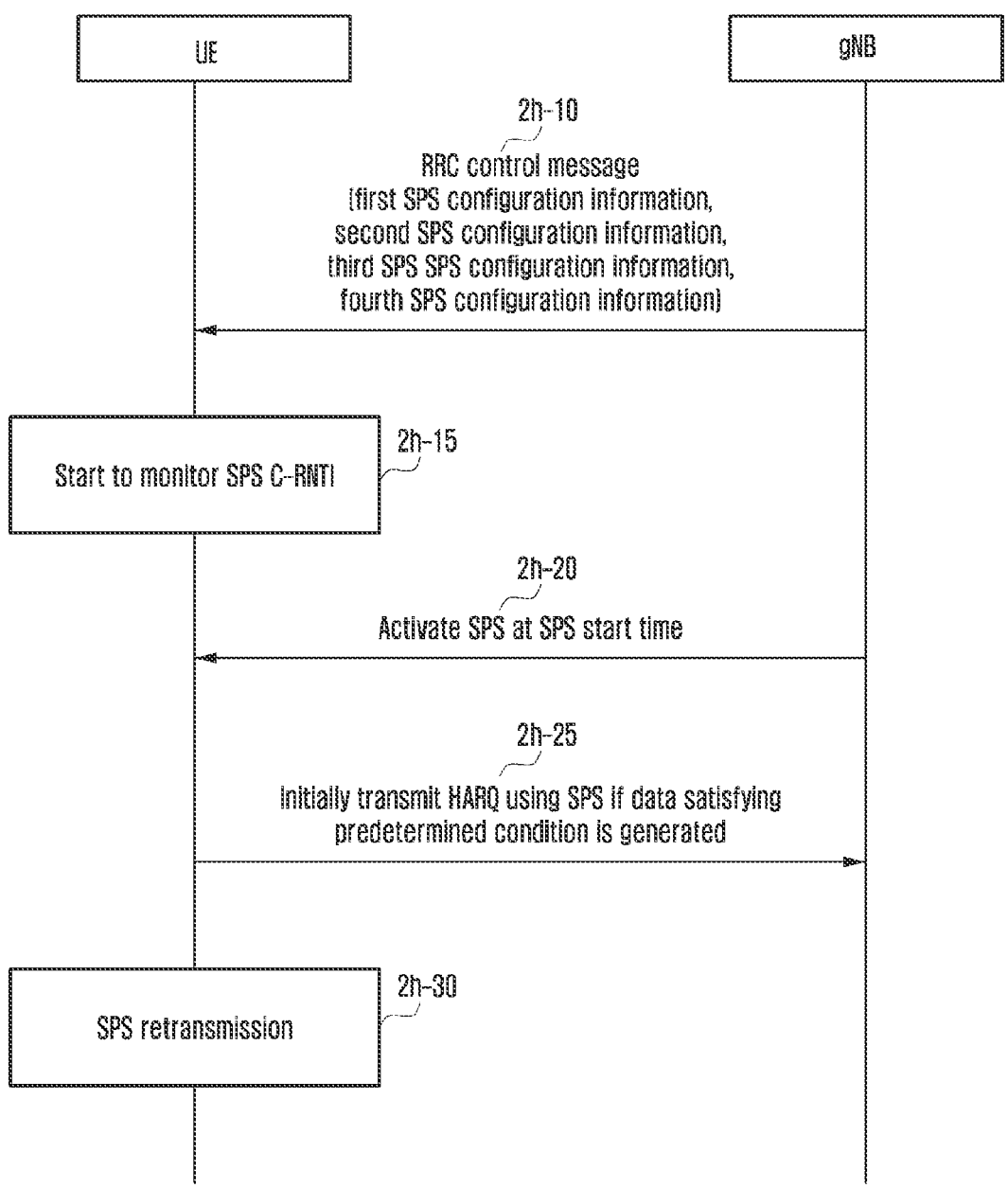
FIG. 2H is a diagram for describing in detail a first SPS operation of an embodiment of the disclosure.

FIG. 2H is a diagram for describing in detail a first SPS operation of an embodiment of the disclosure.

In step 2h-10, the terminal receives the RRC control message including the first SPS configuration information, the second SPS configuration information, the third SPS configuration information, and the fourth SPS configuration information. The terminal determines the serving cells in which the SPS of the first activation scheme is configured.

In step 2h-15, the terminal monitors the PDCCH by applying both the SPS C-RNTI and the C-RNTI from a predetermined time to the serving cell in which the SPS of the first activation scheme is configured. The predetermined time may be different for each serving cell, and the predetermined time is a time specified based on the SPS start time specified in the third SPS configuration information. The SPS start time is indicated by the serving cell by the SFN and the small time unit number of PCell. If [a', a"] is specified as the SPS start time for a predetermined serving cell A, the terminal monitors the SPS C-RNTI from the time preceding by a small time unit x with respect to [a', a"]. This is because even if the serving cell is agreed to use the first activation scheme, the serving cell can be activated earlier than the SPS start time using the second activation scheme. Alternatively, as soon as the second SPS configuration information or the third SPS configuration information to the serving cell in which the first activation scheme is configured is received (or immediately after grasping the meaning of the configuration information), the terminal may start to monitor the PDCCH by the SPS C-RNTI in the corresponding serving cell. The [x, y] means the time when the SFN of PCell is x and the small time unit number is y. The UL grant is received on the PDCCH addressed to the SPS C-RNTI before the SPS start time, and if the NDI of the UL grant is 0, the terminal discards the UL grant indicated in the second SPS configuration information and applies the newly received UL grant to activate the SPS.

In step 2h-20, the terminal activates the SPS at the specified SPS start time for the PRB indicated in the second SPS configuration information. That is, from the SPS start time, the terminal performs the HARQ initial transmission for the data satisfying the predetermined condition for the PRB designated by the SPS. At this time, the initial transmission may be performed every SPS interval indicated in the first SPS configuration information, starting from a time period specified in the SPS start time. For example, if the SPS start time is x and the SPS interval is y, the terminal may perform the initial transmission for data satisfying a predetermined condition at x+n*y (integer increasing by 1 starting from n=0). If no data satisfying the above condition exists, the terminal does not perform the transmission for the corresponding transmission resource (skip SPS data transmission). The data satisfying the predetermined condition may be data generated in a previously designated logical channel. Alternatively, the data may be data excluding a predetermined MAC control element. The predetermined MAC CE is a power header report, a periodic BSR, and a padding BSR. The MAC CE may be included to fill the padding of the MAC PDU or to be transmitted at a predetermined period. Alternatively, the data satisfying the predetermined condition may be data and a predetermined MAC CE generated in a previously designated logical channel. The predetermined MAC CE may be, for example, an SPS confirmation MAC CE. This is applicable when the skip SPS transmission is configured or being operated, and the base station checks whether the SPS transmission resource is activated.

In step 2h-25, when data satisfying a predetermined condition are generated, the terminal performs the initial transmission using the SPS transmission resource.

In step 2h-30, the terminal performs the HARQ retransmission for the data initially transmitted using the SPS transmission resource. The terminal checks whether the uplink grant addressed to the SPS C-RNTI is received on the PDCCH and checks the NDI if the uplink grant addressed to the SPS C-RNTI is received. If the NDI is a predetermined value, for example, 1, the terminal performs the HARQ retransmission. At this time, the retransmission may be performed with the RB information included in the received uplink grant. If the RB information is not included, the RB of the initially transmitted data is used. If the NDI is another predetermined value, for example, 0, the terminal discards the uplink grant indicated in the second SPS configuration information and uses the indicated uplink grant on the PDCCH. That is, the configuration is updated with the new SPS transmission. If the uplink grant indicated on the PDCCH includes the specific information for indicating the release of the SPS, the terminal releases the SPS.

Figure 2I:
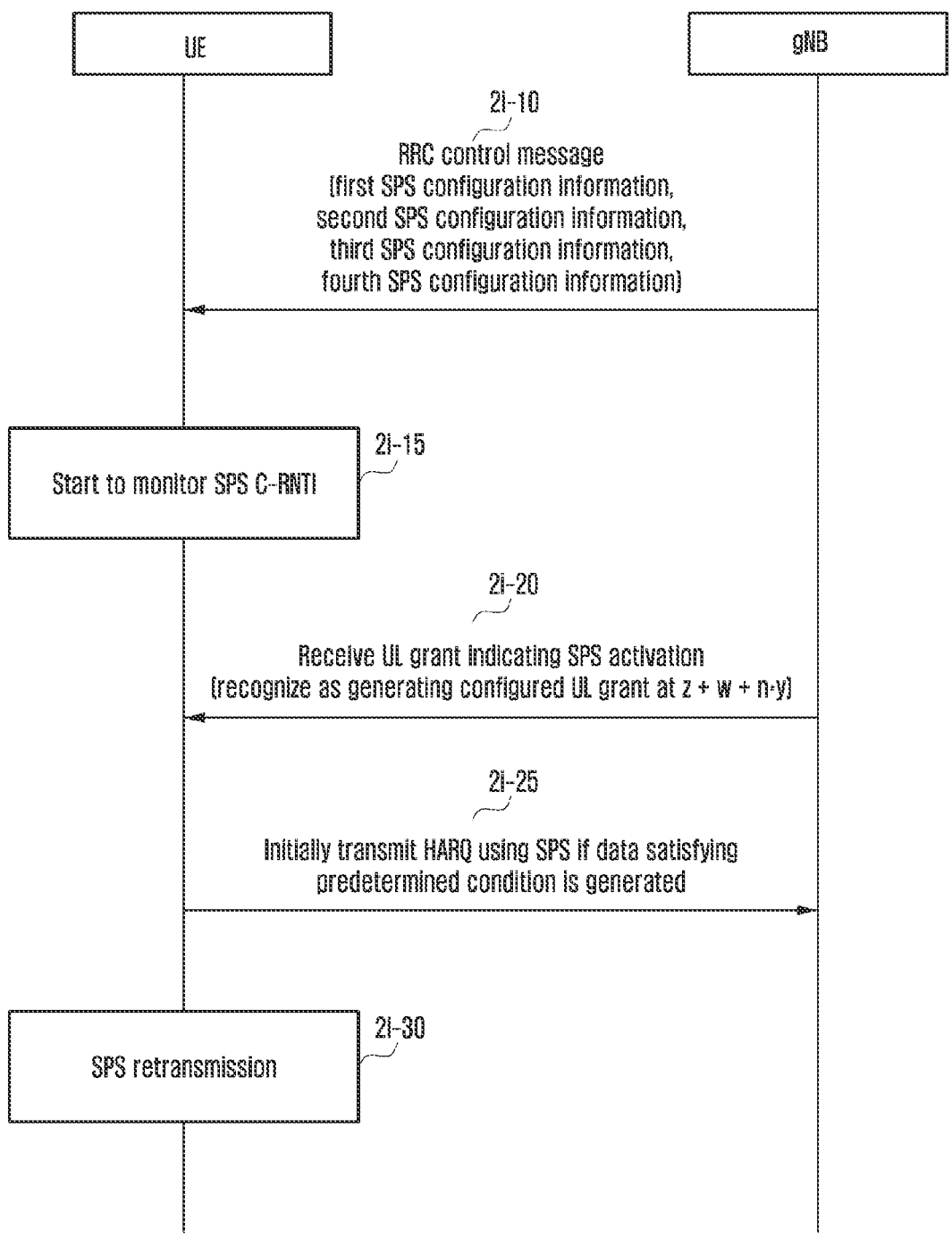
FIG. 2I is a diagram for describing in detail a second SPS operation of an embodiment of the disclosure.

FIG. 2I is a diagram for describing in detail a second SPS operation of an embodiment of the disclosure.

In step 2i-10, the terminal receives the RRC control message including the first SPS configuration information, the second SPS configuration information, the third SPS configuration information, and the fourth SPS configuration information. The terminal determines the serving cells in which the SPS of the second activation scheme is configured.

In step 2i-15, the terminal monitors the PDCCH by applying both the SPS C-RNTI and the C-RNTI from a predetermined time to the serving cell in which the SPS of the second activation scheme is configured. The predetermined time is the time when the SPS configuration information is received (or the time when the information is received and the interpretation of the information is completed or the configuration is completed according to the received information).

In step 2i-20, the terminal receives the uplink grant indicating the activation of the SPS transmission resource on the PDCCH. The uplink grant is the PDCCH addressed to the SPS C-RNTI of the terminal and having the NDI of 0. When the time when the terminal receives the PDCCH is z, the terminal activates the SPS based on the z (initialize SPS).

In step 2i-25, when data satisfying a predetermined condition are generated, the terminal performs the initial transmission using the SPS transmission resource. Specifically, the terminal may perform the initial transmission of data satisfying a predetermined condition at z+w+n*y. If no data satisfying the above condition exists, the terminal does not perform the SPS transmission for the corresponding transmission resource (skip SPS data transmission). The w may be a value specified in the PDCCH with a predetermined integer, or may be a predetermined value in the specification. The w is the temporal distance between the time when the UL grant is received and the time when the PUSCH transmission according to the UL grant is received.

In step 2i-30, the terminal performs the HARQ retransmission for the data initially transmitted using the SPS transmission resource. The terminal checks whether the UL grant addressed to the SPS C-RNTI is received on the PDCCH and checks the NDI if the uplink grant addressed to the SPS C-RNTI is received. If the NDI is a predetermined value, for example, 1, the terminal performs the HARQ retransmission. If the NDI is another predetermined value, for example, 0, the terminal discards the uplink grant indicated in the second SPS configuration information and uses the indicated UL grant on the PDCCH. That is, the SPS is updated. If the UL grant indicated on the PDCCH includes the specific information for indicating the release of the SPS, the terminal releases the SPS.

The embodiment of the disclosure proposes a method and apparatus for performing both dynamic resource allocation and SPS operation using C-RNTI, and the mode is referred to as a C-RNTI SPS mode.

The mode for performing dynamic resource allocation (dynamic scheduling, non SPS scheduling, dynamic uplink grant) using the C-RNTI and performing the SPS operation using the SPS C-RNTI is referred to as the SPS C-RNTI SPS mode, and the terminal in which the SPS is configured monitors the PDCCH by applying the C-RNTI and the SPS C-RNTI. If the SPS is configured in several serving cells, the terminal needs to monitor two identifiers in several serving cells, which increases the monitoring and decoding burden of the terminal. To solve this problem, a separate operation mode for performing both general scheduling and SPS can be introduced as an identifier instead of using a separate terminal identifier for SPS, which is defined as the C-RNTI SPS mode.

If the SPS C-RNTI is included in the first SPS configuration information, the terminal uses both the SPS C-RNTI and the C-RNTI and if the SPS C-RNTI is not included in the first SPS configuration information or if the SPS C-RNTI is not signaled to the terminal, the terminal performs the SPS retransmission using the C-RNTI. The above-described embodiment, particularly FIGS. 2H and 2I is the overall operation described based on the SPS C-RNTI SPS mode.

Figure 2J:
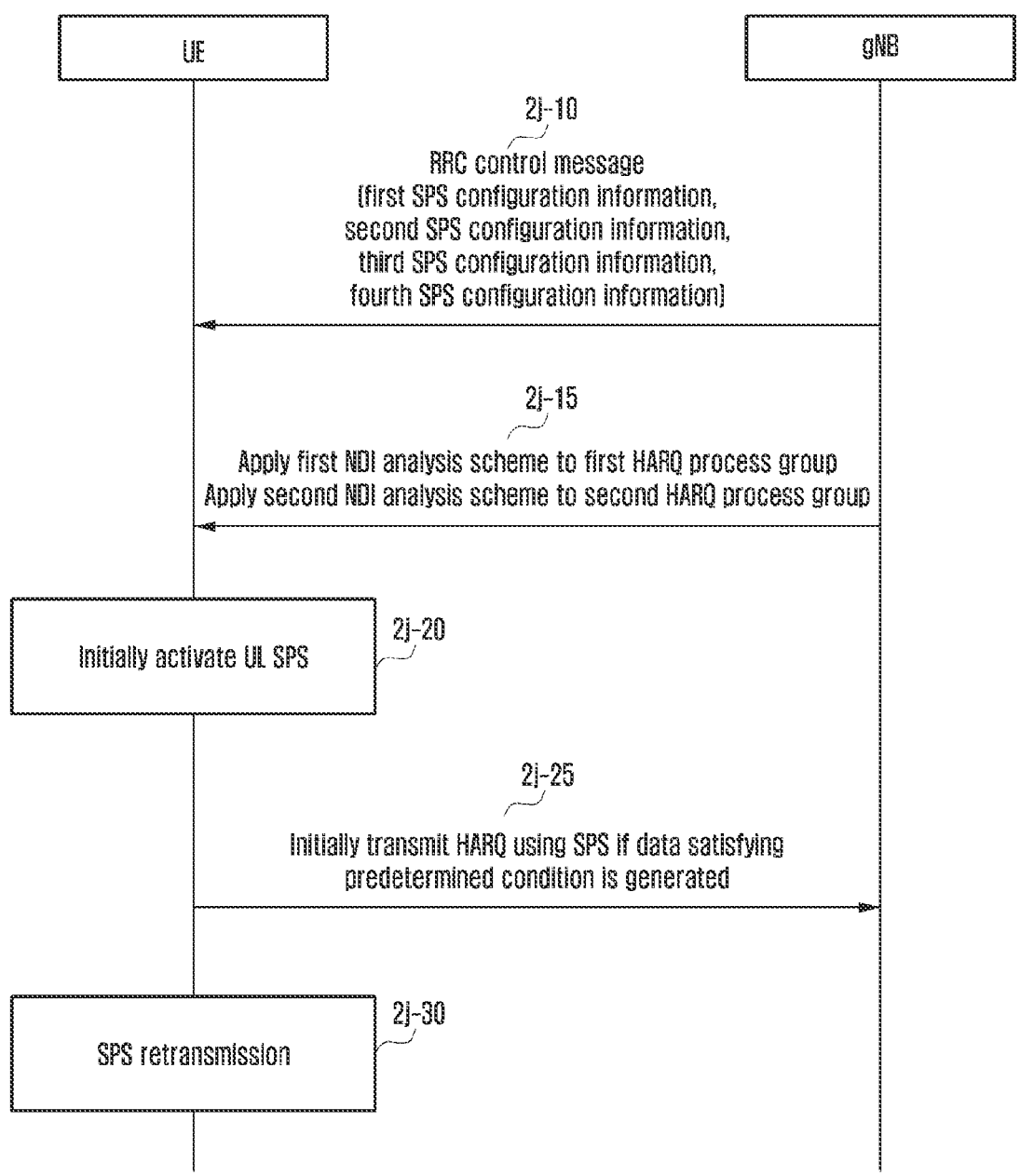
FIG. 2J is a diagram illustrating an overall operation of a C-RNTI SPS mode according to an embodiment of the disclosure.

FIG. 2J is a diagram illustrating an overall operation of a C-RNTI SPS mode according to an embodiment of the disclosure.

In step 2j-10, the terminal receives the RRC control message including the SPS configuration information. If the SPS C-RNTI is not included in the first SPS configuration information of the control message, the terminal is operated in the C-RNTI SPS mode.

In step 2j-15, the terminal starts to apply a first NDI analysis scheme to a first HARQ process set and a second NDI analysis scheme to a second HARQ process set.

The first HARQ process set is the remaining HARQ processes except the HARQ processes used for the SPS among the HARQ processes configured in the terminal.

The second HARQ process set is the HARQ processes specified for the SPS among the HARQ processes configured in the terminal.

The first NDI analysis scheme is a method for interpreting the HARQ initial transmission if the NDI is toggled and the HARQ retransmission if the NDI is intact (or not toggled).

The second NDI analysis scheme is a scheme for interpreting HARQ initial transmission if the NDI has a predetermined value, for example, 0, and HARQ retransmission if the NDI is another predetermined value, for example, 1.

In step 2j-20, the terminal activates the uplink SPS. When the first activation scheme is used, the activation is started at the SPS start time. If the second activation method is used, the activation is started based on the time when the uplink grant satisfying the following condition is received.

<Condition>
Uplink grant addressed to C-RNTI
The uplink grant for HARQ process for SPS (HARQ process identifier=x, HARQ process x is HARQ process specified for SPS)
NDI=0
The UL grant does not indicate the SPS release.

In step 2j-25, when data satisfying a predetermined condition are generated, the terminal performs the initial transmission using the SPS transmission resource.

In step 2j-30, the terminal performs the HARQ retransmission for the data initially transmitted using the SPS transmission resource. The terminal performs the SPS retransmission when the uplink grant satisfying the following conditions is received.

<Condition>
UL grant addressed to C-RNTI
The UL grant for HARQ process for SPS (HARQ process identifier=x, HARQ process x is HARQ process specified for SPS)
NDI=1

In addition, in the disclosure, the MAC CE indicating whether to activate the uplink SPS is introduced.

Even if the SPS transmission resource is activated, the terminal performs transmission only when there are data satisfying a predetermined condition. Therefore, the base station cannot determine whether the terminal has activated the SPS transmission resource based on whether the SPS transmission is made. To enable the base station to determine whether to activate the SPS transmission resource, the terminal activates the SPS resource and then trigger the control information called the SPS confirmation MAC CE and transmit the SPS confirmation MAC CE to the base station. When the SPS transmission resource is activated or released, the terminal generates and transmits the SPS confirmation MAC CE. The predetermined logical channel ID is written in the LCID field of the MAC subheader for the SPS confirmation MAC CE, and the SPS confirmation MAC CE may include the serving cell identifier information or the uplink SPS identifier information.

If only one uplink SPS is configured in one terminal or a MAC entity of one terminal, the terminal transmits the first SPS confirmation MAC CE. The first SPS confirmation MAC CE is the MAC CE composed of only of a MAC subheader. That is, there is no payload.

If only several uplink SPSs are configured in one terminal or a MAC entity of one terminal, the terminal transmits the second SPS confirmation MAC CE. The second SPS confirmation MAC CE is a MAC CE composed of a MAC subheader and a payload, and the payload is composed of the information specifying the related serving cell or the information specifying the related uplink SPS. The information has a size of 1 byte and may be formed in a 1-bit, 2-bit or 3-bit logical identifier, an indicator, or a bitmap format. For example, an index of the related serving cell or the uplink SPS may be included.

The first SPS confirmation MAC CE and the second SPS confirmation MAC CE may be specified with different LCIDs.

If the first activation scheme is used, the terminal triggers the SPS confirmation MAC CE at the SPS start time.

If the second activation scheme is used, the terminal triggers the SPS confirmation MAC CE when receiving the uplink grant that satisfies the following conditions.

<Condition>
Uplink grant addressed to SPS C-RNTI
NDI=0

FIG. 2K is a diagram illustrating the overall operation of a terminal, according to an embodiment.

In step 2k-05, the terminal, which is RRC connected to the base station monitors the PDCCH using the C-RNTI, monitors whether there is no downlink assignment or uplink grant allocated to the terminal. In step 2k-10, the terminal receives the RRC control message (including the RRCConnectionReconfiguration message in the LTE). The control message may include one first SPS configuration information, k second SPS configuration information, n third SPS configuration information, and m fourth SPS configuration information: k is 0 or 1, n is an integer between 0 and x, x is the number of serving cells configured in the terminal, in particular, the number of serving cells in which the uplink is configured, and m is 0 or 1. The terminal determines the following two SPS operation schemes using the first SPS configuration information, the second SPS configuration information, the third SPS configuration information, and the fourth SPS configuration information received in step 2k-15.

First, the determination of C-RNTI SPS mode or SPS C-RNTI SPS mode (detailed in FIG. 2J).

Second, the determination of the serving cells for which the SPS of the first activation scheme is configured and the serving cells for which the SPS of the second activation scheme is configured.

In step 2k-20, the terminal determines a subsequent operation according to C-RNTI SPS mode or SPS C-RNTI SPS mode. That is, if the SPS C-RNTI is not included in the first SPS configuration information of the control message, the terminal is operated in the C-RNTI SPS mode (2k-25) and if the SPS C-RNTI is included in the first SPS configuration information of the control message, the terminal is operated in the SPS C-RNTI SPS mode (2k-30, 2k-35, 2k-40). The first SPS operation (2k-35) and the second SPS operation (2k-40) are described in detail with reference to FIGS. 2H and 2I.

Figure 2L:
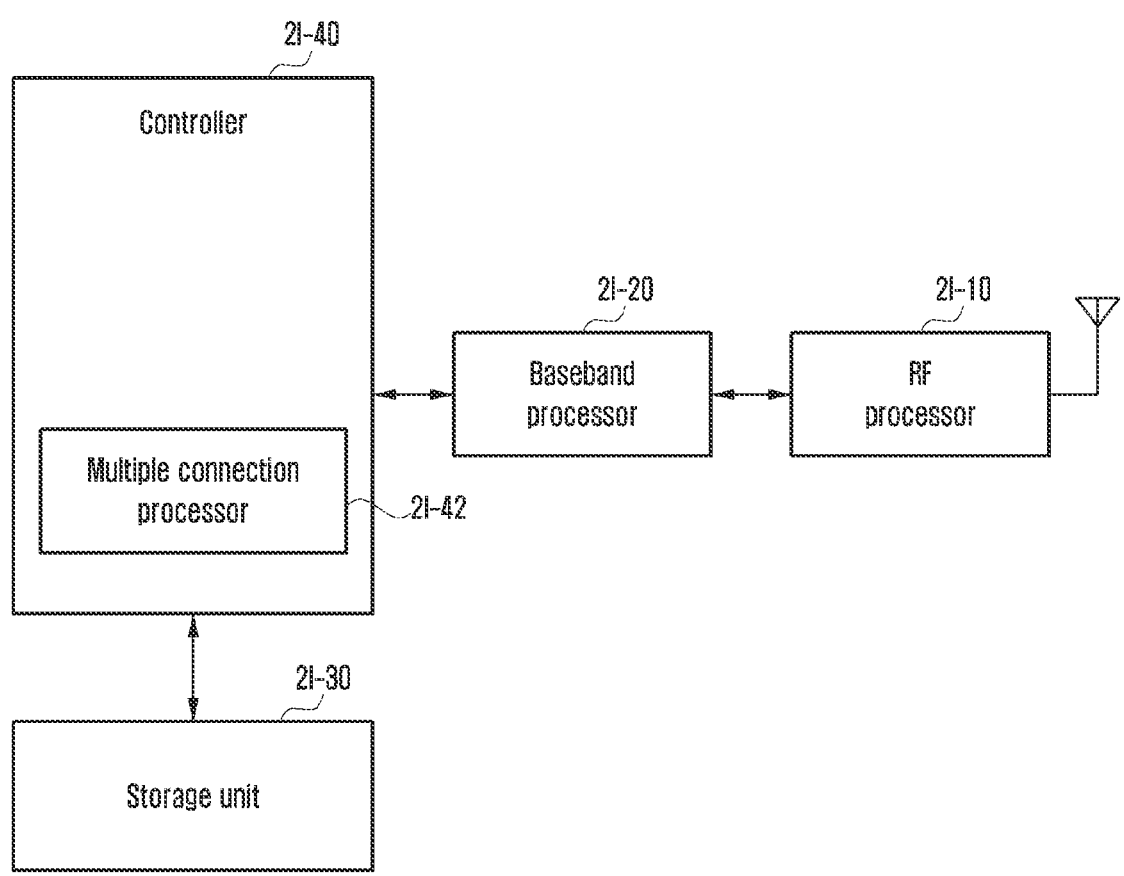
FIG. 2L is a block diagram illustrating the internal structure of the terminal, according to an embodiment.

FIG. 2L is a block diagram illustrating the internal structure of the terminal, according to an embodiment.

Referring to FIG. 2L, the terminal includes a radio frequency (RF) processor 2l-10, a baseband processor 2l-20, a storage unit 2l-30, and a controller 2l-40.

The RF processor 2l-10 serves to transmit and receive signals through a radio channel, such as band conversion and amplification of a signal. That is, the RF processor 2l-10 up-converts a baseband signal provided from the baseband processor 2l-20 into an RF band signal and then transmits the RF band signal through an antenna and down-converts the RF band signal received through the antenna into the baseband signal. For example, the RF processor 2l-10 may include a transmitting filter, a receiving filter, an amplifier, a mixer, an oscillator, a digital to analog converter (DAC), an analog to digital converter (ADC), or the like. FIG. 2L illustrates only one antenna but the terminal may include a plurality of antennas. Further, the RF processor 2l-10 may include the plurality of RF chains. Further, the RF processor 2l-10 may perform beamforming. For the beamforming, the RF processor 2l-10 may adjust a phase and a size of each of the signals transmitted and received through a plurality of antennas or antenna elements. In addition, the RF processor may perform MIMO and may receive a plurality of layers when performing a MIMO operation.

The baseband processor 2l-20 performs a conversion function between the baseband signal and the bit string according to a physical layer standard of the system. For example, when data are transmitted, the baseband processor 2l-20 generates complex symbols by coding and modulating a transmitting bit string. Further, when data are received, the baseband processor 2l-20 recovers the received bit string by demodulating and decoding the baseband signal provided from the RF processor 2l-10. For example, according to the orthogonal frequency division multiplexing (OFDM) scheme, when data are transmitted, the baseband processor 2l-20 generates the complex symbols by coding and modulating the transmitting bit string, maps the complex symbols to sub-carriers, and then performs an inverse fast Fourier transform (IFFT) operation and a cyclic prefix (CP) insertion to configure the OFDM symbols. Further, when data are received, the baseband processor 2l-20 divides the baseband signal provided from the RF processor 2l-10 in an OFDM symbol unit and recovers the signals mapped to the sub-carriers by a fast Fourier transform (FFT) operation and then recovers the receiving bit string by the modulation and decoding.

The baseband processor 2l-20 and the RF processor 2l-10 transmit and receive a signal as described above. Therefore, the baseband processor 2l-20 and the RF processor 2l-10 may be called a transmitter, a receiver, a transceiver, or a communication unit. Further, at least one of the baseband processor 2l-20 and the RF processor 2l-10 may include a plurality of communication modules to support a plurality of different radio access technologies. Further, at least one of the baseband processor 2l-20 and the RF processor 2l-10 may include different communication modules to process signals in different frequency bands. For example, different radio access technologies may include the wireless LAN (for example: IEEE 802.11), a cellular network (for example: LTE), or the like. Further, the different frequency bands may include a super high frequency (SHF) (for example: 2 NRHz, NRhz) band, a millimeter wave (for example: 60 GHz) band.

The storage unit 2l-30 stores data and software such as basic programs, application programs, and configuration information or the like for the operation of the terminal. In particular, the storage unit 2l-30 may store information associated with a second access node performing wireless communication using a second radio access technology. Further, the storage unit 2l-30 provides the stored data according to the request of the controller 2l-40.

The controller 2l-40 controls the overall operations of the terminal. For example, the controller 2l-40 transmits/receives a signal through the baseband processor 2l-20 and the RF processor 2l-10. Further, the controller 2l-40 records and reads data in and from the storage unit 2l-30. For this purpose, the controller 2l-40 may include at least one processor. For example, the controller 2l-40 may include a communication processor (CP) performing a control for communication and an application processor (AP) controlling an upper layer such as the application programs. In addition, according to the embodiment of the disclosure, the controller 2l-40 may include a multiple connection processor 2l-42 that performs processing to be operated in a multi connection mode.

Figure 2M:
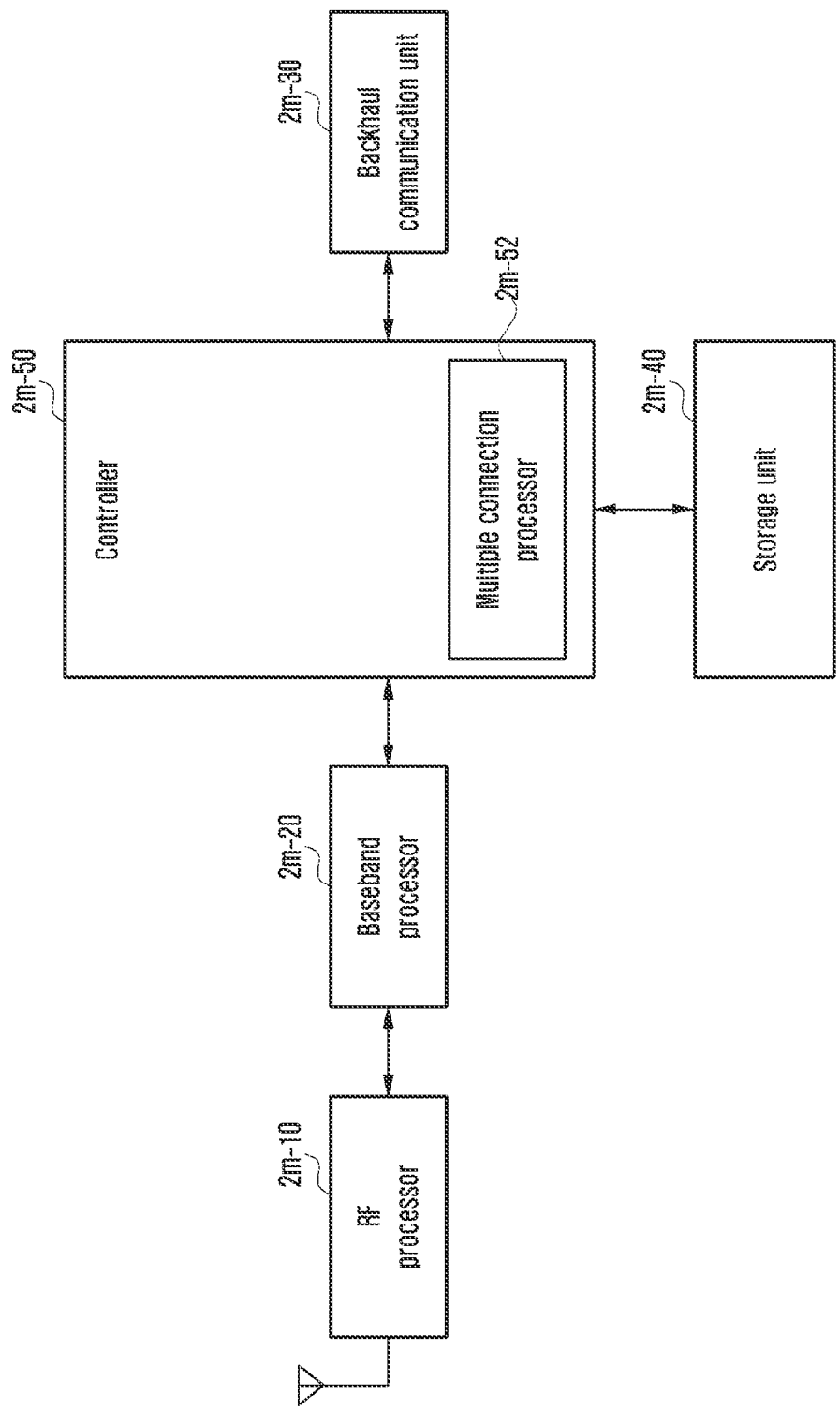
FIG. 2M is a block diagram illustrating a configuration of a base station, according to an embodiment.

FIG. 2M is a block diagram illustrating a configuration of a base station, according to an embodiment.

As illustrated in FIG. 2M, the base station is configured to include an RF processor 2m-10, a baseband processor 2m-20, a backhaul communication unit 2m-30, a storage unit 2m-40, and a controller 2m-50.

The RF processor 2m-10 serves to transmit and receive signals through a radio channel, such as band conversion and amplification of a signal. That is, the RF processor 2m-10 up-converts a baseband signal provided from the baseband processor 2m-20 into an RF band signal and then transmits the RF band signal through an antenna and down-converts the RF band signal received through the antenna into the baseband signal. For example, the RF processor 2m-10 may include a transmitting filter, a receiving filter, an amplifier, a mixer, an oscillator, a DAC, an ADC, etc. FIG. 2M illustrates only one antenna but the first access node may include a plurality of antennas. Further, the RF processor 2m-10 may include the plurality of RF chains. Further, the RF processor 2m-10 may perform the beamforming. For the beamforming, the RF processor 2m-10 may adjust a phase and a size of each of the signals transmitted and received through a plurality of antennas or antenna elements. The RF processor may perform a downward MIMO operation by transmitting one or more layers.

The baseband processor 2m-20 performs a conversion function between the baseband signal and the bit string according to the physical layer standard of the first radio access technology. For example, when data are transmitted, the baseband processor 2m-20 generates complex symbols by coding and modulating a transmitting bit string. Further, when data are received, the baseband processor 2m-20 recovers the received bit string by demodulating and decoding the baseband signal provided from the RF processor 2m-10. For example, according to the OFDM scheme, when data are transmitted, the baseband processor 2m-20 generates the complex symbols by coding and modulating the transmitting bit string, maps the complex symbols to the sub-carriers, and then performs the IFFT operation and the CP insertion to configure the OFDM symbols. Further, when data are received, the baseband processor 2m-20 divides the baseband signal provided from the RF processor 2m-10 in an OFDM symbol unit and recovers the signals mapped to the sub-carriers by an FFT operation and then recovers the receiving bit string by the modulation and decoding. The baseband processor 2m-20 and the RF processor 2m-10 transmit and receive a signal as described above. Therefore, the baseband processor 2m-20 and the RF processor 2m-10 may be called a transmitter, a receiver, a transceiver, a communication unit, or a wireless communication unit.

The backhaul communication unit 2m-30 provides an interface for performing communication with other nodes within the network. That is, the backhaul communication unit 2m-30 converts bit strings transmitted from the main base station to other nodes, for example, an auxiliary base station, a core network, etc., into physical signals and converts the physical signals received from other nodes into the bit strings.

The storage unit 2m-40 stores data such as basic programs, application programs, and setting information for the operation of the main base station. In particular, the storage unit 2m-40 may store the information on the bearer allocated to the accessed terminal, the measured results reported from the accessed terminal, etc. Further, the storage unit 2m-40 may store information that is a determination criterion on whether to provide a multiple connection to the terminal or stop the multiple connection to the terminal. Further, the storage unit 2m-40 provides the stored data according to the request of the controller 2m-50.

The controller 2m-50 controls the overall operations of the main base station. For example, the controller 2m-50 transmits/receives a signal through the baseband processor 2m-20 and the RF processor 2m-10 or the backhaul communication unit 2m-30. Further, the controller 2m-50 records and reads data in and from the storage unit 2m-40. For this purpose, the controller 2m-50 may include at least one processor. In addition, according to the embodiment of the disclosure, the controller 2m-50 may include a multiple connection processor 2m-52 that performs processing to be operated in a multi connection mode.

According to an embodiment of the disclosure, there may be provided:

Common SPS info+cell specific SPS info (s):

Common SPS info: SPS C-RNTI, number of HARQ processes, SPS interval; and cell specific SPS info: UL grant (e.g., PRB, MCS, TB size etc.), SPS start time;

Using C-RNTI for SPS retransmission to decrease the number of blind decoding:

RRC configure the mode; and

If configured, a HARQ process is not shared between SPS scheduling and dynamic scheduling; and DL SPS in normal NR carrier and UL SPS in SUL NR carrier:

DL SPS-config and UL SPS-config include serving cell id.

If not signaled, SPS is configured in a predefined serving cell (e.g., PCell).

If not signaled for UL, UL SPS is configured in the same serving cell where DL SPS is configured.

If explicitly signaled, SPS is configured in the indicated serving cell.

TABLE 4

| DL SPS-config | UL SPS-config | |
|---|---|---|
| No serving cell id | No serving cell id | DL SPS in PCell, UL SPS in PCell |
| No serving cell id | Serving cell x | DL SPS in PCell, UL SPS in x |
| Serving cell y | No serving cell id | DL SPS and UL SPS in y |
| Serving cell y | Serving cell x | DL SPS in y, UL SPS in x |

The embodiments of the disclosure disclosed in the specification and the accompanying drawings have been provided only as specific examples to assist in understanding the disclosure and do not limit the scope of the disclosure. Therefore, it is to be understood that in addition to the embodiments of the disclosure described herein, all the changed or modified forms derived from the technical spirit of the disclosure are included in the scope of the disclosure.

What is claimed is:

1. A method performed by a terminal in a wireless communication system, the method comprising:
   receiving, from a base station, a message including a packet data convergence protocol (PDCP) re-establishment request for an acknowledged mode (AM) data radio bearer (DRB);
   identifying whether information is configured based on the message, the information indicating whether a PDCP entity for the AM DRB continues or resets a header compression protocol;
   in case that the information is not configured, performing header decompression for PDCP packets stored in a reception buffer;

after the header decompression for the stored PDCP packets is performed, resetting the header compression protocol; and delivering, to an upper layer of the PDCP entity, at least one PDCP packet among the stored PDCP packets for which the header decompression is performed and not delivered to the upper layer in case that a first PDCP packet is delivered from a lower layer of the PDCP entity, wherein the first PDCP packet has an earliest count value among count values for the stored PDCP packets.

2. The method of claim 1, wherein a plurality of PDCP packets with consecutive count values starting from the earliest count value are delivered to the upper layer in an ascending order.

3. The method of claim 1, further comprising:
storing the PDCP packets in the reception buffer, in case that the PDCP packets are delivered from a radio link control (RLC) entity to the PDCP entity,
wherein each PDCP packet is delivered from the RLC entity to the PDCP entity based on all segments corresponding to each PDCP packet being received and reassembled in the RLC entity.

4. The method of claim 3, wherein each PDCP packet is delivered from the RLC entity, in a reception order which is received at the RLC entity regardless of a sequence number order.

5. The method of claim 1, wherein the header compression protocol is a robust header compression (ROHC).

6. The method of claim 1, wherein the message is a radio resource control (RRC) reconfiguration message, and
wherein the RRC reconfiguration message further includes information on a PDCP configuration.

7. The method of claim 6, wherein PDCP re-establishment is performed based on the information on the PDCP configuration.

8. The method of claim 1, wherein a PDCP packet is a PDCP service data unit (SDU).

9. A terminal in a wireless communication system, the terminal comprising:
a transceiver; and
a controller configured to:
control the transceiver to receive, from a base station, a message including a packet data convergence protocol (PDCP) re-establishment request for an acknowledged mode (AM) data radio bearer (DRB);
identify whether information is configured based on the message, the information indicating whether a PDCP entity for the AM DRB continues or resets a header compression protocol;
in case that the information is not configured, perform header decompression for PDCP packets stored in a reception buffer;
after the header decompression for the stored PDCP packets is performed, reset the header compression protocol; and
deliver, to an upper layer of the PDCP entity, at least one PDCP packet among the stored PDCP packets for which the header decompression is performed and not delivered to the upper layer, in case that a first PDCP packet is delivered from a lower layer of the PDCP entity,
wherein the first PDCP packet has an earliest count value among count values for the stored PDCP packets.

10. The terminal of claim 9, wherein a plurality of PDCP packets with consecutive count values starting from the earliest count value are delivered to the upper layer in an ascending order.

11. The terminal of claim 9, wherein the controller is further configured to store the PDCP packets in the reception buffer, in case that the PDCP packets are delivered from the lower layer to the PDCP entity,
wherein each PDCP packet is delivered from a radio link control (RLC) entity to the PDCP entity based on all segments corresponding to each PDCP packet being received and reassembled in the RLC entity.

12. The terminal of claim 11, wherein each PDCP packet is delivered from the RLC entity, in a reception order which is received at the RLC entity regardless of a sequence number order.

13. The terminal of claim 9, wherein the header compression protocol is a robust header compression (ROHC).

14. The terminal of claim 9, wherein the message is a radio resource control (RRC) reconfiguration message, and
wherein the RRC reconfiguration message further includes information on a PDCP configuration.

15. The terminal of claim 14, wherein the controller is further configured to perform the PDCP re-establishment based on the information on the PDCP configuration.

16. The terminal of claim 9, wherein a PDCP packet is a PDCP service data unit (SDU).

* * * * *